United States Patent
Manabe et al.

(10) Patent No.: US 10,711,195 B2
(45) Date of Patent: Jul. 14, 2020

(54) LIQUID-CRYSTALLINE MEDIUM

(71) Applicant: Merck Patent GmbH, Darmstadt (DE)

(72) Inventors: Atsutaka Manabe, Bensheim (DE);
Christian Jasper, Seligenstadt (DE);
Volker Reiffenrath, Rossdorf (DE);
Constanze Brocke, Gross-Gerau (DE);
Detlef Pauluth, Ober-Ramstadt (DE);
Dagmar Klass, Darmstadt (DE);
Renate Seeger, Riedstadt (DE)

(73) Assignee: Merck Patent GmbH, Darmstadt (DE)

( * ) Notice: Subject to any disclaimer, the term of this patent is extended or adjusted under 35 U.S.C. 154(b) by 106 days.

(21) Appl. No.: 16/087,159

(22) PCT Filed: Mar. 22, 2017

(86) PCT No.: PCT/EP2017/056773
§ 371 (c)(1),
(2) Date: Sep. 21, 2018

(87) PCT Pub. No.: WO2017/162716
PCT Pub. Date: Sep. 28, 2017

(65) Prior Publication Data
US 2019/0100695 A1  Apr. 4, 2019

(30) Foreign Application Priority Data
Mar. 24, 2016 (EP) .................... 16162312

(51) Int. Cl.
*G02F 1/1333* (2006.01)
*C09K 19/18* (2006.01)
*C09K 19/34* (2006.01)

(52) U.S. Cl.
CPC .......... *C09K 19/18* (2013.01); *C09K 19/3458* (2013.01); *C09K 2019/181* (2013.01); *C09K 2019/183* (2013.01); *C09K 2019/188* (2013.01); *C09K 2219/11* (2013.01)

(58) Field of Classification Search
CPC ............... C09K 19/18; C09K 19/3458; C09K 2019/181; C09K 2019/183; C09K 2019/188; C09K 2219/11; G02F 1/1333
USPC .................................. 252/299.61
See application file for complete search history.

(56) References Cited

U.S. PATENT DOCUMENTS

| 9,493,703 | B2 | 11/2016 | Manabe et al. |
| 9,938,462 | B2 | 4/2018 | Manabe et al. |
| 10,099,975 | B2 * | 10/2018 | Jasper ............... C09K 19/18 |
| 2014/0239227 | A1 | 8/2014 | Manabe et al. |
| 2015/0322344 | A1 | 11/2015 | Manabe et al. |
| 2016/0208167 | A1 | 7/2016 | Jasper et al. |
| 2019/0106626 | A1 * | 4/2019 | Brocke ............ C09K 19/20 |

FOREIGN PATENT DOCUMENTS

| WO | 2013/045029 A1 | 4/2013 |
| WO | 2014/094973 A1 | 6/2014 |
| WO | 2015/024635 A1 | 2/2015 |

OTHER PUBLICATIONS

International Search Report dated Jun. 22, 2017 issued in corresponding PCT/EP2017/056773 application (3 pages).

* cited by examiner

*Primary Examiner* — Geraldina Visconti
(74) *Attorney, Agent, or Firm* — Millen, White, Zelano and Branigan, P.C.

(57) ABSTRACT

The present invention relates to liquid crystal mixtures comprising one or more compounds of the formula A

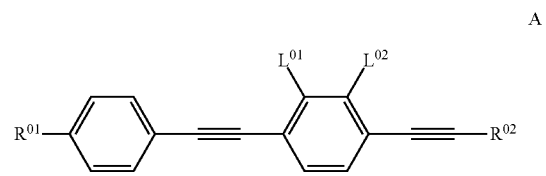

and, in addition one or more compounds of formula I

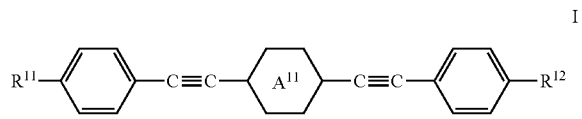

or one or more compounds of formula II

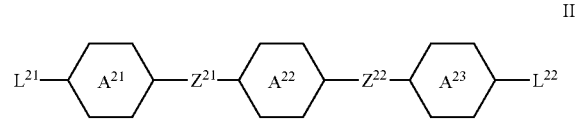

wherein the individual radicals have the respective meanings indicated in claim 1, to the use thereof for high-frequency components, and to high-frequency components, in particular antennae, especially for the gigahertz range, comprising these media.

15 Claims, No Drawings

LIQUID-CRYSTALLINE MEDIUM

The present invention relates to a liquid-crystalline medium comprising alkynyl tolanes, to the use thereof for high-frequency components, and to high-frequency components, in particular antennae and phase shifters, especially for the gigahertz and terahertz range, comprising these media.

Liquid-crystalline media have been used for many years in electro-optical displays (liquid crystal displays—LCDs) in order to display information.

However, liquid-crystalline media have recently also increasingly been proposed for use in components for high-frequency technology, in particular microwave technology, such as, for example, in DE 10 2004 029 429 A and in JP 2005-120208 (A).

An industrially valuable application of liquid-crystalline media in high-frequency technology is based on their property that their dielectric properties can be controlled by a variable voltage, particularly for the gigahertz region. Thus, tuneable antennae can be designed which contain no moving parts (A. Gaebler, A. Moessinger, F. Goelden, et al., "Liquid Crystal-Reconfigurable Antenna Concepts for Space Applications at Microwave and Millimeter Waves", International Journal of Anntenae and Propagation, Vol. 2009, Article ID 876989, 7 pages, 2009. doi:10.1155/2009/876989).

The publication A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, 545-548, describes, inter alia, the properties of the known, liquid-crystalline single substance K15 (Merck KGaA, Germany) at a frequency of 9 GHz.

In DE 10 2004 029 429 A cited above the use of conventional liquid-crystal media in microwave technology, inter alia in phase shifters, is described. Liquid-crystalline media have already been investigated therein with respect to their properties in the corresponding frequency range.

Liquid crystal media comprising for example compounds of the formula below,

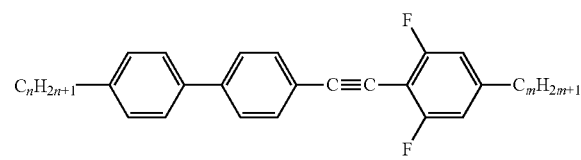

are used as a host mixture for the investigation of compounds, which are suggested for the usage in components for microwave applications and are described in F. Gölden, "Liquid Crystal Based Microwave Components with Fast Response Times: Materials, Technology, Power Handling Capability", Dissertation, Technische Universität Darmstadt, 2009, (D17); A. Lapanik, "Single compounds and mixtures for microwave applications, Dielectric, microwave studies on selected systems", Dissertation, Technische Universität Darmstadt, 2009, (D17); "Nematic LC mixtures with high birefringence in microwave region", A. Lapanik, F. Gölden, S. Müller, A. Penirschke, R. Jakoby und W. Haase, Frequenz 2011, 65, 15-19; "Highly birefringent nematic mixtures at room temperature for microwave applications", A. Lapanik, F. Gölden, S. Müller, R. Jakoby und W. Haase, Journal of Optical Engineering, published online, as well as in the laid-open document WO2013/045029 A1.

WO 2011/035863 A1 discloses liquid crystal mixtures comprising compounds of the formula

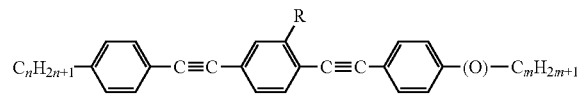

wherein R denotes, methyl, ethyl, cyclopropyl or cyclohexyl, for use in high frequency components and does also mention the compounds shown above.

In WO 2015/24635 A, the use of compounds such as the following

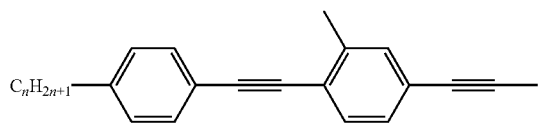

is described as component in liquid crystal mixtures as well as the use of such mixtures for high-frequency components, in particular antennae, especially for the gigahertz range.

However, the compositions or individual compounds known to date are generally afflicted with disadvantages. Most of them result, besides other deficiencies, in disadvantageously high losses and/or inadequate phase shifts or inadequate material quality. Whereas, for example, some individual compounds do not have favourable liquid-crystalline phases and have very high melting points, other substances in turn lack sufficiently high values of the optical anisotropy (Δn) and the dielectric anisotropy (Δε).

For use in high-frequency technology, liquid-crystalline media having particular, to date rather unusual, non-standard properties, or combinations of properties, are required. In particular, the loss in the microwave region and/or millimetre wave region must be reduced and the material quality (η) must be improved.

Furthermore, applications in antenna technology take place under in some cases strongly varying outside boundary conditions, such as, for example, large temperature variations. Hence, there is a demand for an improvement in the low-temperature stability of the liquid-crystalline media (i.e. no crystallisation of the liquid crystal or one of its components upon cooling must occur). Both an improvement in the operating properties and also in the shelf life are necessary here.

Thus, novel components for liquid-crystalline media having improved properties are necessary and there is a considerable demand for improved liquid-crystalline media having suitable properties for corresponding practical applications.

It is an aim of the present invention to provide improved liquid crystal media for the use for high-frequency components, in particular antennae, especially for the gigahertz range having a suitably high Δε, a suitable nematic phase range and a suitably high optical anisotropy Δn, which do not have the disadvantages of the prior-art materials, or at least only do so to a considerably reduced extent.

Surprisingly, it has been found that the problem can be solved by the use of liquid crystal mixtures as defined in claim 1.

Hence, the invention relates to a liquid-crystalline medium comprising one or more compounds of the formula A,

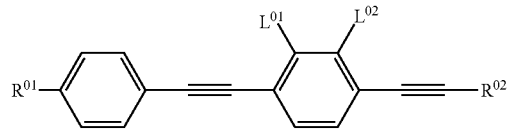

A and, in addition
one or more compounds selected from the group of compounds of formulae I and II

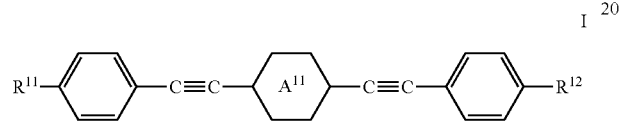

I

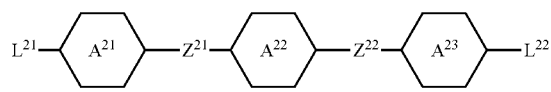

II wherein $R^{01}$ and $R^{02}$ each, independently of one another, denote a halogenated or unsubstituted alkyl radical having 1 to 15 C atoms, where, in addition, one or more $CH_2$ groups in these radicals may each be replaced, independently of one another, by —C≡C—, —CH=CH—, —CF=CF—, —CF=CH—, —CH=CF—, —(CO)O—, —O(CO)—, —(CO)—, —O— or —S— in such a way that O or S atoms are not linked directly to one another, $L^{01}$ and $L^{02}$ denote H or $CH_3$ with the proviso that one of $L^{01}$ and $L^{02}$ denotes H and the other of $L^{01}$ and $L^{02}$ denotes $CH_3$,

denotes

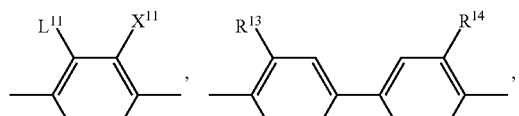

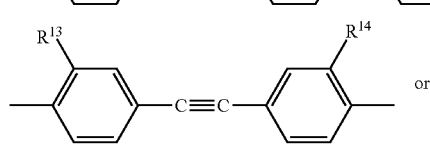
or

-continued

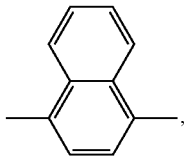

preferably

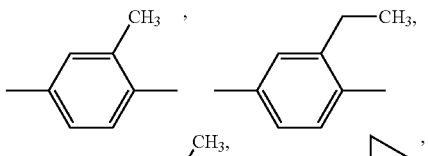

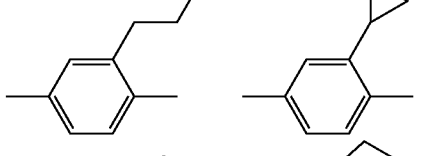

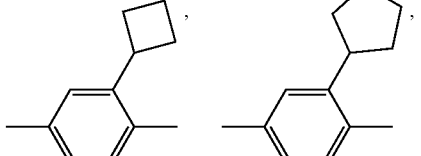

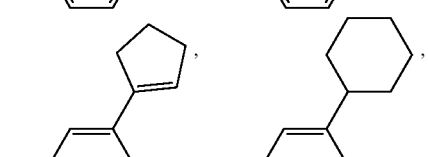

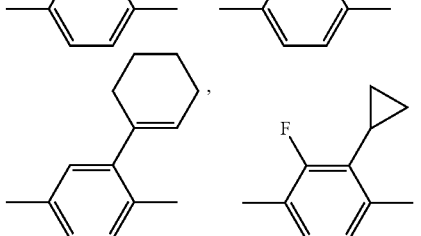

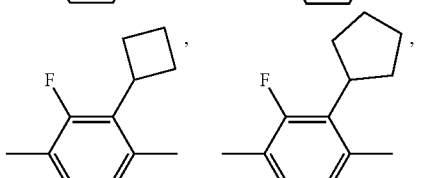

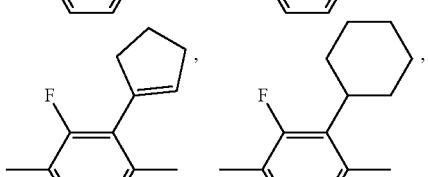

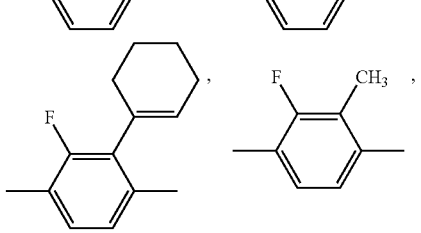

-continued

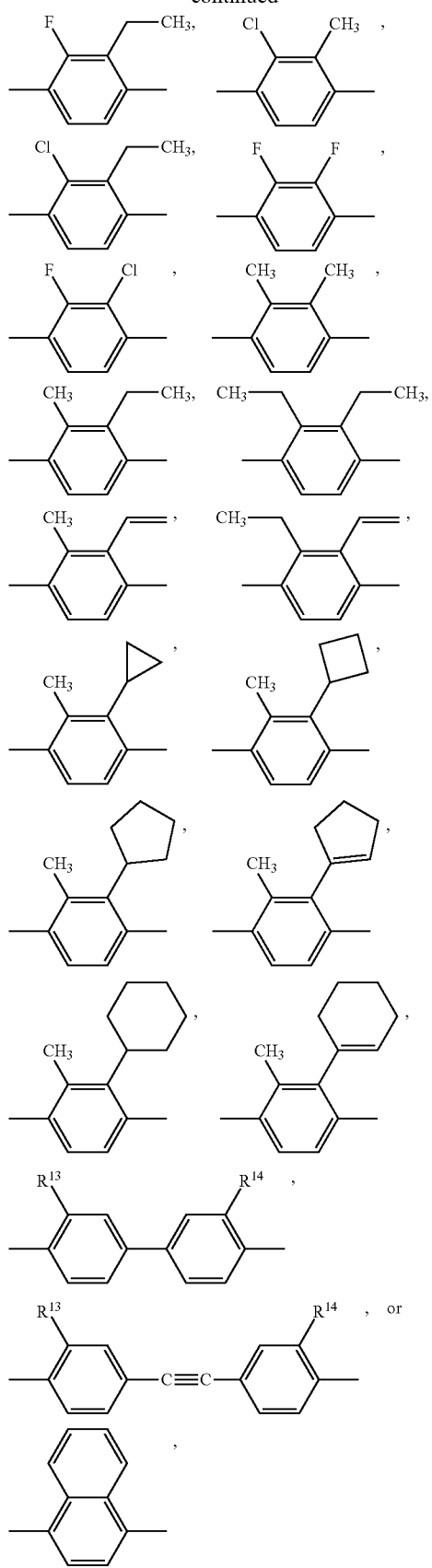

particularly preferably

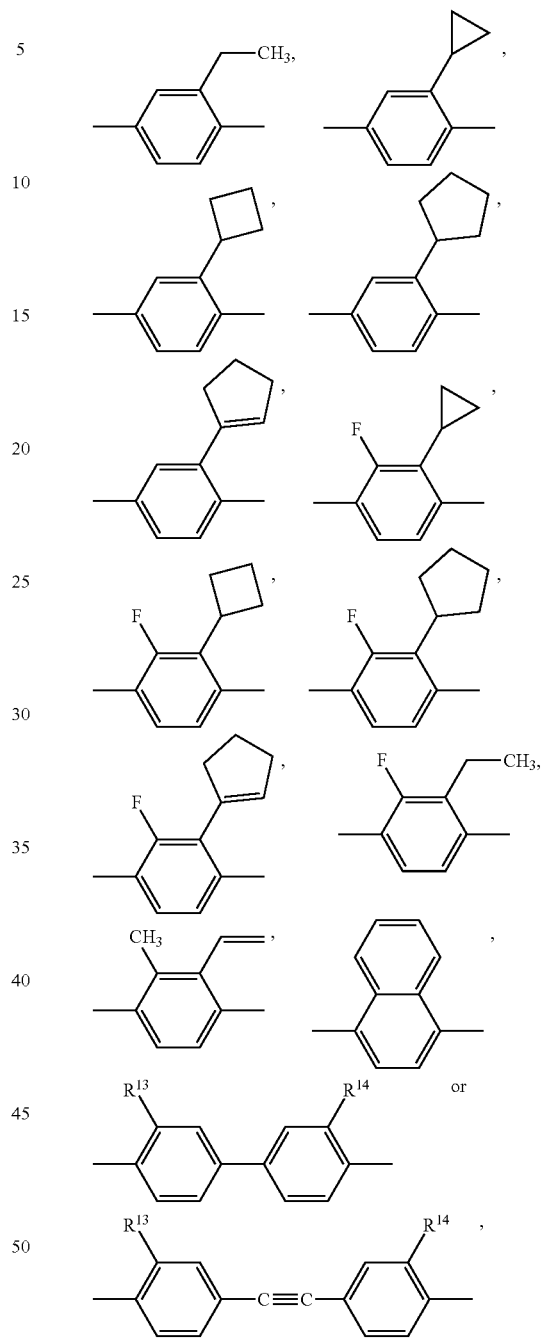

L[11] denotes alkyl having 1 to 6 C atoms, cycloalkyl having 3 to 6 C atoms or cycloalkenyl having 4 to 6 C atoms, preferably $CH_3$, $C_2H_5$, n-$C_3H_7$ (—$(CH_2)_2CH_3$), i-$C_3H_7$ (—$CH(CH_3)_2$), cyclopropyl, cyclobutyl, cyclopentyl, cyclohexyl, cyclopent-1-enyl or cyclohex-1-enyl, and particularly preferably $CH_3$, $C_2H_5$, cyclopropyl or cyclobutyl, X[11] denotes H, alkyl having 1 to 3 C atoms or halogen, preferably H, F or Cl, particularly preferably H or F and very particularly preferably F, R[11] to R[14] independently of one another, denote unfluorinated alkyl or unfluorinated alkoxy, each having 1 to 15

C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcycloalkenylalkyl, each having up to 15 C atoms, and alternatively one of $R^{13}$ and $R^{14}$ or both also denote H, preferably $R^{11}$ and $R^{12}$ independently of one another, denote unfluorinated alkyl or unfluorinated alkoxy, each having 1 to 7 C atoms, or unfluorinated alkenyl, unfluorinated alkenyloxy or unfluorinated alkoxyalkyl, each having 2 to 7 C atoms, particularly preferably $R^{11}$ denotes unfluorinated alkyl having 1 to 7 C atoms or unfluorinated alkenyl, unfluorinated alkenyloxy or unfluorinated alkoxyalkyl, each having 2 to 7 C atoms, and particularly preferably $R^{12}$ denotes unfluorinated alkyl or unfluorinated alkoxy, each having 1 to 7 C atoms, and preferably $R^{13}$ and $R^{14}$ denote H, unfluorinated alkyl having 1 to 5 C atoms, unfluorinated cycloalkyl or cycloalkenyl having 3 to 7 C atoms, unfluorinated alkylcyclohexyl or unfluorinated cyclohexylalkyl, each having 4 to 12 C atoms, or unfluorinated alkylcyclohexylalkyl having 5 to 15 C atoms, particularly preferably cyclopropyl, cyclobutyl, cyclopentyl or cyclohexyl, and very particularly preferably at least one of $R^{13}$ and $R^{14}$ denotes n-alkyl, particularly preferably methyl, ethyl or n-propyl, and the other denotes H or n-alkyl, particularly preferably H, methyl, ethyl or n-propyl;

$L^{21}$ denotes $R^{21}$ and, in the case where $Z^{21}$ and/or $Z^{22}$ denote trans-CH=CH— or trans-CF=CF—, alternatively also denotes $X^{21}$, $L^{22}$ denotes $R^{22}$ and, in the case where $Z^{21}$ and/or $Z^{22}$ denote trans-CH=CH— or trans-CF=CF—, alternatively also denotes $X^{22}$, $R^{21}$ and $R^{22}$ independently of one another, denote H, unfluorinated alkyl or unfluorinated alkoxy having 1 to 17, preferably 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl, $X^{21}$ and $X^{22}$ independently of one another, denote F or Cl, —CN, —NCS, —SF$_5$, fluorinated alkyl or alkoxy having 1 to 7 C atoms or fluorinated alkenyl, alkenyloxy or alkoxyalkyl having 2 to 7 C atoms, preferably —NCS, one of $Z^{21}$ and $Z^{22}$ denotes trans-CH=CH—, trans-CF=CF— or —C≡C— and the other, independently thereof, denotes trans-CH=CH—, trans-CF=CF— or a single bond, preferably one of them denotes —C≡C— or trans-CH=CH— and the other denotes a single bond, and

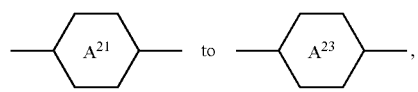

to independently of one another, denote

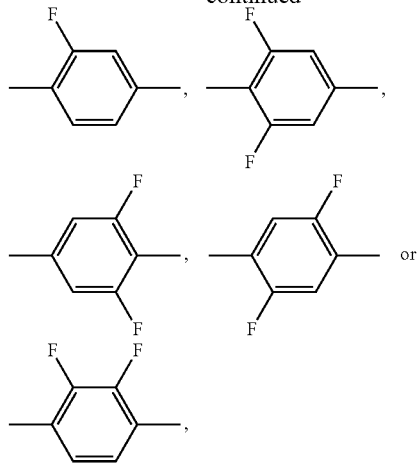

preferably

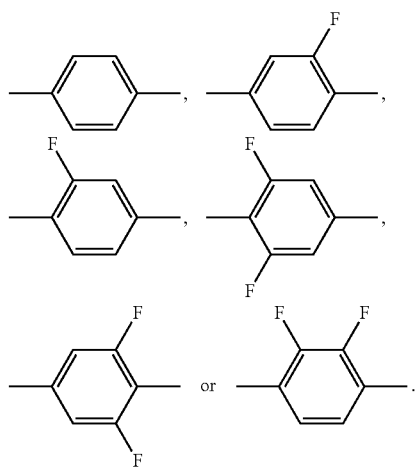

In a preferred embodiment the medium according to the invention comprises one or more compounds of formula A and one or more compounds of formula I and one or more compounds of formula II.

The media according to the invention have a comparatively high clearing point, high optical anisotropy ($\Delta n$) and clearly positive dielectric anisotropy. The undesired rotation of the compounds is restricted, making them particularly suitable for use in the gigahertz region. The relatively low loss factor in the microwave spectrum is advantageous. The media have a nematic phase over a broad temperature range. The totality of these properties make them particularly suitable for use in components for high-frequency technology, in particular in liquid-crystalline phase shifters.

The compounds of formula A are preferably selected from the compounds of the sub-formulae A-1 and A-2

A-1

-continued

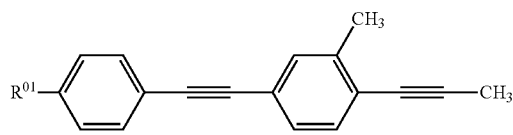

A-2 wherein $R^{01}$ denotes alkyl having 1 to 7 C atoms.

The compounds of the formula I are preferably compounds selected from the group of the compounds of the formulae I-1 to I-4

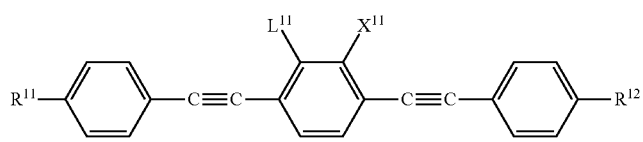

I-1

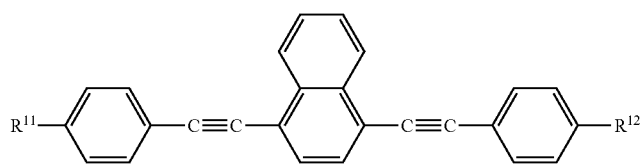

I-2

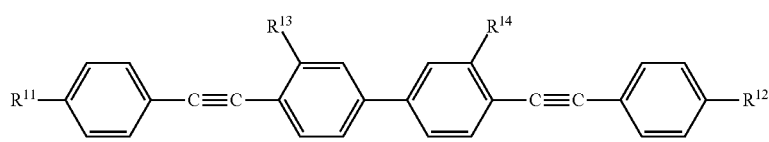

I-3

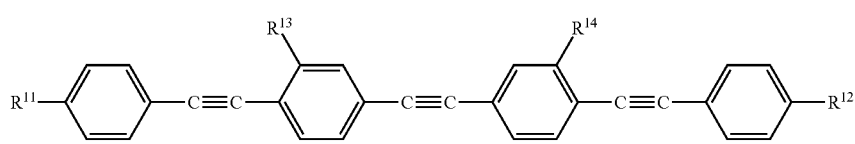

I-4 wherein $L^{11}$ denotes alkyl having 1 to 6 C atoms, alkenyl having 2 to 6 C atoms, cycloalkyl having 3 to 6 C atoms or cycloalkenyl having 4 to 6 C atoms, preferably $CH_3$, $C_2H_5$, n-$C_3H_7$ (—$(CH_2)_2CH_3$), i-$C_3H_7$ (—$CH(CH_3)_2$), —$CH=CH_2$, cyclopropyl, cyclobutyl, cyclopentyl, cyclohexyl, cyclopent-1-enyl or cyclohex-1-enyl, and particularly preferably $CH_3$, $C_2H_5$, cyclopropyl or cyclobutyl, $X^{11}$ denotes H, alkyl having 1 to 3 C atoms or halogen, preferably H, F or $CH_3$, and the other parameters have the respective meanings indicated above for formula I, and preferably $R^{11}$ denotes unfluorinated alkyl having 1 to 7 C atoms, and $R^{12}$ denotes unfluorinated alkyl having 1 to 7 C atoms or unfluorinated alkoxy having 1 to 7 C atoms.

In a particularly preferred embodiment of the present invention, the liquid-crystal medium comprises one or more compounds of the formula I-1, preferably selected from the group of the compounds of the formulae I-1a-1 to I-1a-12 and I-1b-1 to I-1b-12

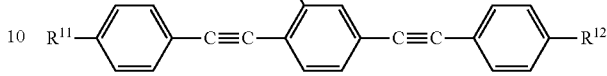

I-1a-1

-continued

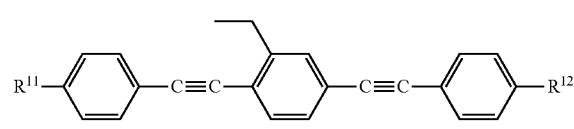

I-1a-2

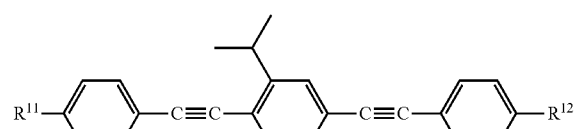

I-1a-3

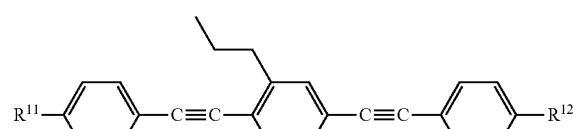

I-1a-4

-continued
I-1a-5
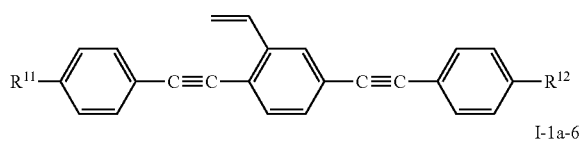
I-1a-6
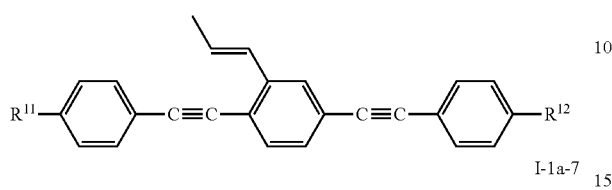
I-1a-7
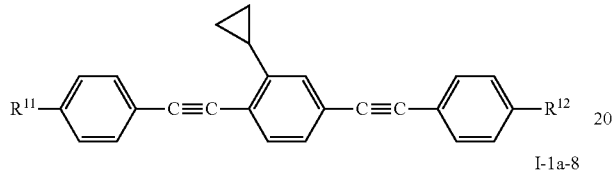
I-1a-8
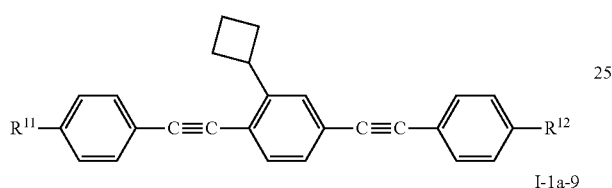
I-1a-9
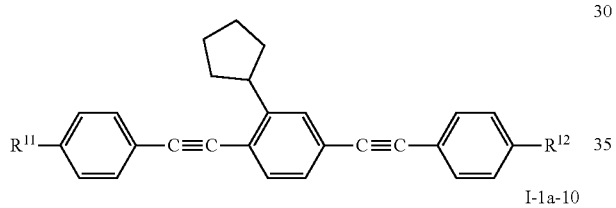
I-1a-10
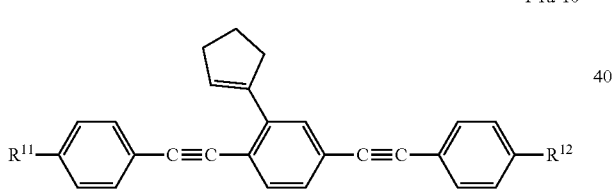
I-1a-11
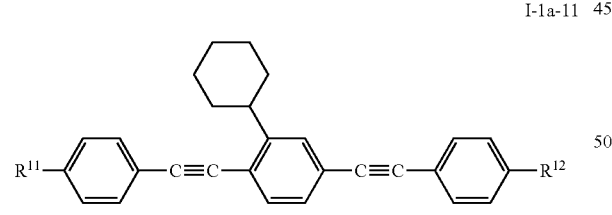
I-1a-12
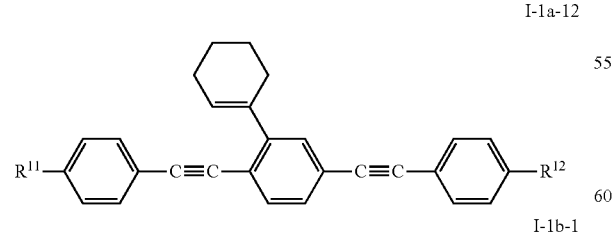
I-1b-1
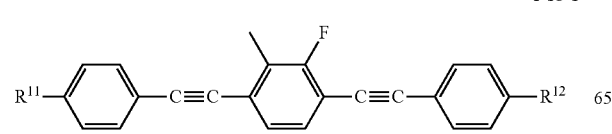
-continued
I-1b-2
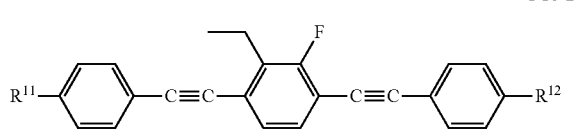
I-1b-3
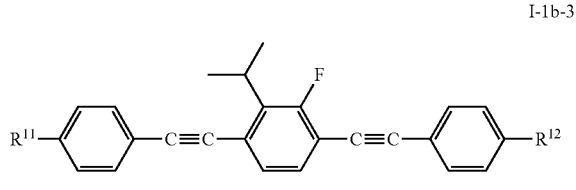
I-1b-4
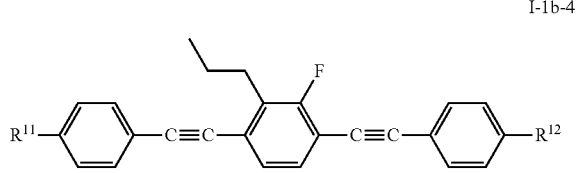
I-1b-5
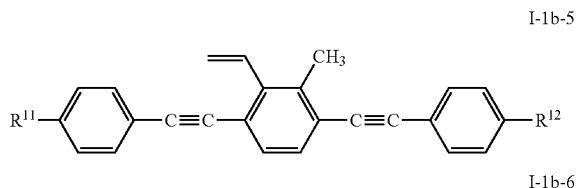
I-1b-6
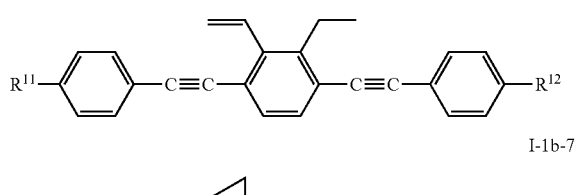
I-1b-7
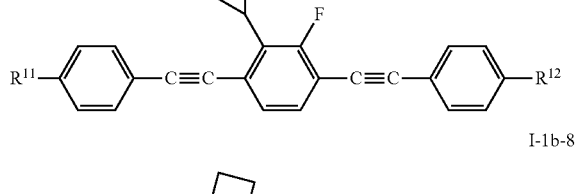
I-1b-8
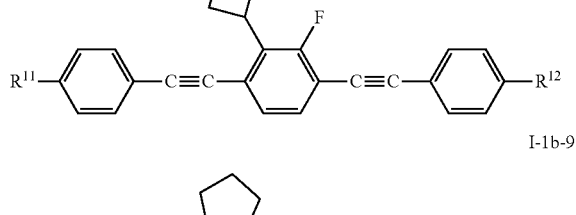
I-1b-9
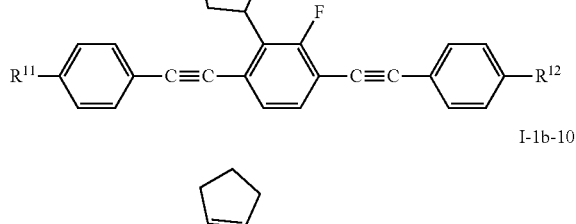
I-1b-10
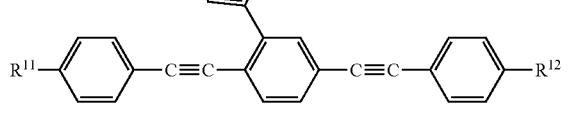

-continued

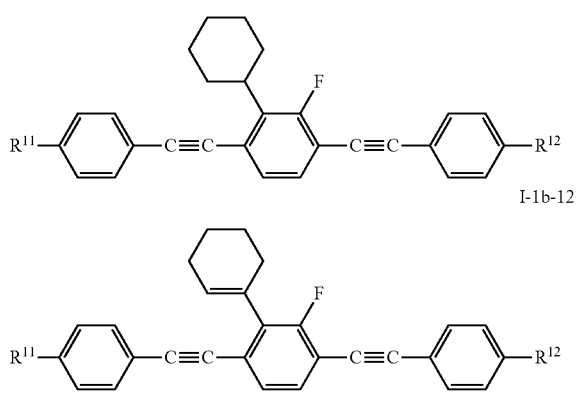
I-1b-11

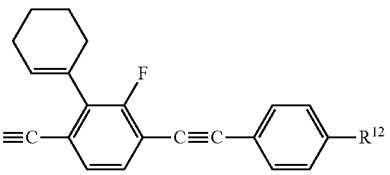
I-1b-12 in which the parameters have the meanings given above under formula I-1, and preferably $R^{11}$ and $R^{12}$, independently of one another, denote an alkyl radical having 2 to 7 C atoms, for example a propyl radical and a hexyl radical or in each case a propyl, butyl, pentyl or hexyl radical.

In a preferred embodiment of the present invention, the liquid-crystal medium comprises one or more compounds of the formula I selected from the group of the compounds of the formulae I-1a-2, I-1a-5, I-1a-7, I-1a-8, I-1a-9, I-1a-10, I-1b-5, I-1b-7, I-1b-8, I-1b-9, I-1b-10, where the parameters have the meanings given above, and particularly preferably $R^{11}$ and $R^{12}$, independently of one another, denote unfluorinated alkyl having 1 to 7 C atoms or unfluorinated alkoxy having 1 to 6 C atoms, especially preferably one of $R^{11}$ and $R^{12}$ denotes alkyl and the other denotes alkyl or alkoxy, and very particularly preferably $R^{11}$ and $R^{12}$ have different meanings from one another.

In a preferred embodiment of the present invention, the liquid-crystal medium comprises one or more compounds of the formula I-2, in which preferably $R^{11}$ and $R^{12}$, independently of one another, denote an alkyl radical having 2 to 7 C atoms, for example a propyl radical and a hexyl radical or in each case a propyl, butyl, pentyl or hexyl radical.

In a preferred embodiment of the present invention, the liquid-crystal medium comprises one or more compounds of the formula I-3, preferably selected from the group of the compounds of the formulae I-3a-1 to I-3a-3 and I-3b-1 to I-3b-3, preferably I-3a-2, I-3b-2,

I-3a-1

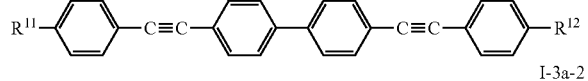
I-3a-2

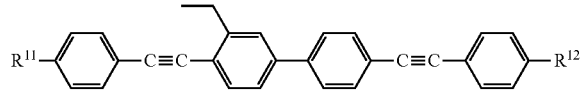
I-3a-3

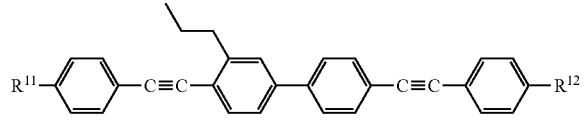
I-3b-1

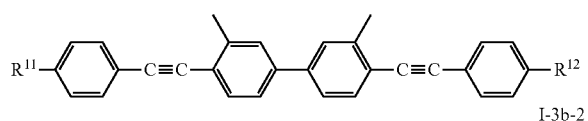
I-3b-2

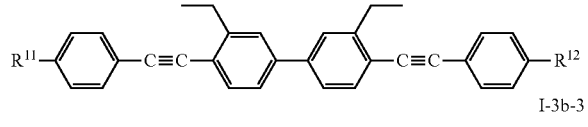
I-3b-3

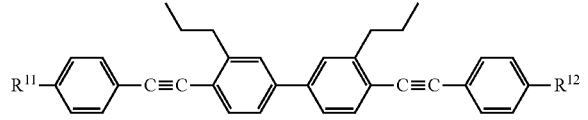

in which the parameters have the meanings given above under formula I-3, and preferably $R^{11}$ and $R^{12}$, independently of one another, denote an alkyl radical having 2 to 7 C atoms, for example a propyl radical and a hexyl radical or in each case a propyl, butyl, pentyl or hexyl radical.

In a preferred embodiment of the present invention, the liquid-crystal medium comprises one or more compounds of the formula I-4, preferably selected from the group of the compounds of the formulae I-4a-1 to I-4a-3 and I-4b-1 to I-4b-3, preferably I-4b-2,

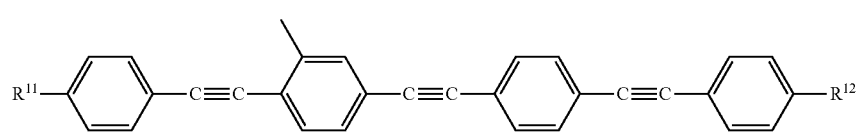
I-4a-1

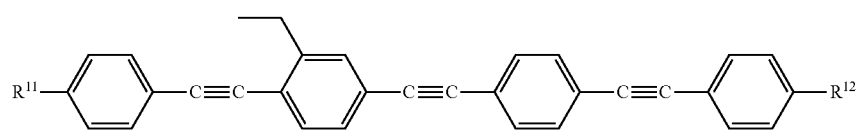
I-4a-2

-continued

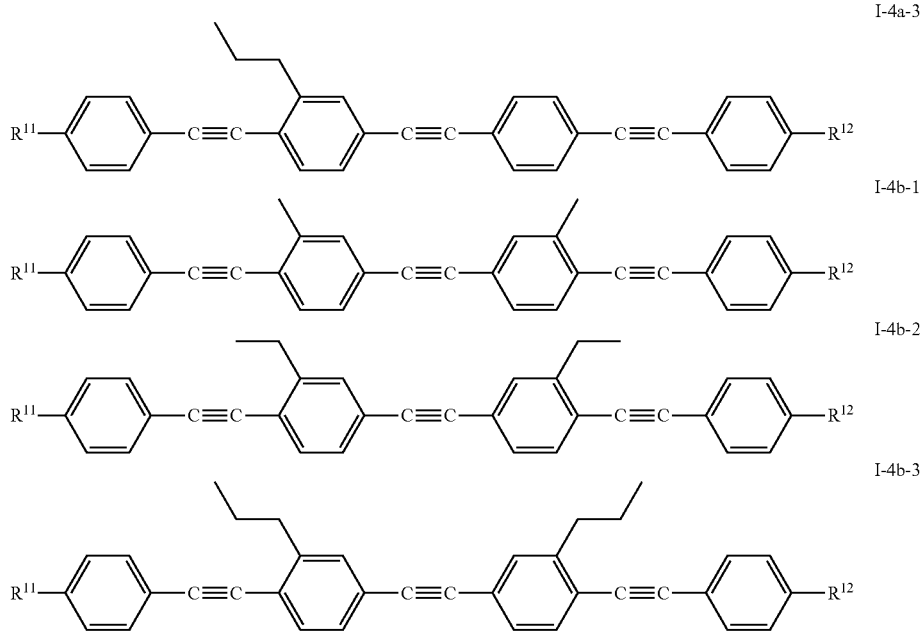

in which the parameters have the meanings given above under formula I-4, and preferably $R^{11}$ and $R^{12}$, independently of one another, denote an alkyl radical having 2 to 7 C atoms, for example a propyl radical and a hexyl radical or in each case a propyl, butyl, pentyl or hexyl radical.

The compounds of the formula II are preferably selected from the group of the compounds of the formulae II-1 to II-4:

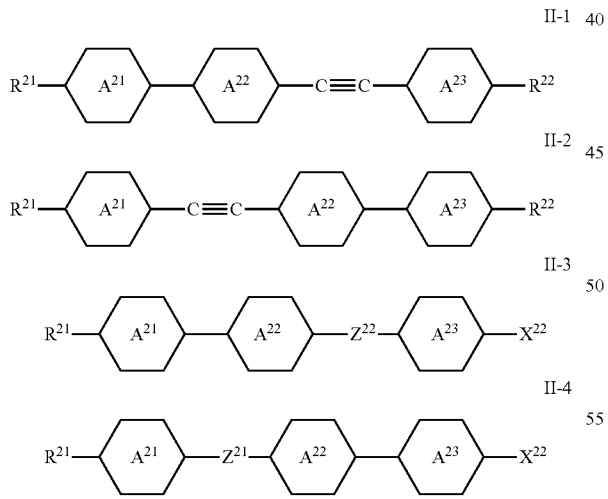

in which $Z^{21}$ and $Z^{22}$ denote trans-CH=CH— or trans-CF=CF—, preferably trans-CH=CH—, and the other parameters have the meaning given above under formula II and preferably $R^{21}$ and $R^{22}$, independently of one another, denote H, unfluorinated alkyl or alkoxy having 1 to 7 C atoms or unfluorinated alkenyl having 2 to 7 C atoms, $X^{22}$ denotes F, Cl, —CN or —NCS, preferably —NCS, and one of

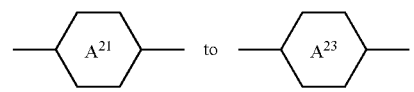

denotes

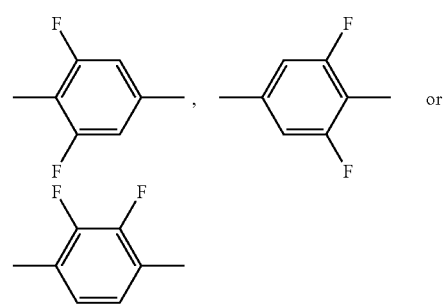

and the others, independently of one another, denote

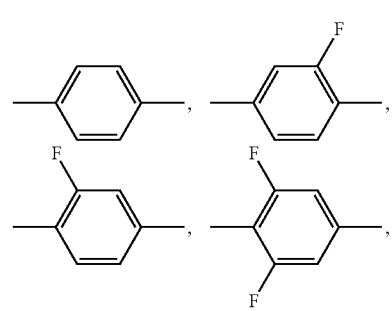

-continued

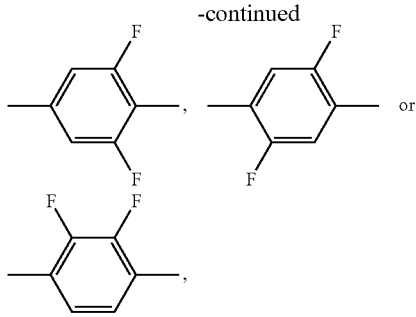

preferably

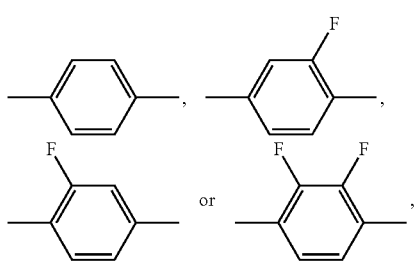

and preferably
$R^{21}$ denotes $C_nH_{2n+1}$ or $CH_2=CH-(CH_2)_Z$, and $R^{22}$ denotes $C_mH_{2m+1}$ or $O-C_mH_{2m+1}$ or $(CH_2)_Z-CH=CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2,
with the condition that compounds of formula II-2 are excluded from compounds of formula II-1.

The compounds of the formula II-1 are preferably selected from the group of the compounds of the formulae II-1a and II-1b:

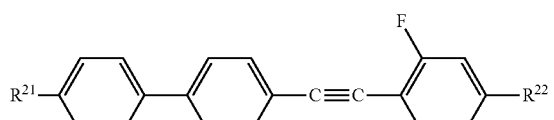

II-1a

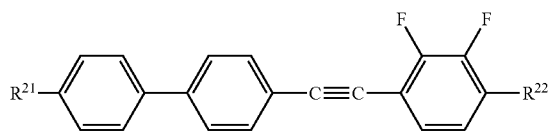

II-1b in which
$R^{21}$ has the meaning indicated above and preferably denotes $C_nH_{2n+1}$ or $CH_2=CH-(CH_2)_Z$, and $R^{22}$ has the meaning indicated above and preferably denotes $C_mH_{2m+1}$ or $O-C_mH_{2m+1}$ or $(CH_2)_Z-CH=CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{21}$ and $R^{22}$) here are, in particular, ($C_nH_{2n+1}$ and $C_mH_{2m+1}$) and ($C_nH_{2n+1}$ and $O-C_mH_{2m+1}$), in the case of formula II-1a particularly preferably ($C_nH_{2n+1}$ and $C_mH_{2m+1}$) and in the case of formula II-1b particularly preferably ($C_nH_{2n+1}$ and $O-C_mH_{2m+1}$).

The compounds of the formula II-3 are preferably compounds of the formula II-3a:

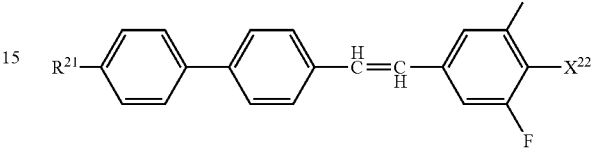

II-3a in which the parameters have the meaning given above under formula II-3 and preferably
$R^{21}$ has the meaning indicated above and preferably denotes $C_nH_{2n+1}$, in which
n denotes an integer in the range from 0 to 7, preferably in the range from 1 to 5, and
$X^{22}$ denotes —F, —Cl, —OCF$_3$, —CN or —NCS, particularly preferably —NCS.

The compounds of the formula II-4 are preferably compounds of the formula II-4a:

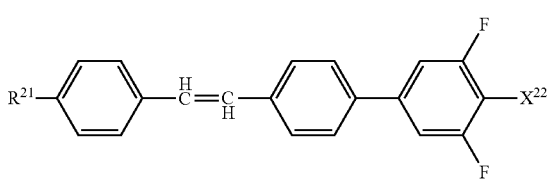

II-4a in which the parameters have the meaning given above under formula II-4 and preferably
$R^{21}$ has the meaning indicated above and preferably denotes $C_nH_{2n+1}$, in which
n denotes an integer in the range from 0 to 7, preferably in the range from 1 to 5, and
$X^{22}$ denotes —F, —Cl, —OCF$_3$, —CN or —NCS, particularly preferably —NCS.

Further preferred compounds of the formula II are the compounds of the following formulae:

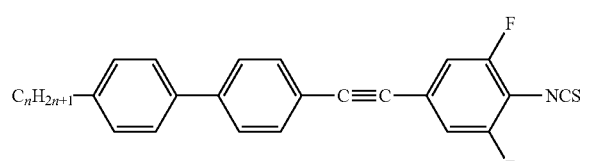

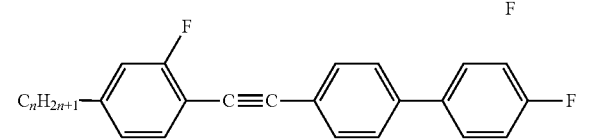

-continued
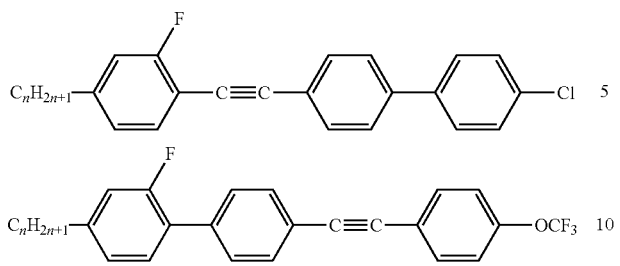
in which
n denotes an integer in the range from 0 to 7, preferably in the range from 1 to 5.
In a preferred embodiment of the present invention the liquid-crystal medium comprises one or more compounds of formula A'
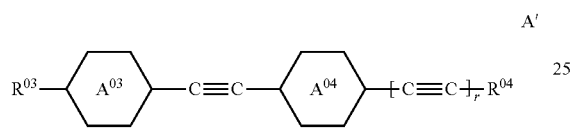
wherein
r denotes 0 or 1,
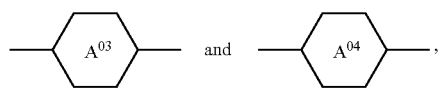
independently of one another, denote
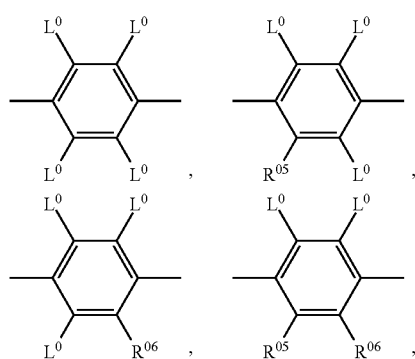
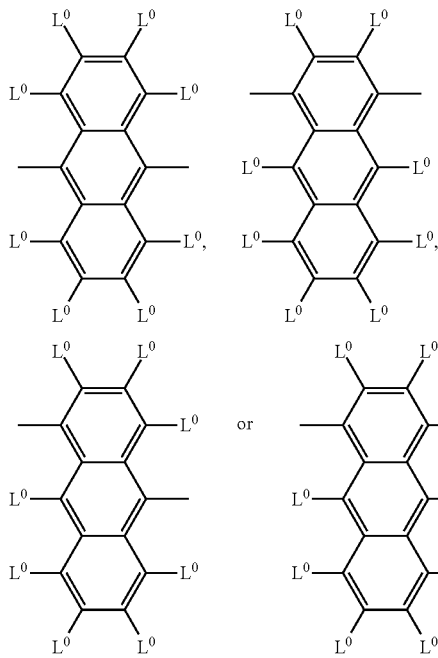
preferably
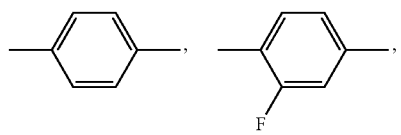
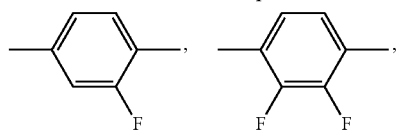
particularly preferably
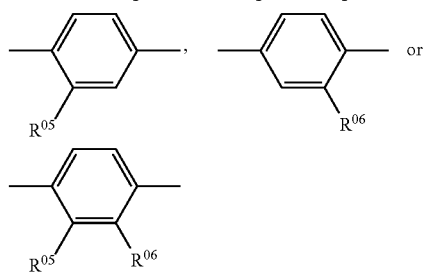
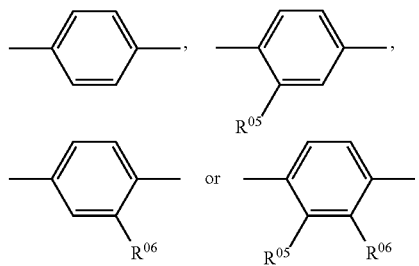

wherein Y denotes S or O,
and wherein in the 1,4-phenylene groups, one C—H group or a plurality of CH groups, preferably one CH group or two CH groups, preferably not adjacent, particularly preferably one CH group, may be replaced by N, and $L^0$ on each occurrence, independently of one another, denotes H, Br, Cl, F, —CN, —NCS, —SCN, $SF_5$, $C_1$-$C_{10}$ alkyl, $C_1$-$C_{10}$ alkoxy, $C_3$-$C_6$ cycloalkyl or a mono- or polyfluorinated $C_1$-$C_{10}$ alkyl or alkoxy group, preferably H or F, particularly preferably H.

$R^{03}$ and $R^{04}$ each, independently of one another, denote a halogenated or unsubstituted alkyl radical having 1 to 15 C atoms, where, in addition, one or more $CH_2$ groups in these radicals may each be replaced, independently of one another,
by —C≡C—, —CH=CH—, —CF=CF—, —CF=CH—, —CH=CF—, —(CO)O—, —O(CO)—, —(CO)—, —O— or —S— in such a way that O or S atoms are not linked directly to one another and, optionally, independently of one another, $R^{03}$ may also denote ethynyl (i.e. —C≡CH) and $R^{04}$ may also denote H, and $R^{05}$ and $R^{06}$ each, independently of one another, denote a halogenated or unsubstituted alkyl radical having 1 to 6, preferably having 1 to 4, particularly preferably having 1, 2 or 3, C atoms, where, in addition, one or more $CH_2$ groups in these radicals may each be replaced, independently of one another,
by —C≡C—, —CH=CH—, —CF=CF—, —CF=CH—, —CH=CF—, —(CO)O—, —O(CO)—, —(CO)—, —O— or —S— in such a way that O or S atoms are not linked directly to one another,
with the condition that compounds of formula A are excluded from compounds of formula A'.

According to the present invention the compounds of formula A' are preferably selected from compounds of the formulae A'-1 to A'-4:

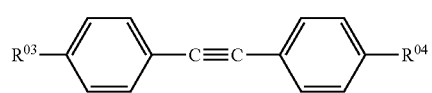
A'-1

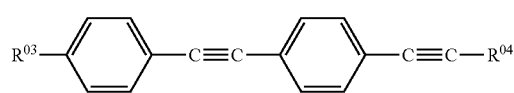
A'-2

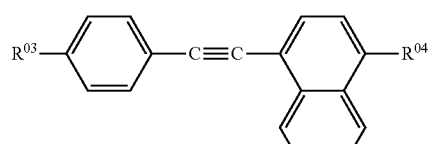
A'-3

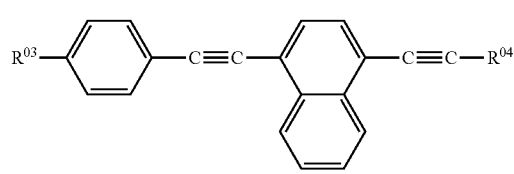
A'-4 wherein $R^{03}$ and $R^{04}$ have the meaning indicated above for formula A' and preferably, independently of each other, denote alkyl having 1 to 7 C atoms.

In a preferred embodiment of the present application, the liquid-crystal medium additionally comprises one or more compounds selected from the group of compounds of formulae III to VI:

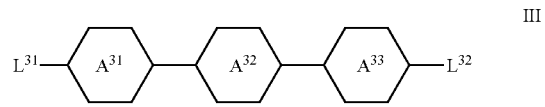
III

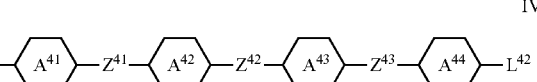
IV

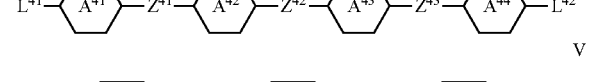
V

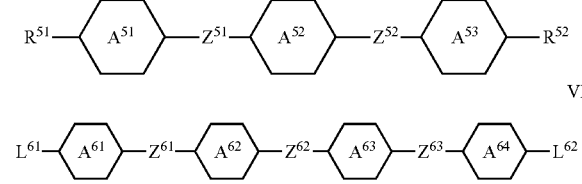
VI in which
$L^{31}$ denotes $R^{31}$ or $X^{31}$,
$L^{32}$ denotes $R^{32}$ or $X^{32}$,
$R^{31}$ and $R^{32}$, independently of one another, denote H, unfluorinated alkyl or unfluorinated alkoxy having 1 to 17, preferably 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl,
$X^{31}$ and $X^{32}$, independently of one another, denote H, F, Cl, —CN, —NCS, —$SF_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and

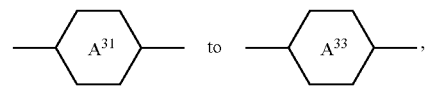

independently of one another, denote

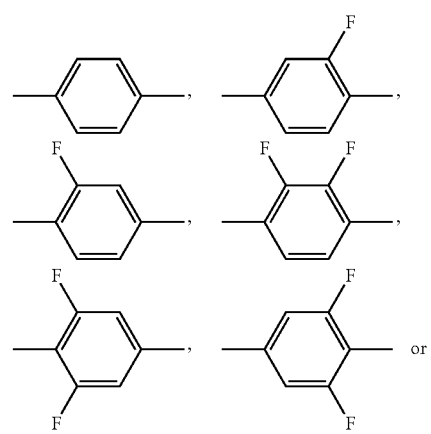

-continued

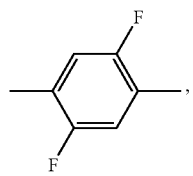

preferably

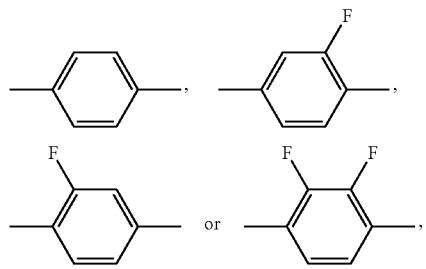

$L^{41}$ denotes $R^{41}$ or $X^{41}$, $L^{42}$ denotes $R^{42}$ or $X^{42}$, $R^{41}$ and $R^{42}$, independently of one another, denote H, unfluorinated alkyl or unfluorinated alkoxy having 1 to 17, preferably 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl, $X^{41}$ and $X^{42}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and $Z^{41}$ to $Z^{43}$, independently of one another, denote trans-CH=CH—, trans-CF=CF—, —C≡C— or a single bond, preferably one or more of them denote a single bond, particularly preferably all denote a single bond and

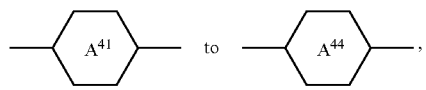

independently of one another, denote

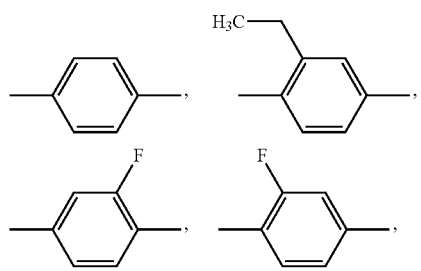

-continued

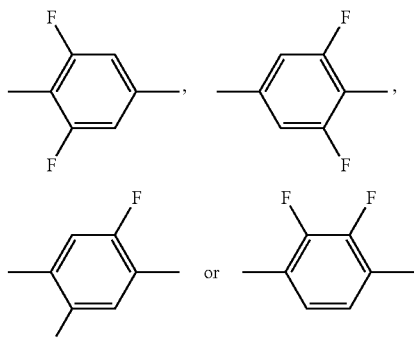

preferably

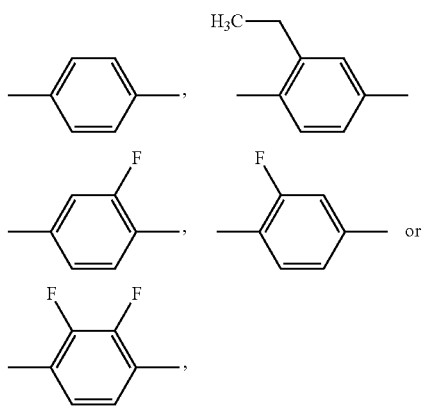

$R^{51}$ and $R^{52}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl, one of $Z^{51}$ and $Z^{52}$ denotes trans-CH=CH—, trans-CF=CF— or —C≡C— and the other one, independently thereof, denotes trans-CH=CH—, trans-CF=CF— or a single bond, preferably one of them denotes —C≡C— or trans-CH=CH— and the other one denotes a single bond, and

denotes

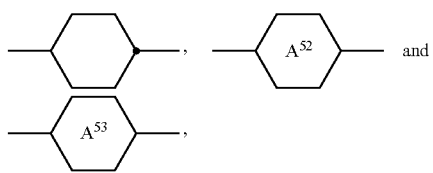

independently of one another, denote

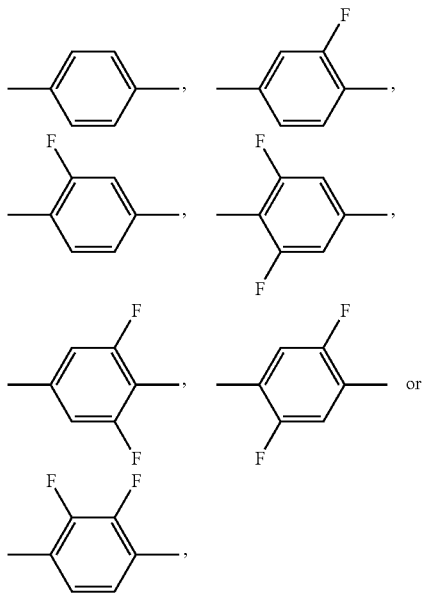

$L^{61}$ denotes $R^{61}$ or $X^{61}$,
$L^{62}$ denotes $R^{62}$ or $X^{62}$,
$R^{61}$ and $R^{62}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl,
$X^{61}$ and $X^{62}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and
$Z^{61}$ to $Z^{63}$, independently of one another, denote trans-CH=CH—, trans-CF=CF—, —C≡C— or a single bond, preferably one or more of them denotes a single bond, and particularly preferably all denote a single bond,

denotes

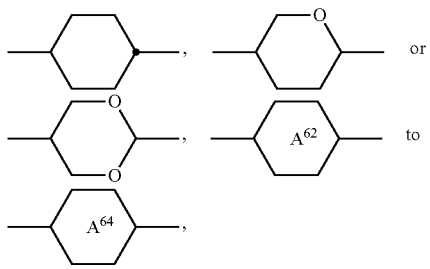

independently of one another, denote

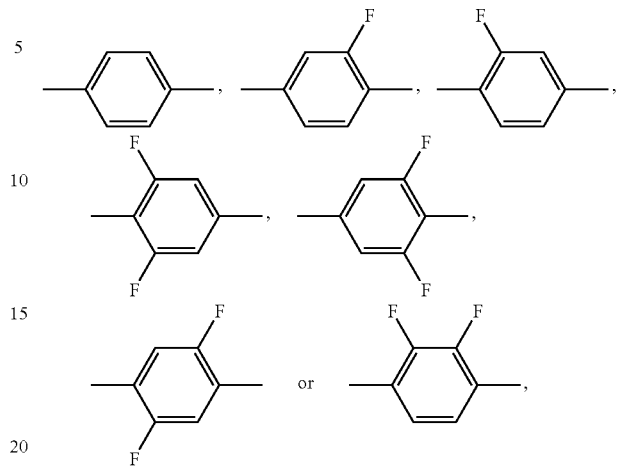

In a preferred embodiment of the present invention the compounds of formula III are preferably selected from the group of the compounds of the formulae III-1 to III-3, preferably of the formulae III-1 and III-2:

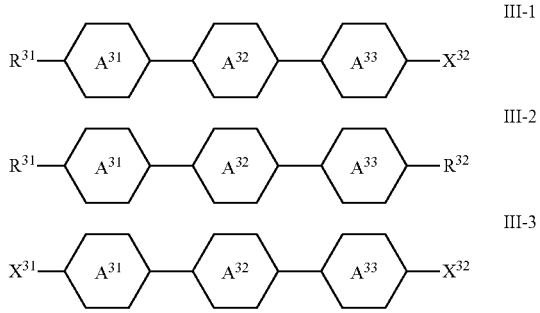

in which the parameters have the respective meanings indicated above for formula III and preferably $R^{31}$ denotes unfluorinated alkyl having 1 to 7 C atoms or unfluorinated alkenyl having 2 to 7 C atoms, $R^{32}$ denotes unfluorinated alkyl having 1 to 7 C atoms or unfluorinated alkenyl having 2 to 7 C atoms or unfluorinated alkoxy having 1 to 7 C atoms, $X^{31}$ and $X^{32}$, independently of one another, denote F, Cl, —OCF$_3$, —CF$_3$, —CN, —NCS or —SF$_5$, preferably F, Cl, —OCF$_3$ or —CN.

The compounds of the formula III-1 are preferably selected from the group of the compounds of the formulae III-1a to III-1d:

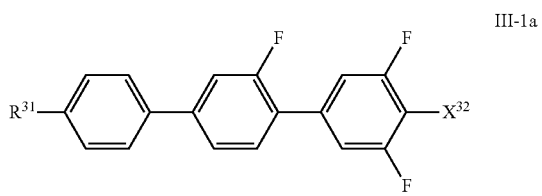

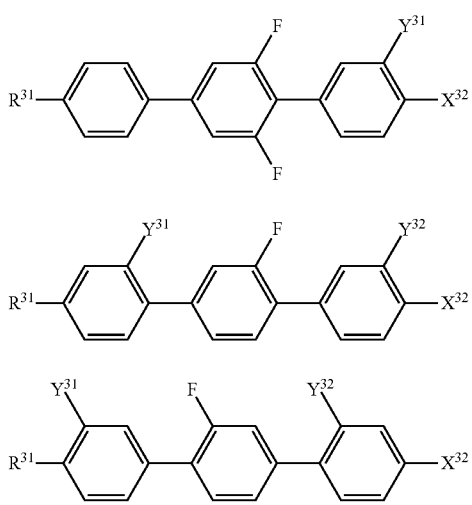

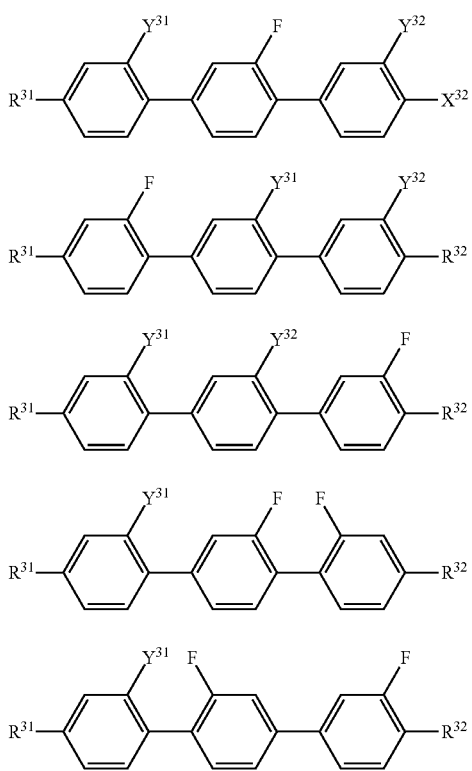

in which the parameters have the respective meanings indicated above for formula III-1 and in which $Y^{31}$ and $Y^{32}$, in each case independently of one another, denote H or F, and preferably $R^{31}$ denotes alkyl or alkenyl, and $X^{31}$ denotes F, Cl or —OCF$_3$.

The compounds of the formula III-2 are preferably selected from the group of the compounds of the formulae III-2a to III-2e and/or from the group of the compounds of the formulae III-2f and III-2g:

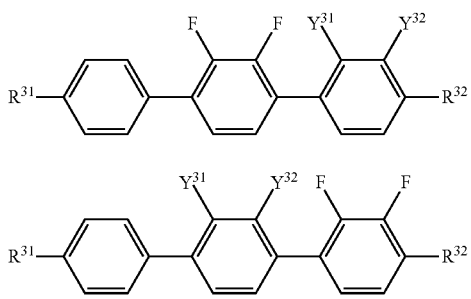

where in each case the compounds of the formula III-2a are excluded from the compounds of the formulae III-2b and III-2c, the compounds of the formula III-2b are excluded from the compounds of the formula III-2c and the compounds of the formula III-2g are excluded from the compounds of the formula III-2f, and in which the parameters have the respective meanings indicated above for formula III-1 and in which $Y^{31}$ and $Y^{32}$, in each case independently of one another, denote H or F, and preferably $R^{31}$, $R^{32}$ independently of each other, denote alkyl or alkenyl, and preferably one of $Y^{31}$ and $Y^{32}$ denotes H and the other denotes H or F, preferably likewise denotes H.

The compounds of the formula III-3 are preferably compounds of the formula III-3a:

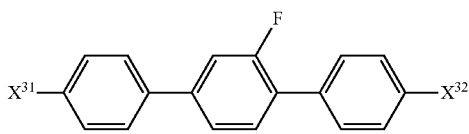

in which the parameters have the respective meanings indicated above for formula III-1 and in which preferably $X^{31}$ denotes F, Cl, preferably F, $X^{32}$ denotes F, Cl or —OCF$_3$, preferably —OCF$_3$.

In an even more preferred embodiment of the present invention, the compounds of the formula III are selected from the group of the compounds III-1a to III-1d, preferably selected from the group of the compounds III-1c and III-1d.

The compounds of the formula III-1a are preferably selected from the group of the compounds of the formulae III-1a-1 and III-1a-2:

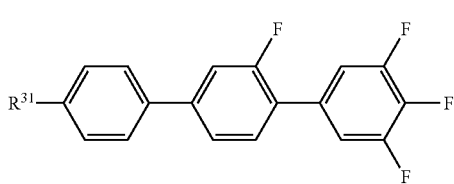

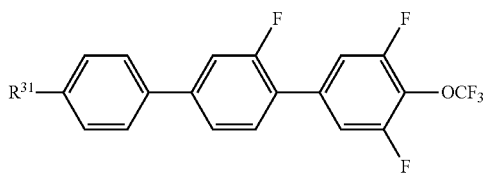

III-1a-2 in which
R$^{31}$ has the meaning indicated above and preferably denotes C$_n$H$_{2n+1}$, in which
n denotes an integer in the range from 0 to 7, preferably in the range from 1 to 5 and particularly preferably 3 or 7.

The compounds of the formula III-1b are preferably compounds of the formula III-1b-1:

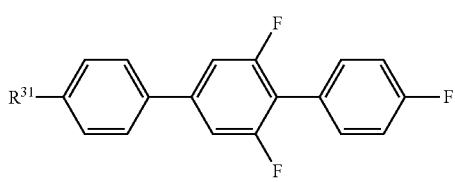

III-1b-1 in which
R$^{31}$ has the meaning indicated above and preferably denotes C$_n$H$_{2n+1}$, in which
n denotes an integer in the range from 0 to 15, preferably in the range from 1 to 7 and particularly preferably 1 to 5.

The compounds of the formula III-1c are preferably selected from the group of the compounds of the formulae III-1c-1 to III-1c-4, preferably selected from the group of the compounds of the formulae III-1c-2 and III-1c-4:

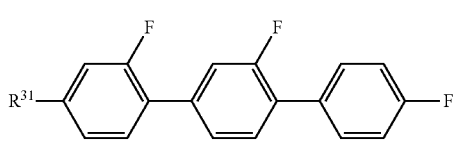

III-1c-1

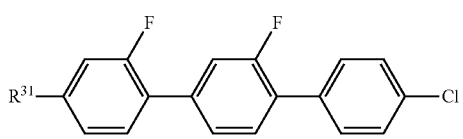

III-1c-2

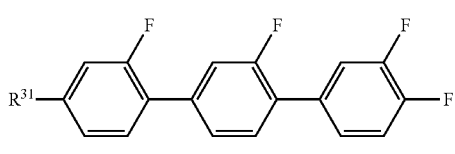

III-1c-3

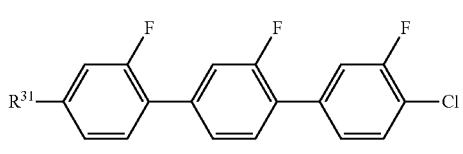

III-1c-4 wherein
R$^{31}$ has the meaning indicated above and preferably denotes C$_n$H$_{2n+1}$, in which n denotes an integer in the range from 0 to 15, preferably in the range from 1 to 7 and particularly preferably 1 to 5.

The compounds of the formula III-1d are preferably selected from the group of the compounds of the formulae III-1d-1 and III-1d-2, preferably the compound of the formula III-1d-2:

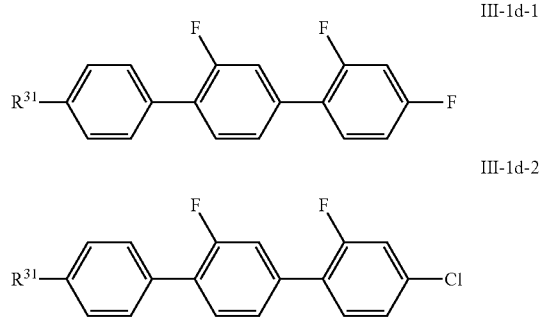

III-1d-1

III-1d-2 in which
R$^{31}$ has the meaning indicated above and preferably denotes C$_n$H$_{2n+1}$, in which
n denotes an integer in the range from 0 to 15, preferably in the range from 1 to 7 and particularly preferably 1 to 5.

The compounds of the formula III-2a are preferably selected from the group of the compounds of the formulae III-2a-1 and III-2a-2, preferably the compounds of the formula III-2a-1:

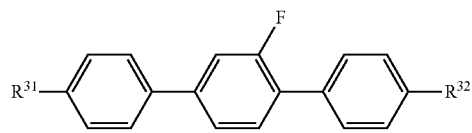

III-2a-1

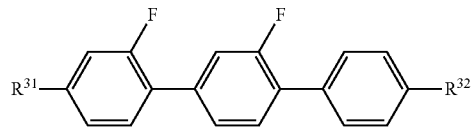

III-2a-2 in which
R$^{31}$ has the meaning indicated above and preferably denotes C$_n$H$_{2n+1}$ or CH$_2$=CH—(CH$_2$)$_z$, and
R$^{32}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

Preferred combinations of (R$^{31}$ and R$^{32}$), in particular in the case of formula III-2a-1, are (C$_n$H$_{2n+1}$ and C$_m$H$_{2m+1}$), (C$_n$H$_{2n+1}$ and O—C$_m$H$_{2m+1}$), (CH$_2$=CH—(CH$_2$)$_z$ and C$_m$H$_{2m+1}$), (CH$_2$=CH—(CH$_2$)$_z$ and O—C$_m$H$_{2m+1}$) and (C$_n$H$_{2n+1}$ and (CH$_2$)$_z$—CH=CH$_2$).

Preferred compounds of the formula III-2b are the compounds of the formula III-2b-1:

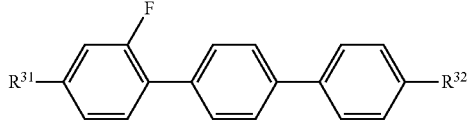

III-2b-1 in which
R$^{31}$ has the meaning indicated above and preferably denotes
C$_n$H$_{2n+1}$ or CH$_2$=CH—(CH$_2$)$_z$, and
R$^{32}$ has the meaning indicated above and preferably denotes
C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of (R$^{31}$ and R$^{32}$) here is, in particular, (C$_n$H$_{2n+1}$ and C$_m$H$_{2m+1}$).

Preferred compounds of the formula III-2c are the compounds of the formula III-2c-1:

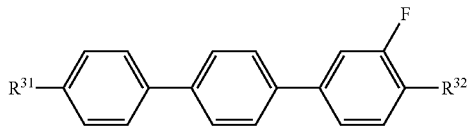

III-2c-1 in which
R$^{31}$ has the meaning indicated above and preferably denotes
C$_n$H$_{2n+1}$ or CH$_2$=CH—(CH$_2$)$_z$, and
R$^{32}$ has the meaning indicated above and preferably denotes
C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of (R$^{31}$ and R$^{32}$) here is, in particular, (C$_n$H$_{2n+1}$ and C$_m$H$_{2m+1}$).

Preferred compounds of the formula III-2d are the compounds of the formula III-2d-1:

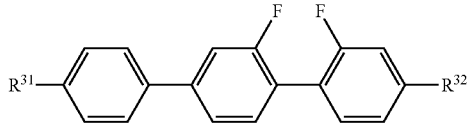

III-2d-1 in which
R$^{31}$ has the meaning indicated above and preferably denotes
C$_n$H$_{2n+1}$ or CH$_2$=CH—(CH$_2$)$_z$, and
R$^{32}$ has the meaning indicated above and preferably denotes
C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of (R$^{31}$ and R$^{32}$) here is, in particular, (C$_n$H$_{2n+1}$ and C$_m$H$_{2m+1}$).

Preferred compounds of the formula III-2e are the compounds of the formula III-2e-1:

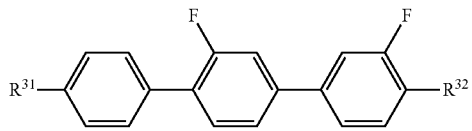

III-2e-1 in which
R$^{31}$ has the meaning indicated above and preferably denotes
C$_n$H$_{2n+1}$ or CH$_2$=CH—(CH$_2$)$_z$, and
R$^{32}$ has the meaning indicated above and preferably denotes
C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of (R$^{31}$ and R$^{32}$) here is, in particular, (C$_n$H$_{2n+1}$ and O—C$_m$H$_{2m+1}$).

Preferred compounds of the formula III-2f are the compounds of the formula III-2f-1:

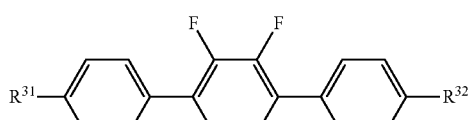

III-2f-1 in which
R$^{31}$ has the meaning indicated above and preferably denotes
C$_n$H$_{2n+1}$ or CH$_2$=CH—(CH$_2$)$_z$, and
R$^{32}$ has the meaning indicated above and preferably denotes
C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

Preferred compounds of the formula III-2g are the compounds of the formula III-2g-1:

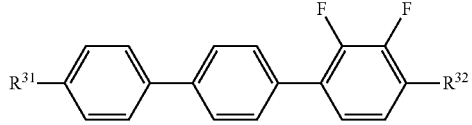

III-2g-1 in which
R$^{31}$ has the meaning indicated above and preferably denotes
C$_n$H$_{2n+1}$ or CH$_2$=CH—(CH$_2$)$_z$, and $R^{32}$ has the meaning indicated above and preferably denotes $C_mH_{2m+1}$ or $O-C_mH_{2m+1}$ or $(CH_2)_z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{31}$ and $R^{32}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $O-C_mH_{2m+1}$).

The compounds of the formula IV are preferably selected from the group of the compounds of the formulae IV-1 to IV-6:

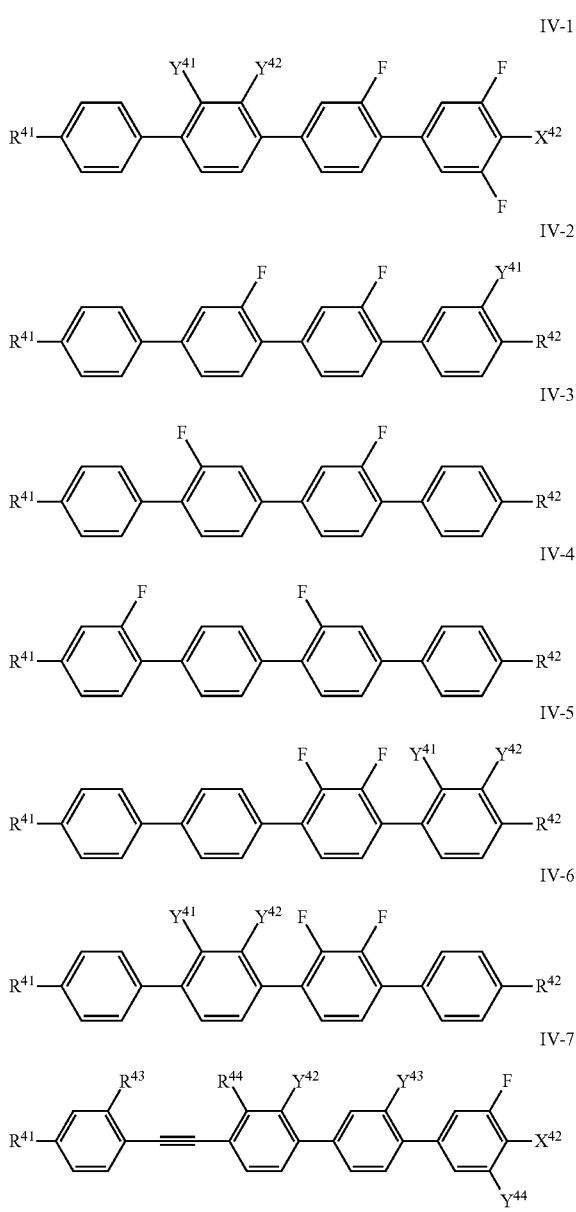

where the compounds of the formula IV-5 are excluded from the compounds of the formula IV-6, and
wherein
$R^{41}$ denotes unfluorinated alkyl or alkoxy, each having 1 to 7 C atoms, or unfluorinated alkenyl having 2 to 7 C atoms, $R^{42}$ denotes unfluorinated alkyl or alkoxy, each having 1 to 7 C atoms, or unfluorinated alkenyl having 2 to 7 C atoms, and $X^{42}$ denotes F, Cl or $-OCF_3$, preferably F, and $R^{43}$, $R^{44}$ denote H, or alkyl having 1 to 6 C atoms, preferably ethyl $Y^{41}$ to $Y^{44}$ independently of each other denote H of F, particularly preferably $R^{41}$ has the meaning indicated above and preferably denotes $C_nH_{2n}+_1$ or $CH_2=CH-(CH_2)_z$, and $R^{42}$ has the meaning indicated above and preferably denotes $C_mH_{2m+1}$ or $O-C_mH_{2m+1}$ or $(CH_2)_z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The compounds of the formula IV-1 are preferably selected from the group of the compounds of the formulae IV-1a to IV-1d:

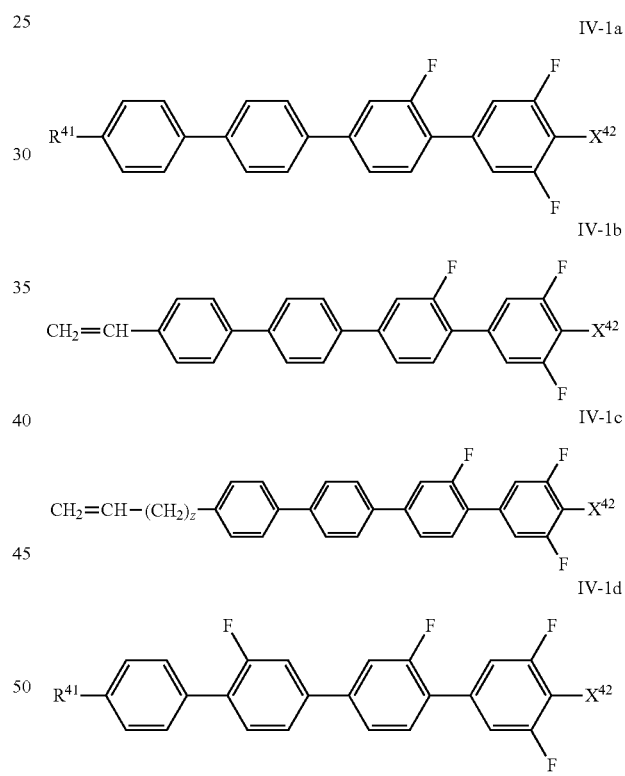

in which $X^{42}$ has the meaning given above for formula IV-2 and $R^{41}$ has the meaning indicated above and preferably denotes $C_nH_{2n}+1$, in which n denotes 1 to 7, preferably 2 to 6, particularly preferably 2, 3 or 5, and z denotes 0, 1, 2, 3 or 4, preferably 0 or 2, and $X^{42}$ preferably denotes F.

The compounds of the formula IV-2 are preferably selected from the group of the compounds of the formulae IV-2a and IV-2b, preferably of the formula IV-2a:

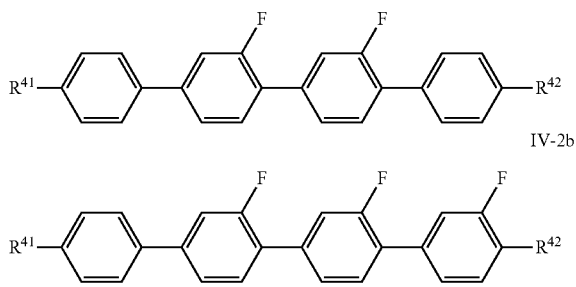

IV-2a

IV-2b in which
R$^{41}$ has the meaning indicated above and preferably denotes
C$_n$H$_{2n+1}$ or CH$_2$=CH—(CH$_2$)$_Z$, and
R$^{42}$ has the meaning indicated above and preferably denotes
C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{41}$ and R$^{42}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula IV-3 are preferably compounds of the formula IV-3a:

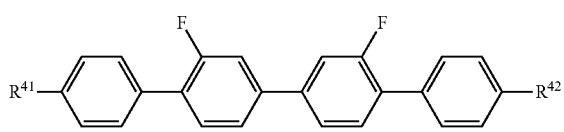

IV-3a in which
R$^{41}$ has the meaning indicated above and preferably denotes
C$_n$H$_{2n+1}$ or CH$_2$=CH—(CH$_2$)$_Z$, and
R$^{42}$ has the meaning indicated above and preferably denotes
C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{41}$ and R$^{42}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula IV-4 are preferably compounds of the formula IV-4a:

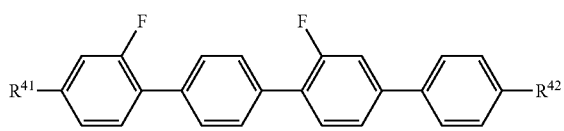

IV-4a in which
R$^{41}$ has the meaning indicated above and preferably denotes
C$_n$H$_{2n+1}$ or CH$_2$=CH—(CH$_2$)$_Z$, and
R$^{42}$ has the meaning indicated above and preferably denotes
C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{41}$ and R$^{42}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula IV-5 are preferably selected from the group of the compounds of the formulae IV-5a and IV-5b, preferably of the formula IV-5a:

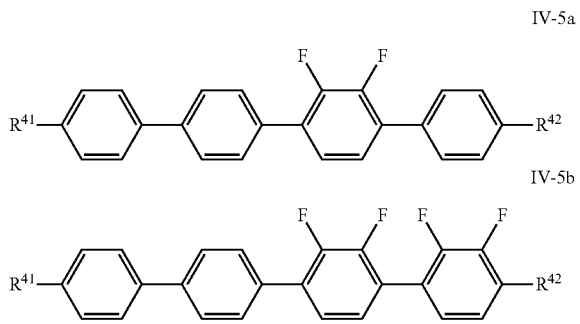

IV-5a

IV-5b in which
R$^{41}$ has the meaning indicated above and preferably denotes
C$_n$H$_{2n+1}$ or CH$_2$=CH—(CH$_2$)$_Z$, and
R$^{42}$ has the meaning indicated above and preferably denotes
C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{41}$ and R$^{42}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula IV-6 are preferably selected from the group of the compounds of the formulae IV-6a and IV-6b:

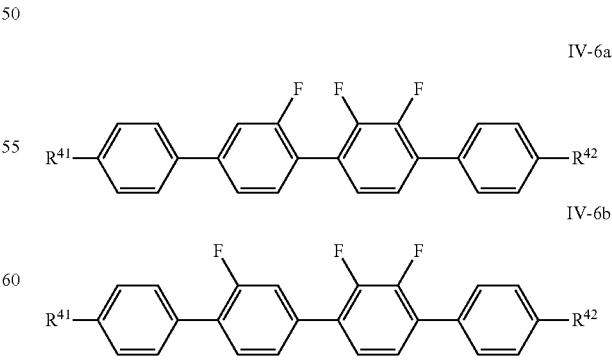

IV-6a

IV-6b in which
R$^{41}$ has the meaning indicated above and preferably denotes
C$_n$H$_{2n+1}$ or CH$_2$=CH—(CH$_2$)$_Z$, and $R^{42}$ has the meaning indicated above and preferably denotes $C_mH_{2m+1}$ or $O-C_mH_{2m+1}$ or $(CH_2)_z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{41}$ and $R^{42}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The compounds of the formula IV-7 are preferably compounds of the formula IV-7a to IV-7c

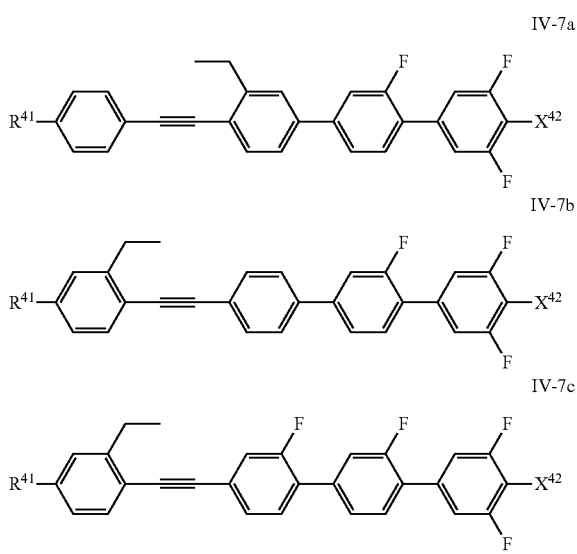

in which the parameters have the meaning given above and preferably $R^{41}$ has the meaning indicated above and preferably denotes $C_nH_{2n+1}$, and n denotes an integer in the range from 0 to 15, preferably in the range from 1 to 7 and particularly preferably 1 to 5, and $X^{42}$ preferably denotes F or Cl.

The compounds of the formula V are preferably selected from the group of the compounds of the formulae V-1 to V-3:

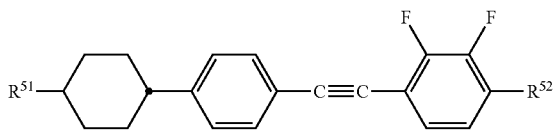

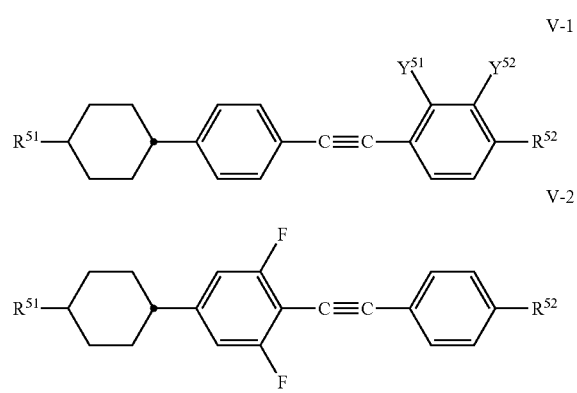

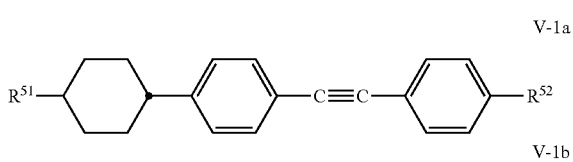

in which one of $Y^{51}$ and $Y^{52}$ denotes H and the other denotes H or F, and $R^{51}$ has the meaning indicated above and preferably denotes $C_nH_{2n+1}$ or $CH_2=CH-(CH_2)_z$, and $R^{52}$ has the meaning indicated above and preferably denotes $C_mH_{2m+1}$ or $O-C_mH_{2m+1}$ or $(CH_2)_z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{51}$ and $R^{52}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The compounds of the formula V-1 are preferably selected from the group of the compounds of the formulae V-1a to V-1c:

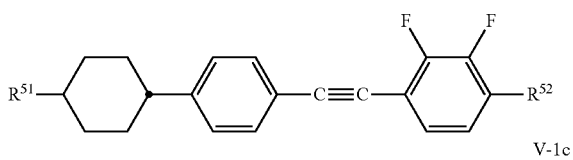

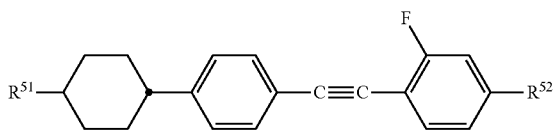

in which $R^{51}$ has the meaning indicated above and preferably denotes $C_nH_{2n+1}$ or $CH_2=CH-(CH_2)_z$, and $R^{52}$ has the meaning indicated above and preferably denotes $C_mH_{2m+1}$ or $O-C_mH_{2m+1}$ or $(CH_2)_z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{51}$ and $R^{52}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The compounds of the formula V-2 are preferably compounds of the formula V-2a:

V-2a

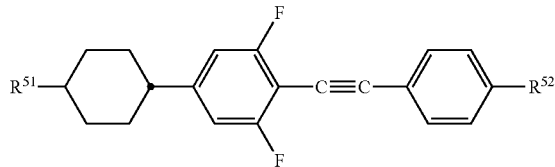

in which
R$^{51}$ has the meaning indicated above and preferably denotes C$_n$H$_{2n+1}$ or CH$_2$=CH—(CH$_2$)$_Z$, and
R$^{52}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{51}$ and R$^{52}$) here are, in particular, (C$_n$H$_{2n+1}$ and C$_m$H$_{2m+1}$), (C$_n$H$_{2n+1}$ and O—C$_m$H$_{2m+1}$) and (CH$_2$=CH—(CH$_2$)$_Z$ and C$_m$H$_{2m+1}$), particularly preferably (C$_n$H$_{2n+1}$ and C$_m$H$_{2m+1}$).

The compounds of the formula V-3 are preferably compounds of the formula V-3a:

V-3a

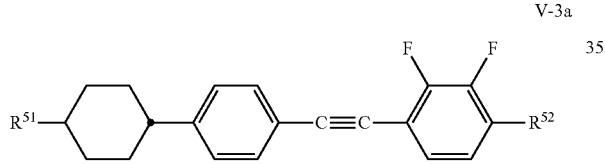

in which
R$^{51}$ has the meaning indicated above and preferably denotes C$_n$H$_{2n+1}$ or CH$_2$=CH—(CH$_2$)$_Z$, and
R$^{52}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{51}$ and R$^{52}$) here are, in particular, (C$_n$H$_{2n+1}$ and C$_m$H$_{2m+1}$) and (C$_n$H$_{2n+1}$ and O—C$_m$H$_{2m+1}$).

The compounds of the formula VI are preferably selected from the group of the compounds of the formulae VI-1 to VI-3:

VI-1

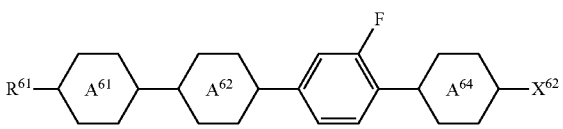

VI-2

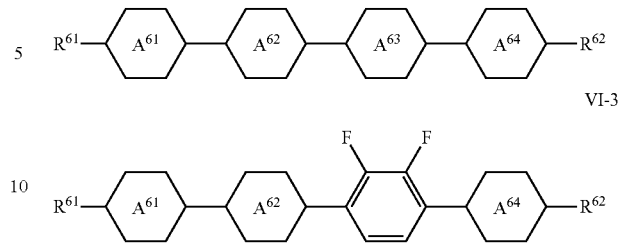

VI-3 in which the parameters have the respective meaning indicated above under formula VI and preferably
one of

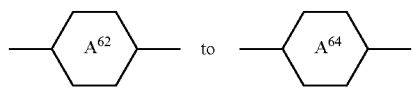

denotes

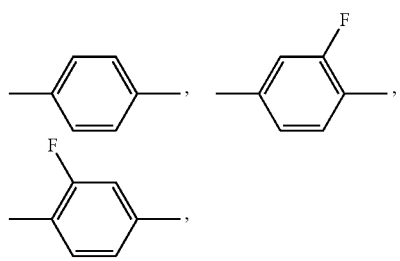

and
in which
R$^{61}$ has the meaning indicated above and preferably denotes C$_n$H$_{2n+1}$ or CH$_2$=CH—(CH$_2$)$_Z$, and
R$^{62}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{61}$ and R$^{62}$) here are, in particular, (C$_n$H$_{2n+1}$ and C$_m$H$_{2m+1}$) and (C$_n$H$_{2n+1}$ and O—C$_m$H$_{2m+1}$).

The compounds of the formula VI-1 are preferably selected from the group of the compounds of the formulae VI-1a to VI-1e:

VI-1a

-continued

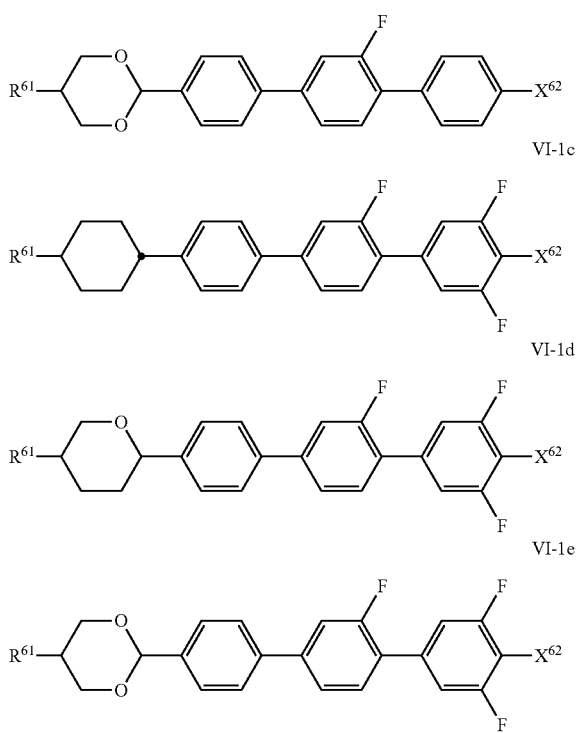

in which the parameters have the meaning given above and preferably
$R^{61}$ has the meaning indicated above and preferably denotes $C_nH_{2n+1}$, and
n denotes an integer in the range from 0 to 15, preferably in the range from 1 to 7 and particularly preferably 1 to 5, and
$X^{62}$ preferably denotes F or Cl.

The compounds of the formula VI-2 are preferably selected from the group of the compounds of the formulae VI-2a and VI-2b:

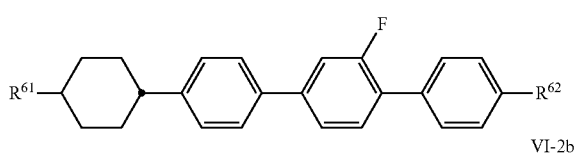

in which
$R^{61}$ has the meaning indicated above and preferably denotes $C_nH_{2n+1}$ or $CH_2$=CH—$(CH_2)_Z$, and
$R^{62}$ has the meaning indicated above and preferably denotes $C_mH_{2m+1}$ or O—$C_mH_{2m+1}$ or $(CH_2)_Z$—CH=$CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of ($R^{61}$ and $R^{62}$) here is, in particular, ($C_nH_{2n+1}$ and $C_mH_{2m+1}$).

The compounds of the formula VI-3 are preferably compounds of the formula VI-3a:

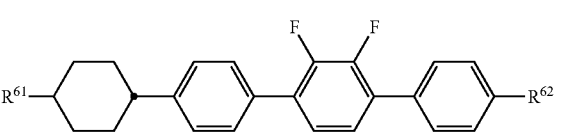

in which
$R^{61}$ has the meaning indicated above and preferably denotes $C_nH_{2n+1}$ or $CH_2$=CH—$(CH_2)_Z$, and
$R^{62}$ has the meaning indicated above and preferably denotes $C_mH_{2m+1}$ or O—$C_mH_{2m+1}$ or $(CH_2)_Z$—CH=$CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{91}$ and $R^{92}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and O—$C_mH_{2m+1}$).

The liquid crystal medium according to the present invention may optionally additionally comprise one or more biphenyl compounds selected from the group consisting of the following formulae VII-1 to VII-3:

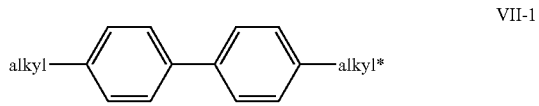

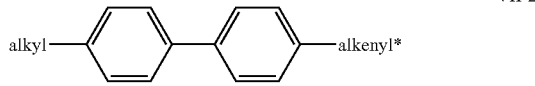

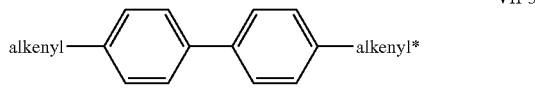

wherein
alkyl and alkyl* each, independently of one another, denote a straight-chain alkyl radical having 1-6 C atoms, and
alkenyl and
alkenyl* each, independently of one another, denote a straight-chain alkenyl radical having 2-6 C atoms.

Alkenyl and alkenyl* preferably denote $CH_2$=CH—, $CH_2$=CHCH$_2$CH$_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

The compounds of the formula VII-2 are particularly preferred.

The compounds of the formulae VII-1 to VII-3 are preferably selected from the group consisting of the following sub-formulae:

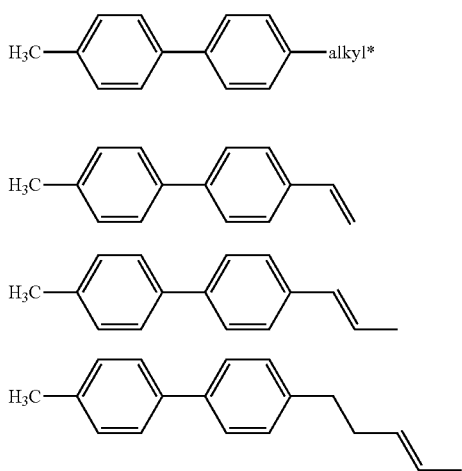

VII-1a

VII-2a

VII-2b

VII-2c in which alkyl* denotes an alkyl radical having 1-6 C atoms. The medium according to the invention particularly preferably comprises one or more compounds of the formulae VII-1a and/or VII-2c.

The liquid crystal medium according to the present invention may optionally additionally comprise one or more compounds of formula VIII

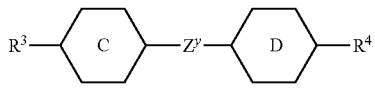

VIII in which the individual radicals have the following meanings:

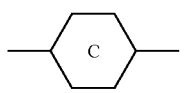

denotes

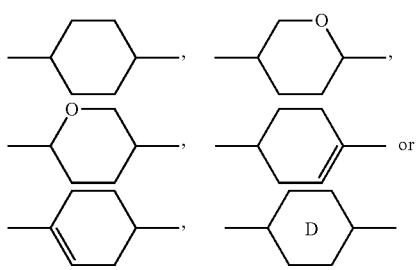

denotes

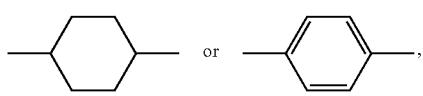

$R^3$ and $R^4$ each, independently of one another, denote alkyl having 1 to 12 C atoms, in which, in addition, one or two non-adjacent $CH_2$ groups may be replaced by $-O-$, $-CH=CH-$, $-CO-$, $-O-CO-$ or $-CO-O-$ in such a way that O atoms are not linked directly to one another, $Z^y$ denotes $-CH_2CH_2-$, $-CH=CH-$, $-CF_2O-$, $-OCF_2-$, $-CH_2O-$, $-OCH_2-$, $-CO-O-$, $-O-CO-$, $-C_2F_4-$, $-CF=CF-$, $-CH=CH-CH_2O-$ or a single bond, preferably a single bond.

The compounds of the formula VIII are preferably selected from the group consisting of the following sub-formulae:

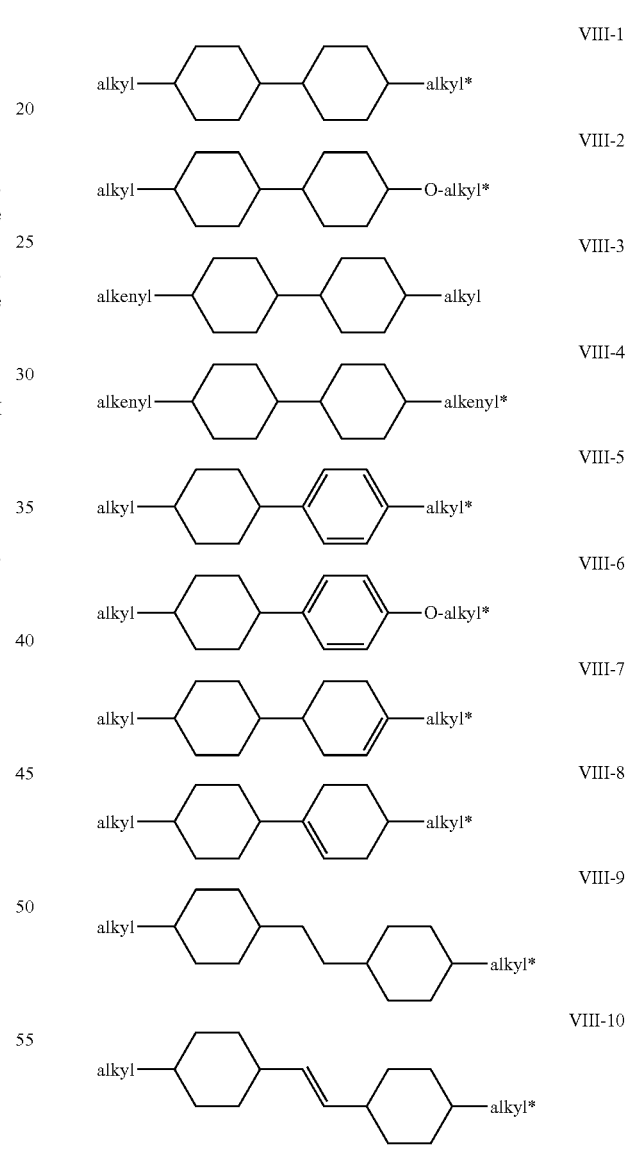

wherein alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Especially preferred are compounds of formula VIII-1 and VIII-3.

Particularly preferred compounds of formula VIII-1 are selected from the following sub-formulae:

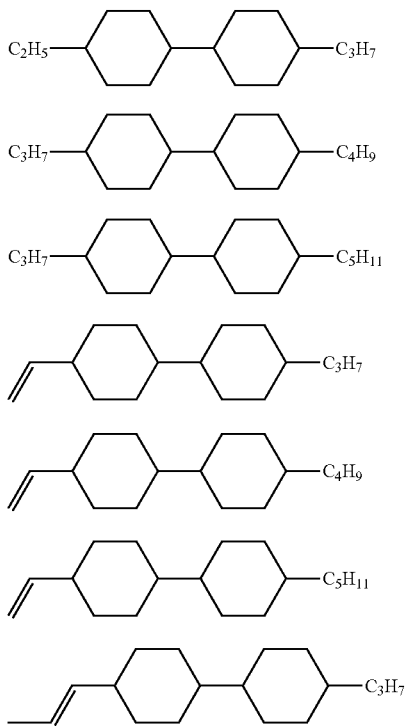

VIII-1a
VIII-1b
VIII-1c
VIII-3a
VIII-3b
VIII-3c
VIII-3d wherein the propyl, butyl and pentyl groups are straight-chain groups.

Most preferred are compounds of formula VIII-1a and VIII-3a.

In a preferred embodiment of the present invention the liquid-crystal medium comprises one or more compounds selected from the group of compounds of formulae IX-1 and IX-2

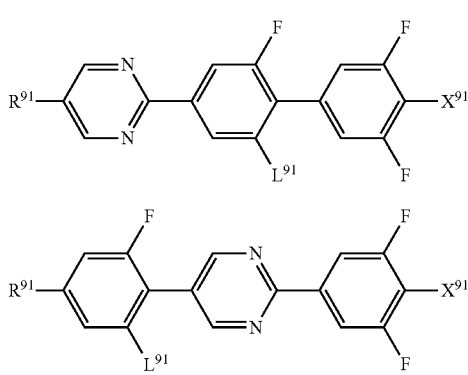

IX-1
IX-2 wherein
$R^{91}$ is alkyl, which is straight chain or branched, preferably has 1 to 20 C-atoms, is unsubstituted, mono- or poly-substituted by F, Cl or CN, preferably by F, and in which one or more $CH_2$ groups are optionally replaced, in each case independently from one another, by —O—, —S—, —$NR^{901}$—, —$SiR^{901}R^{902}$—, —CO—, —COO—, —OCO—, —OCO—O—, —S—CO—, —CO—S—, —$CY^{901}$=$CY^{902}$— or —C≡C— in such a manner that O and/or S atoms are not linked directly to one another, preferably n-alkyl or n-alkoxy with 1 to 9 C-atoms, preferably with 2 to 5 C-atoms, alkenyl, alkenyloxy or alkoxyalkyl with 2 to 9 C-atoms, preferably with 2 to 5 C-atoms or halogenated alkyl, halogenated alkenyl or halogenated alkoxy with preferably up to 9 C-atoms, preferably mono fluorinated, di-fluorinated or oligofluorinated alkyl, alkenyl or alkoxy with preferably up to 9 C-atoms, most preferably n-alkyl, n-alkoxy, alkenyl, alkenyloxy or alkoxyalkyl with preferably up to 9 C-atoms,
$L^{91}$ is H or F, preferably F,
$X^{91}$ is F, CN or $CF_3$, preferably F or CN, most preferably CN,
$Y^{901}$ and $Y^{902}$ are, independently of each other, F, Cl or CN, and alternatively one of them may be H, and
$R^{901}$ and $R^{902}$ are, independently of each other, H or alkyl with 1 to 12 C-atoms, According to the present invention the medium comprises one or more compounds of formula A and one or more compounds of formula I
or
one or more compounds of formula A and one or more compounds of formula II.

In a preferred embodiment of the present invention the medium comprises one or more compounds of formula A, one or more compounds of formula I and one or more compounds of formula II The liquid-crystal medium according to the present invention preferably comprise in total 5% to 80%, preferably 10% to 60% and particularly preferably 20% to 40%, of compounds of formula A.

The liquid-crystalline media according to the present invention preferably comprise a total concentration of 20% to 90%, more preferably 40% to 80% and very preferably 50% to 70%, of compounds of the formula I
or
a total concentration of 25% to 95%, more preferably 45% to 80% and very preferably 50% to 75%, of compounds of the formula II
or
a total concentration of 20% to 90%, more preferably 40% to 80% and very preferably 50% to 70%, of compounds of the formula I and II.

The liquid crystal media according to the present invention preferably comprise a total concentration of 40% to 100%, more preferably 50% to 99% and particularly preferably 70% to 95% of compounds of the formulae A and I or of compounds of the formulae A and II or of compounds of the formulae A and I and II.

In a preferred embodiment of the present invention the liquid crystal medium comprises compounds of formula A' in a total concentration of 5% to 70%, more preferably of 10% to 60% and particularly preferably of 20% to 45%.

In a preferred embodiment of the present invention the liquid crystal medium comprises compounds of formula III in a total concentration of 5% to 40%, more preferably of 10% to 30% and particularly preferably 18% to 25%.

In a preferred embodiment of the present invention the liquid crystal medium comprises compounds of formula IV in a total concentration of 0.5% to 10%, more preferably of 1% to 8% and particularly preferably of 2% to 5%.

In a preferred embodiment of the present invention the liquid crystal medium comprises compounds of formula V in a total concentration of 1% to 20%, more preferably of 2% to 15% and particularly preferably of 5% to 10%.

In a preferred embodiment of the present invention the liquid crystal medium comprises compounds of formula VI in a total concentration of 1% to 20%, more preferably of 2% to 15% and particularly preferably of 5% to 10%.

In a preferred embodiment of the present invention the liquid crystal medium comprises compounds of formula VI-7 in a total concentration of 11% to 60%, more preferably of 20% to 55% and particularly preferably of 30% to 45%.

In a preferred embodiment of the present invention the liquid crystal medium comprises compounds of formula VII in a total concentration of 1% to 20%, more preferably of 2% to 15% and particularly preferably of 5% to 10%.

In a preferred embodiment of the present invention the liquid crystal medium comprises compounds of formula VIII in a total concentration of 2% to 30%, more preferably of 5% to 25% and particularly preferably of 10% to 20%.

In a preferred embodiment of the present invention the liquid crystal medium comprises compounds of formula IX in a total concentration of 1% to 30% preferably of 2% to 20% and particularly preferably of 4 to 10%.

Furthermore it is preferred that the media according to the present invention comprise further mesogenic compounds known to the skilled person from the state of the art in order to adapt the mixture properties according to the particular application. Preferred compounds are listed in table D below.

In further preferred embodiments, the media according to the present invention comprise
one or more compounds of formula CCP-n-mVp, preferably CCP-V-1;
one or more compounds of the formula CPP-n-m;
one or more compounds selected from the group of compounds of the formulae formula PZP-n-N and PZG-n-N, preferably PZG-4-N;
one or more compounds of the formula PVG-n-S, preferably PVG-3-S
one or more compounds of the formula PGUQU-n-F, preferably selected from the compounds PGUQU-3-F, PGUQU-4-F and PGUQU-5-F.

Preferred components which comprise a liquid-crystal medium or at least one compound in accordance with the invention are phase shifters, varactors, antenna arrays (for example for radio, mobile communications, microwave/radar and other data transmission), 'matching circuit adaptive filters' and others. Preference is given to components for high-frequency technology, as defined above. Preference is also given to components which can be modulated by different applied electrical voltages. Very particularly preferred components are tuneable phase shifters. In preferred embodiments, a plurality of phase shifters are functionally connected, giving, for example, a phase-controlled group antenna, generally referred to as 'phased array' antenna. A group antenna uses the phase shift of the transmitting or receiving elements arranged in a matrix in order to achieve bundling through interference. A parallel arrangement of phase shifters in row or grid form enables the construction of a so-called 'phased array', which can serve as tuneable or passive transmitting or receiving antenna for high frequencies (for example gigahertz region). Phased-array antennae according to the invention have a very broad usable reception cone.

Preferred applications are radar installations and data transmission equipment on manned or unmanned vehicles from the automobile, shipping, aircraft, space travel and satellite technology areas.

For the production of suitable components for high-frequency technology, in particular suitable phase shifters, a liquid-crystalline medium according to the invention is typically introduced into rectangular cavities having a thickness of less than 1 mm, a width of several millimetres and a length of several centimetres. The cavities have opposing electrodes mounted along two long sides. Such arrangements are familiar to the person skilled in the art. Through application of a variable voltage, the dielectric properties of the liquid-crystalline medium can be tuned during operation of the antenna in order to set different frequencies or directions of an antenna.

The abbreviations (acronyms) are explained and listed in tables A to D below.

All concentrations are given in % by weight based on the mixture as a whole.

The liquid-crystal media in accordance with the present invention preferably have a clearing point of 90° C. or more, more preferably 120° C. or more, particularly preferably 150° C. or more.

The nematic phase of the media in accordance with the invention preferably extends at least from 00° C. or less to 90° C. or more, more preferably at least from −10° C. or less to 120° C. or more, particularly preferably at least from −20° C. or less to 150° C. or more.

The expression "to have a nematic phase" here means on the one hand that no smectic phase and no crystallisation are observed at low temperatures at the corresponding temperature and on the other hand that no clearing occurs on heating from the nematic phase. The investigation at low temperatures is carried out in a flow viscometer at the corresponding temperature and checked by storage in test cells having a layer thickness of 5 µm for at least 100 hours. At high temperatures, the clearing point is measured in capillaries by conventional methods.

The $\Delta\varepsilon$ of the liquid-crystal medium in accordance with the invention, at 1 kHz and 20° C., is preferably 1 or more, more preferably 2 or more and very preferably 3 or more.

In some embodiments, however, liquid crystals having a negative value of the dielectric anisotropy can also advantageously be used.

The $\Delta n$ of the liquid-crystal media in accordance with the present invention, at 589 nm ($Na_D$) and 20° C., is preferably in the range from 0.200 or more to 0.900 or less, more preferably in the range from 0.250 or more to 0.700 or less, even more preferably in the range from 0.270 or more to 0.500 or less.

Furthermore, the liquid-crystal media according to the invention are characterised by high anisotropy values in the microwave range. The birefringence at about 8.3 GHz is, for example, preferably 0.14 or more, particularly preferably 0.15 or more, particularly preferably 0.20 or more, particularly preferably 0.25 or more and very particularly preferably 0.30 or more. In addition, the birefringence is preferably 0.80 or less.

The material quality $\eta(\mu\text{-waves})/\tan(\delta)$ of the preferred liquid-crystal materials is 5 or more, preferably 10 or more, and particularly preferably 20 or more.

In the present application, the expression dielectrically positive describes compounds or components where $\Delta\varepsilon > 2.0$, dielectrically neutral describes those where $-1.5 \leq \Delta\varepsilon \leq 2.0$ and dielectrically negative describes those where $\Delta\varepsilon < -1.5$. As is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 µm. The voltage applied is a rectangular wave having a frequency of 1 kHz and an effective value of typically 0.5 V to 1.0 V, but it is always selected to be below the capacitive threshold of the respective test mixture.

$\Delta\varepsilon$ is defined as $(\varepsilon_\parallel - \varepsilon_\perp)$, while $\varepsilon_{ave.}$ is $(\varepsilon_\parallel + 2\varepsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\varepsilon$) is determined at a frequency of 1 kHz. The threshold voltages, as well as all other electro-optical properties, are determined using test cells produced at Merck KGaA, Germany. The test cells for the determination of $\Delta\varepsilon$ have a cell thickness of approximately 20 µm. The electrode is a circular ITO electrode having an area of 1.13 cm² and a guard ring. The orientation layers are SE-1211 from Nissan Chemicals, Japan, for homeotropic orientation ($\varepsilon_\parallel$) and polyimide AL-1054 from Japan Synthetic Rubber, Japan, for homogeneous orientation ($\varepsilon_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The liquid-crystalline media are investigated with respect to their properties in the microwave frequency range as described in A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548.

Compare in this respect also A. Gaebler, F. Gölden, S. Müller, A. Penirschke and R. Jakoby "Direct Simulation of Material Permittivities . . . ", 12MTC 2009—International Instrumentation and Measurement Technology Conference, Singapore, 2009 (IEEE), pp. 463-467, and DE 10 2004 029 429 A, in which a measurement method is likewise described in detail.

The dielectric anisotropy in the microwave region is defined as $$\Delta\varepsilon_r \equiv (\varepsilon_{r,\parallel} - \varepsilon_{r,\perp}).$$

The tunability ($\tau$) is defined as $$\tau \equiv (\Delta\varepsilon_r / \varepsilon_{r,\parallel}).$$

The material quality ($\eta$) is defined as $$\eta \equiv (\tau / \tan\delta_{249\ r,max}), \text{ where}$$

the maximum dielectric loss is $$\tan\delta_{\varepsilon_r,max} \equiv \max.\{\tan\delta_{\varepsilon_r,\perp}; \tan\delta_{\varepsilon_r,\parallel}\}.$$

The liquid crystal is introduced into a polytetrafluoroethylene (PTFE) capillary. The capillary has an internal radius of 180 µm and an external radius of 350 µm. The effective length is 2.0 cm. The filled capillary is introduced into the centre of the cavity with a resonance frequency of 19 GHz. This cavity has a length of 6.6 mm, a width of 7.1 mm and a height of 3.6 mm. The input signal (source) is then applied, and the result of the output signal is recorded using a commercial vector network analyser.

The change in the resonance frequency and the Q factor between the measurement with the capillary filled with the liquid crystal and the measurement without the capillary filled with the liquid crystal is used to determine the dielectric constant and the loss angle at the corresponding target frequency by means of equations 10 and 11 in A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla. The alignment of the magnets is set correspondingly and then rotated correspondingly through 90°.

The term "alkyl" preferably encompasses straight-chain and branched alkyl groups having 1 to 15 carbon atoms, in particular the straight-chain groups methyl, ethyl, propyl, butyl, pentyl, hexyl and heptyl. Groups having 2 to 10 carbon atoms are generally preferred.

The term "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxyalkyl" preferably encompasses straight-chain radicals of the formula $C_nH_{2n+1}$—O—$(CH_2)_m$, wherein n and m each, independently of one another, denote 1 to 10. Preferably, n is 1 and m is 1 to 6.

Compounds containing a vinyl end group and compounds containing a methyl end group have low rotational viscosity.

In the present application, both high-frequency technology and hyper-frequency technology denote applications having frequencies in the range from 1 MHz to 1 THz, preferably from 1 GHz to 500 GHz, more preferably 2 GHz to 300 GHz, particularly preferably from about 5 to 150 GHz.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media in this application.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also referred to as acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1-E-alkenyl, respectively, in each case having n, m or l C atoms. Table A lists the codes used for the ring elements of the core structures of the compounds, while Table B shows the linking groups. Table C gives the meanings of the codes for the left-hand or right-hand end groups. Table D shows illustrative structures of compounds with their respective abbreviations.

In the present application, the term compounds is taken to mean both one compound and a plurality of compounds, unless expressly stated otherwise. The liquid crystals employed are either individual substances or mixtures. They preferably have a nematic phase.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multi bottle" systems, the constituents of which are themselves ready-to-use mixtures.

Preferred compounds are shown in table D but other mesogenic compounds which are not explicitly mentioned above can optionally and advantageously also be used in the media in accordance with the present invention. Such compounds are known to the person skilled in the art.

The definitions of the abbreviations (acronyms) are likewise indicated below in Table D or are evident from Tables A to C.

TABLE A

| Ring elements | |
|---|---|
| C | |
| D | |
| DI | |
| A | |
| AI | |
| P | |
| P(1) | |
| P(1)I | |
| P(2) | |
| P(2)I | |

TABLE A-continued
| Ring elements | |
|---|---|
| P(c3) | 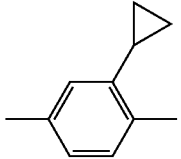 |
| P(c3)I | 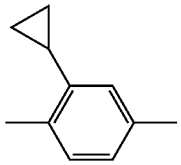 |
| P(1;1) | 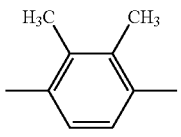 |
| (Pc3;1) | 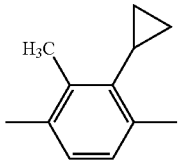 |
| G | 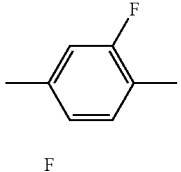 |
| GI | 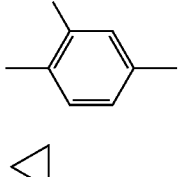 |
| G(c3) | 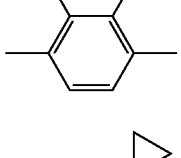 |
| G(c3)I | 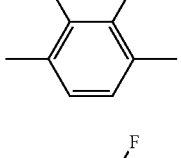 |
| U | 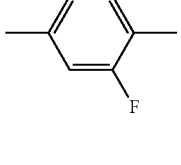 |
| UI | 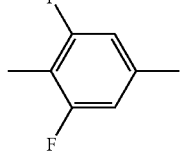 |
| U(2) | 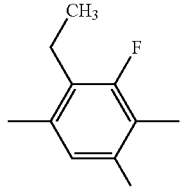 |
| U(2)I | 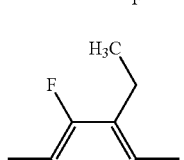 |
| Y | 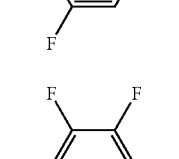 |
| X | 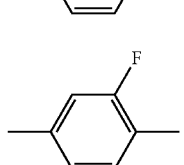 |
| M | 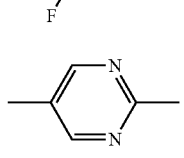 |
| MI | 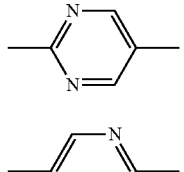 |
| N | 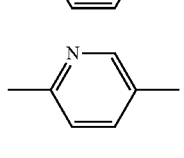 |
| NI | 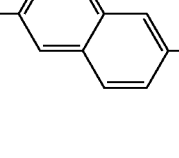 |
| Nap | 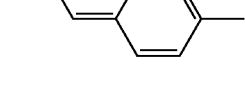 |

TABLE A-continued

| Ring elements | |
|---|---|
| iNp | (structure) |
| N3f | (structure) |
| N3fI | (structure) |
| tHe | (structure) |
| tHI | (structure) |
| tH2f | (structure) |
| tH2fI | (structure) |
| dH | (structure) |
| K | (structure) |
| KI | (structure) |
| L | (structure) |
| LI | (structure) |
| F | (structure) |
| FI | (structure) |

TABLE B

| Linking groups | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | | |

TABLE C

| End groups | | | |
|---|---|---|---|
| Left-hand side | | Right-hand side | |
| Use alone | | | |
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n+1}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |

TABLE C-continued

| End groups | | | |
|---|---|---|---|
| Left-hand side | | Right-hand side | |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -FXO- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| Use together with others | | | |
| -...A...- | —C≡C— | -...A... | —C≡C— |
| -...V...- | CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n and m each denote integers, and the three dots "..." are placeholders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

The compounds having two six-membered rings preferably used are represented as:

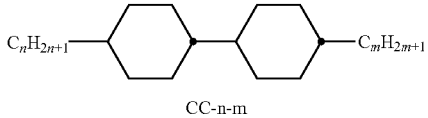

CC-n-m

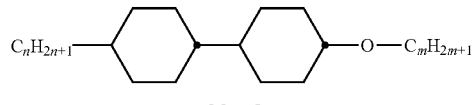

CC-n-Om

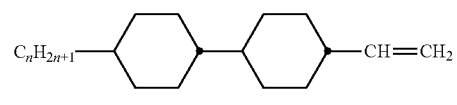

CC-n-V

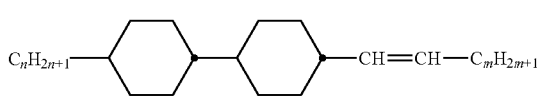

CC-n-Vm

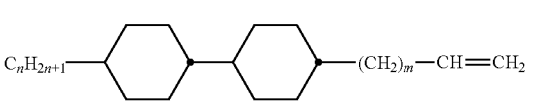

CC-n-mV

TABLE D-continued

Illustrative structures $C_nH_{2n+1}$—[Cy]—[Cy]—$(CH_2)_m$—CH=CH—$C_lH_{2l+1}$

CC-n-mVl $H_2C$=CH—[Cy]—[Cy]—CH=$CH_2$

CC-V-V $CH_2$=CH—[Cy]—[Cy]—$(CH_2)_m$—CH=$CH_2$

CC-V-mV $CH_2$=CH—[Cy]—[Cy]—CH=CH—$C_mH_{2m+1}$

CC-V-Vm $CH_2$=CH—$(CH_2)_n$—[Cy]—[Cy]—$(CH_2)_m$—CH=$CH_2$

CC-Vn-mV $C_nH_{2n+1}$—CH=CH—[Cy]—[Cy]—$(CH_2)_m$—CH=$CH_2$

CC-nV-mV $C_nH_{2n+1}$—CH=CH—[Cy]—[Cy]—CH=CH—$C_mH_{2m+1}$

CC-nV-Vm $C_nH_{2n+1}$—[Cy]—[Ph]—$C_mH_{2m+1}$

CP-n-m $C_nH_{2n+1}$O—[Cy]—[Ph]—$C_mH_{2m+1}$

CP-nO-m $C_nH_{2n+1}$—[Cy]—[Ph]—O$C_mH_{2m+1}$

CP-n-Om $CH_2$=CH—[Cy]—[Ph]—$C_mH_{2m+1}$

CP-V-m

TABLE D-continued

Illustrative structures

CH$_2$=CH—(CH$_2$)$_n$—[cyclohexyl]—[phenyl]—C$_m$H$_{2m+1}$
CP-Vn-m

C$_n$H$_{2n+1}$—CH=CH—[cyclohexyl]—[phenyl]—C$_m$H$_{2m+1}$
CP-nV-m

H$_2$C=CH—[cyclohexyl]—[phenyl]—CH=CH$_2$
CP-V-V

CH$_2$=CH—[cyclohexyl]—[phenyl]—(CH$_2$)$_m$—CH=CH$_2$
CP-V-mV

CH$_2$=CH—[cyclohexyl]—[phenyl]—CH=CH—C$_m$H$_{2m+1}$
CP-V-Vm

CH$_2$=CH—(CH$_2$)$_n$—[cyclohexyl]—[phenyl]—(CH$_2$)$_m$—CH=CH$_2$
CP-Vn-mV

C$_n$H$_{2n+1}$—CH=CH—[cyclohexyl]—[phenyl]—(CH$_2$)$_m$—CH=CH$_2$
CP-nV-mV

C$_n$H$_{2n+1}$—CH=CH—[cyclohexyl]—[phenyl]—CH=CH—C$_m$H$_{2m+1}$
CP-nV-Vm

C$_n$H$_{2n+1}$—[phenyl]—[phenyl]—C$_m$H$_{2m+1}$
PP-n-m

C$_n$H$_{2n+1}$O—[phenyl]—[phenyl]—C$_m$H$_{2m+1}$
PP-nO-m

C$_n$H$_{2n+1}$—[phenyl]—[phenyl]—OC$_m$H$_{2m+1}$
PP-n-Om

TABLE D-continued
Illustrative structures
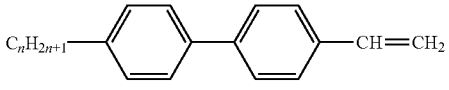
PP-n-V
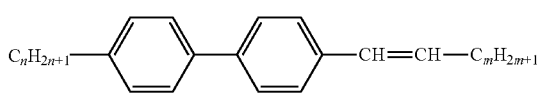
PP-n-Vm
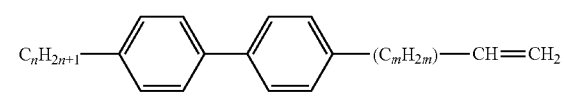
PP-n-mV
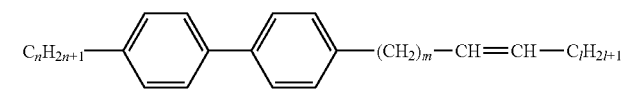
PP-n-mVl
Illustrative structures of compounds having two 6-membered rings which are particularly preferably employed:
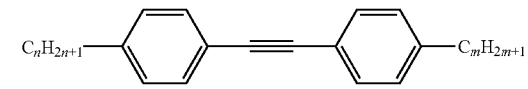
PTP-n-m
PTP(1)I-n-Am
PTP(1;1)-n-Am
Illustrative structures of compounds having a naphthaline ring which are particularly preferably employed:
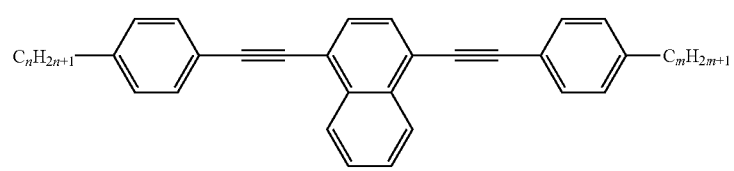
PTiNpTP-n-m
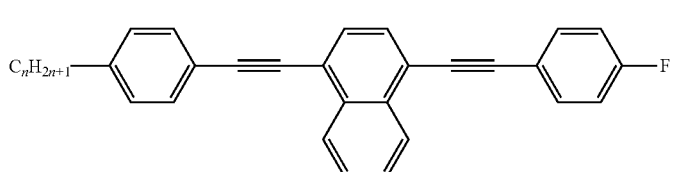
PTiNpTP-n-F TABLE D-continued
Illustrative structures
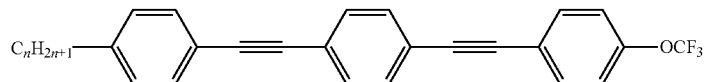
PTiNpTP-n-OT
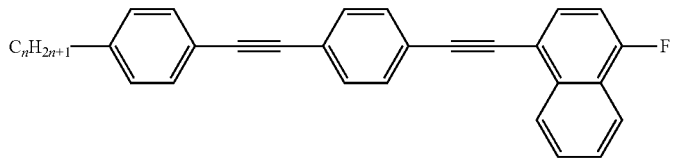
PTPTiNp-n-F
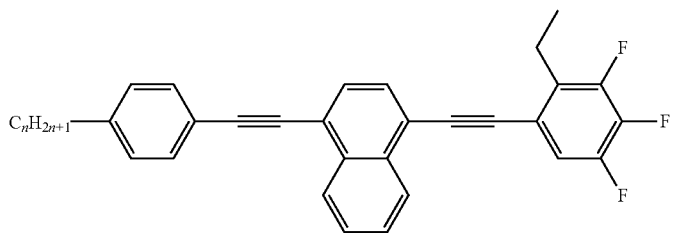
PTiNpTU(2)-n-F
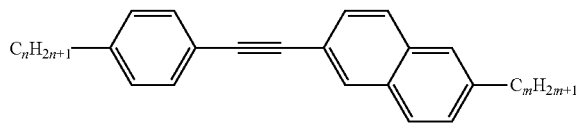
PTNp-n-m
Illustrative structures of compounds having three 6-membered rings which are particularly preferably employed:
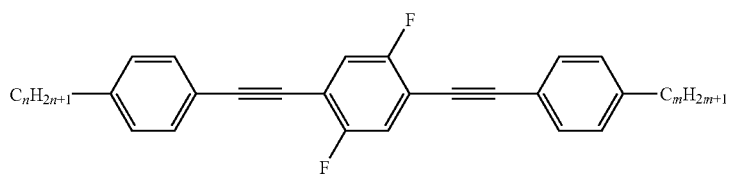
PTXTP-n-m
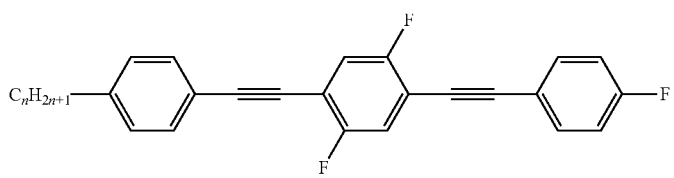
PTXTP-n-F
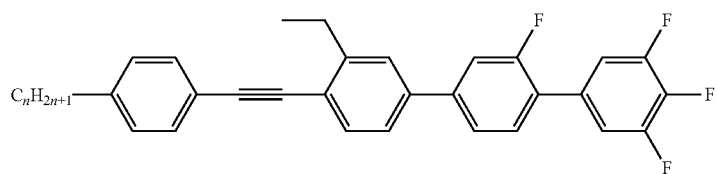
PTP(2)IGU-n-F TABLE D-continued
Illustrative structures
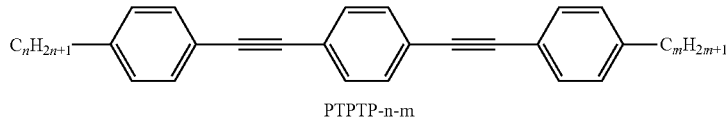
PTPTP-n-m
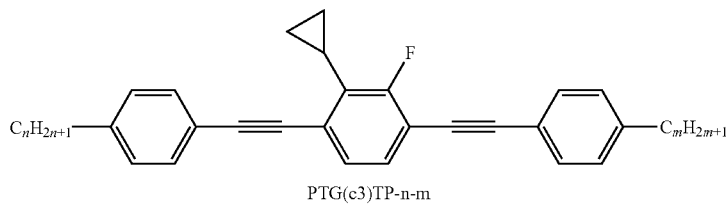
PTG(c3)TP-n-m
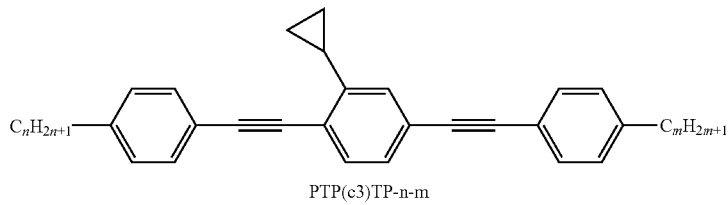
PTP(c3)TP-n-m
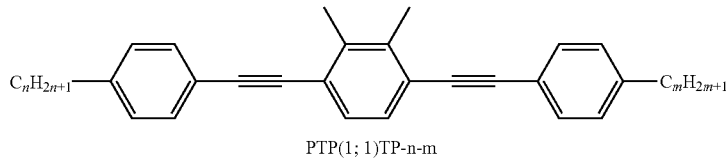
PTP(1; 1)TP-n-m
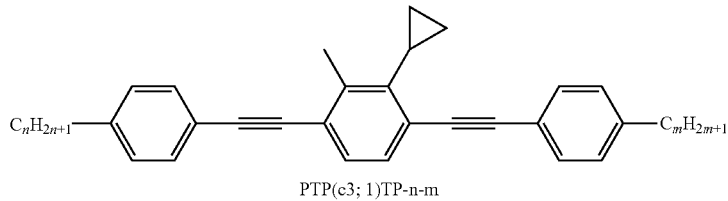
PTP(c3; 1)TP-n-m
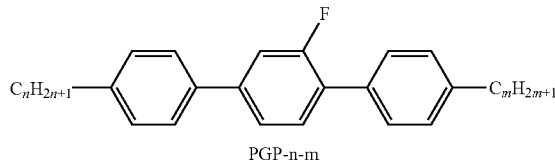
PGP-n-m
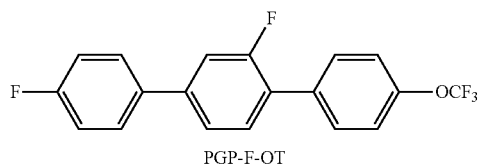 [SMILES: Fc1ccc(-c2ccc(-c3ccc(OC(F)(F)F)cc3)c(F)c2)cc1]
PGP-F-OT
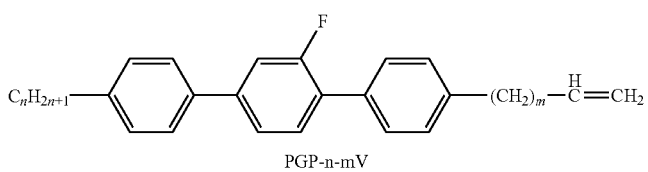
PGP-n-mV TABLE D-continued
Illustrative structures
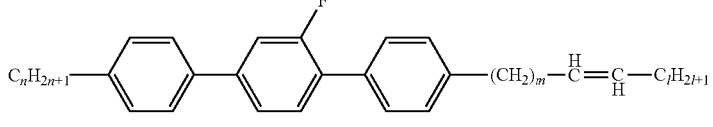
PGP-n-mVI
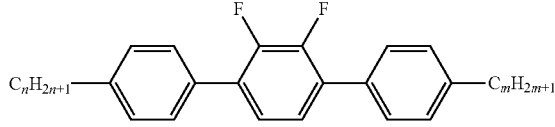
PYP-n-m
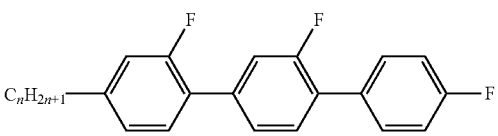
GGP-n-F
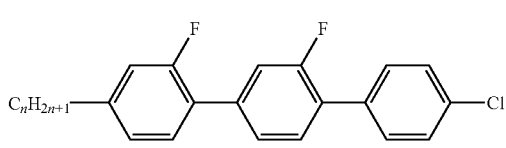
GGP-n-CL
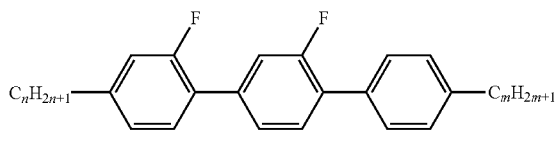
GGP-n-m
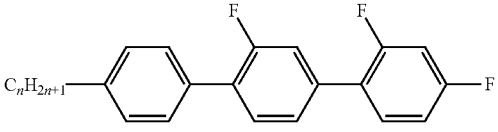
PGIGI-n-F
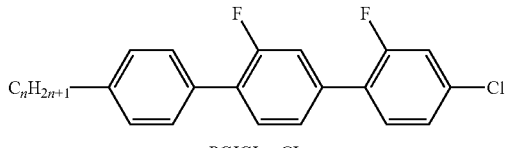
PGIGI-n-CL
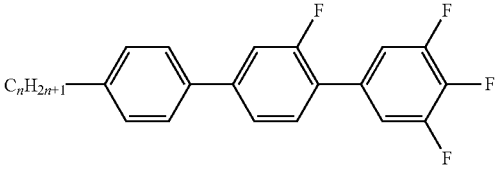
PGU-n-F TABLE D-continued
Illustrative structures
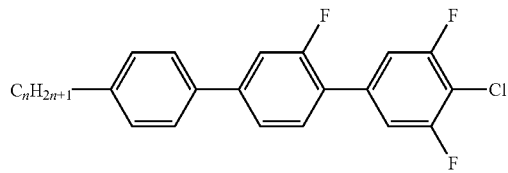
PGU-n-CL
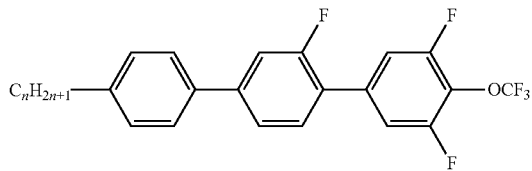
PGU-n-OT
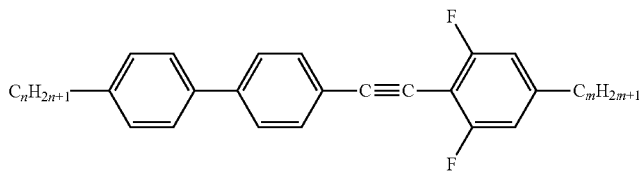
PPTUI-n-m
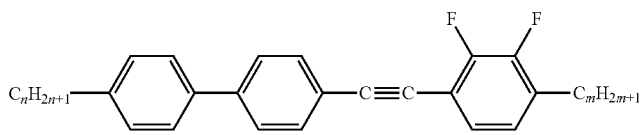
PPTY-n-m
Illustrative structures of compounds having four 6-membered rings which are particularly preferably employed:
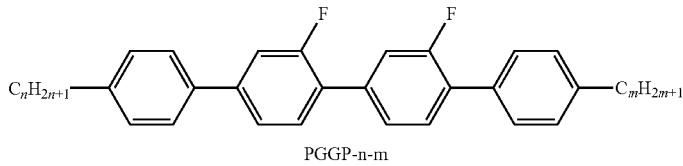
PGGP-n-m
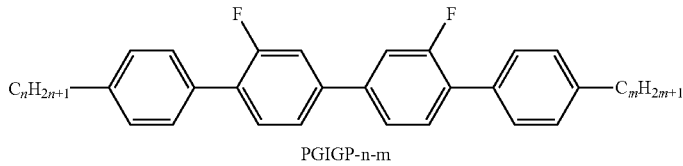
PGIGP-n-m
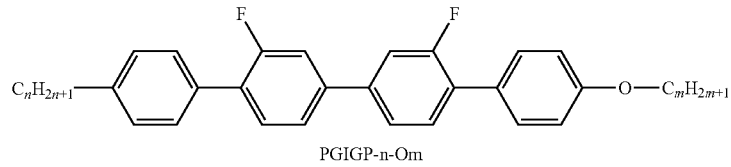
PGIGP-n-Om
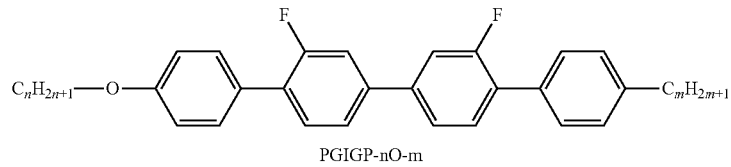
PGIGP-nO-m TABLE D-continued
Illustrative structures
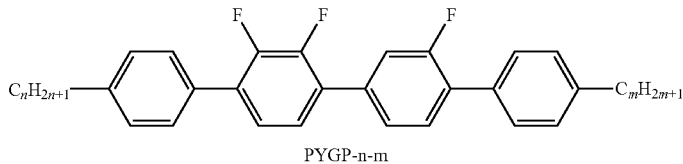
PYGP-n-m
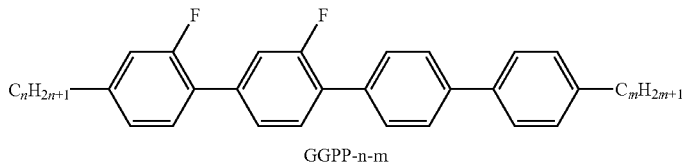
GGPP-n-m
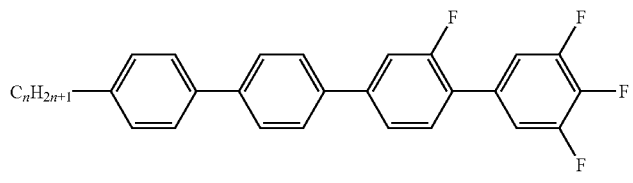
PPGU-n-F
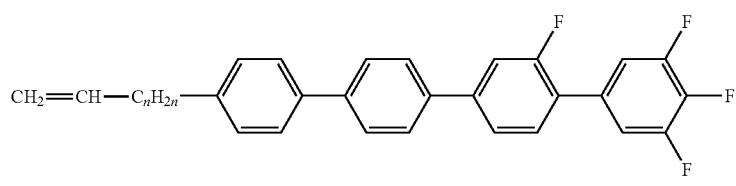
PPGU-Vn-F
Illustrative structures of dielectrically neutral compounds which are preferably employed:
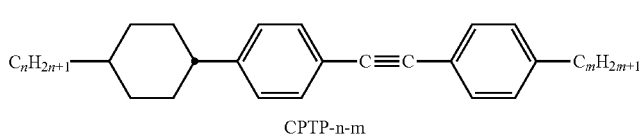
CPTP-n-m
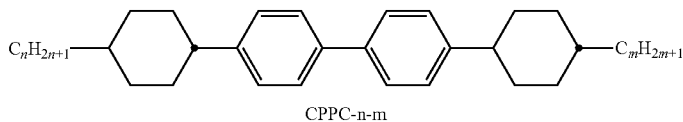
CPPC-n-m
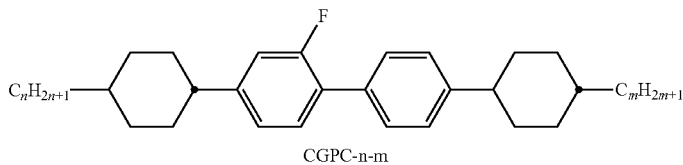
CGPC-n-m
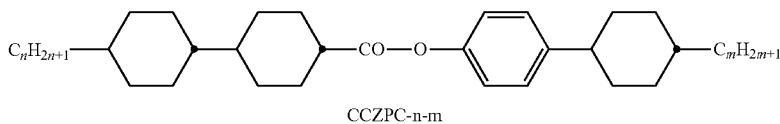
CCZPC-n-m TABLE D-continued
Illustrative structures
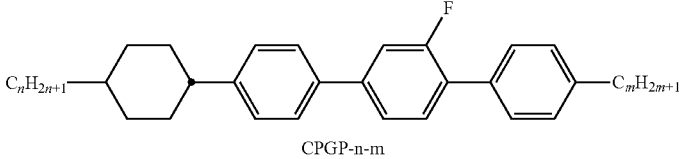
CPGP-n-m
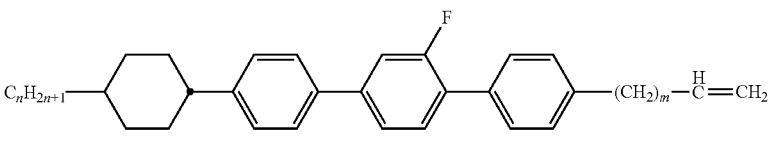
CPGP-n-mV
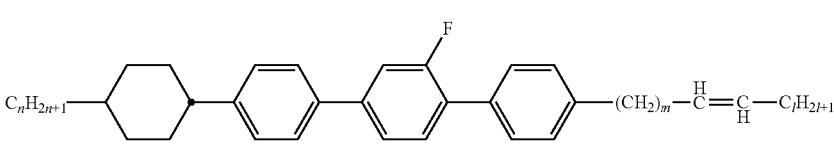
CPGP-n-mVI
Illustrative structures of further compounds which are preferably employed:
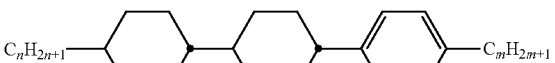
CCP-n-m
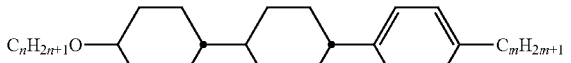
CCP-nO-m
CCP-n-Om
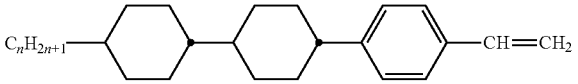
CCP-n-V
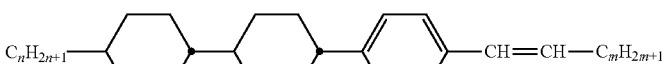
CCP-n-Vm
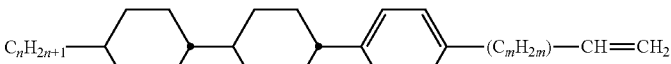
CCP-n-mV
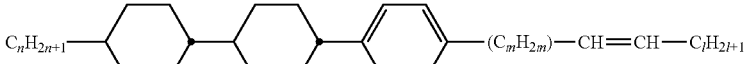
CCP-n-mVI TABLE D-continued
Illustrative structures
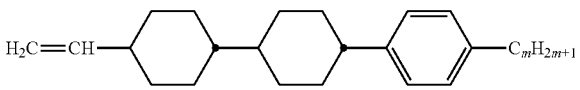
CCP-V-m
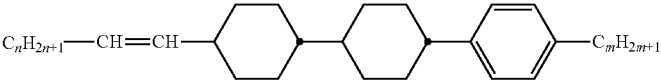
CCP-nV-m
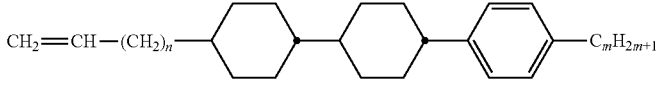
CCP-Vn-m
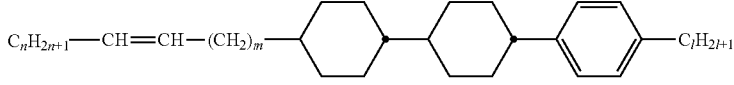
CCP-nVm-I
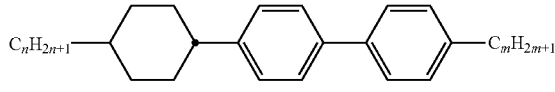
CPP-n-m
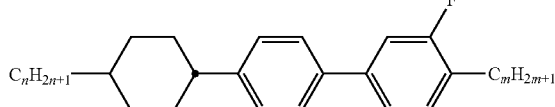
CPG-n-m
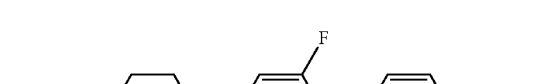
CGP-n-m
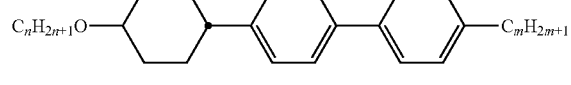
CPP-nO-m
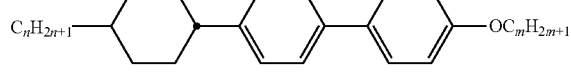
CPP-n-Om
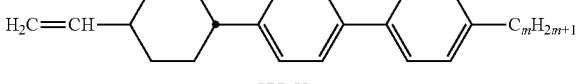
CPP-V-m
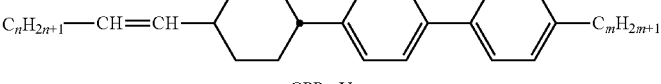
CPP-nV-m TABLE D-continued
Illustrative structures
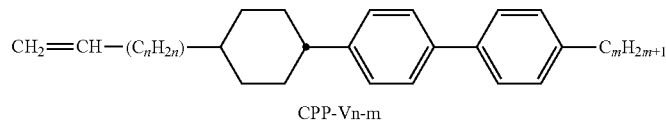
CPP-Vn-m
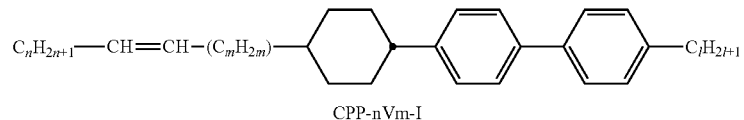
CPP-nVm-I
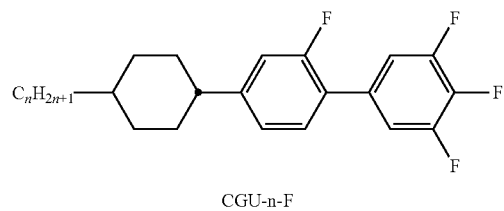
CGU-n-F
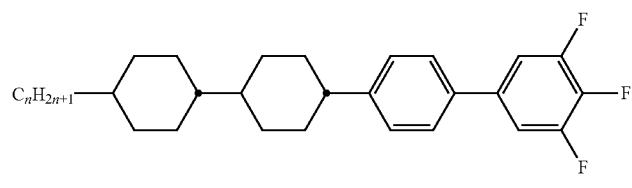
CCPU-n-F
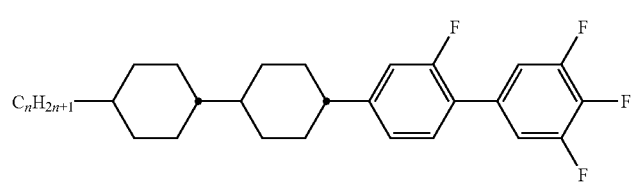
CCGU-n-F
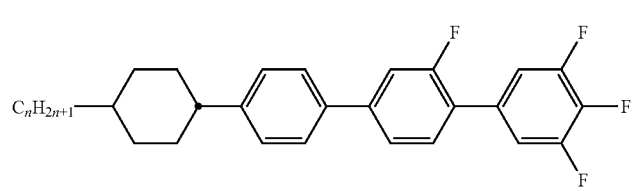
CPGU-n-F
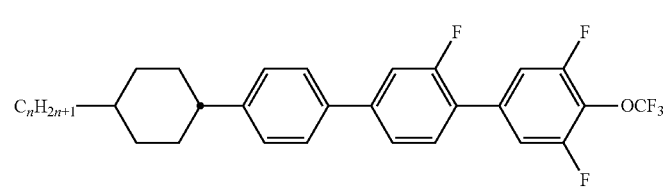
CPGU-n-OT TABLE D-continued
Illustrative structures
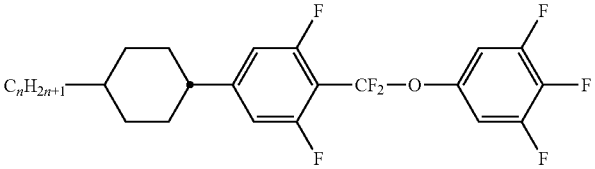
PUQU-n-F
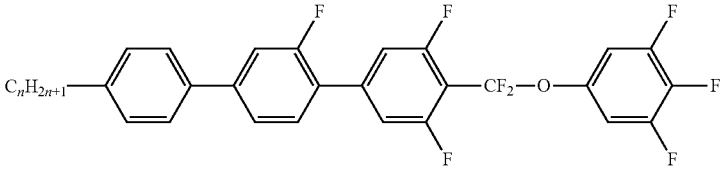
PGUQU-n-F
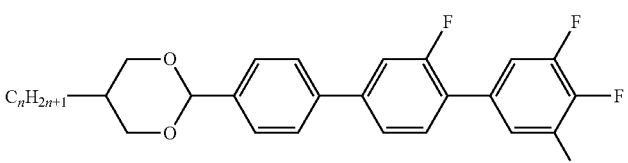
DPGU-n-F
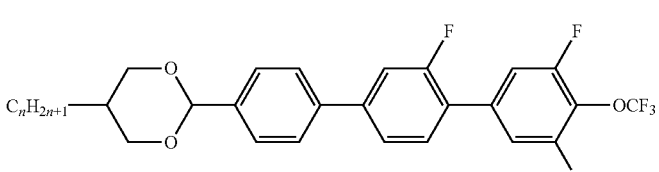
DPGU-n-OT
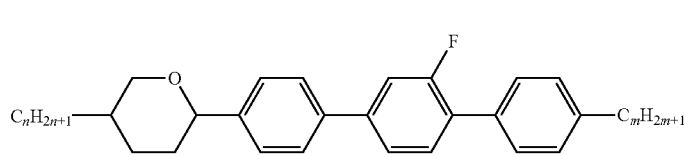
APGP-n-m
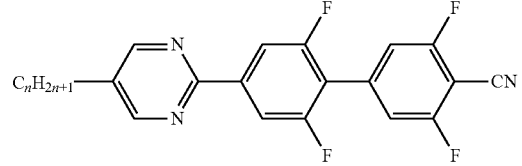
MUU-n-N
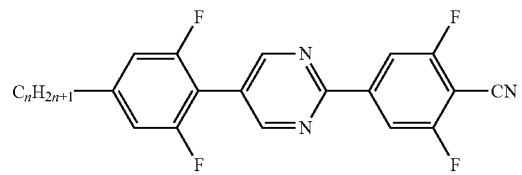
UMU-n-N TABLE D-continued Illustrative structures

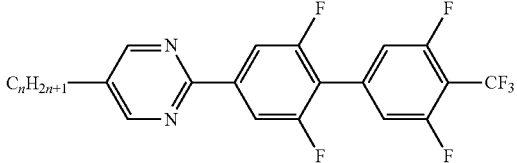

MUU-n-T

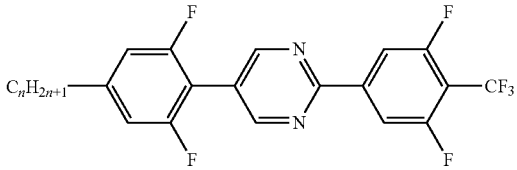

UMU-n-T

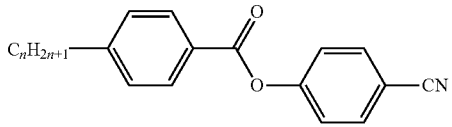

PZP-n-N

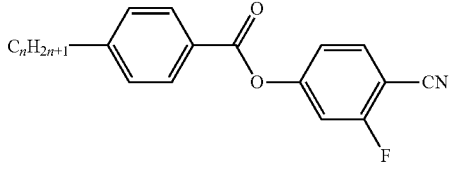

PZG-n-N

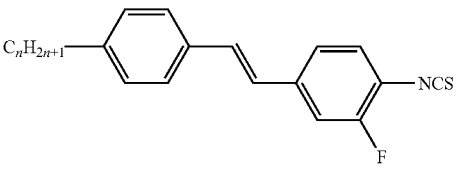

PVG-n-S

In table D, l, m n and p independently of each other denote an integer.

The following table, Table E, shows illustrative compounds which can be used as stabiliser in the mesogenic media in accordance with the present invention. The total concentration of these and similar compounds in the media is preferably 5% or less.

TABLE E

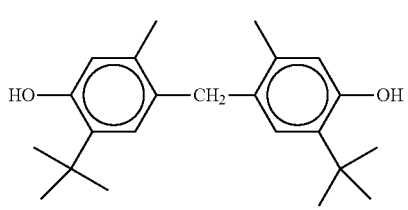

TABLE E-continued

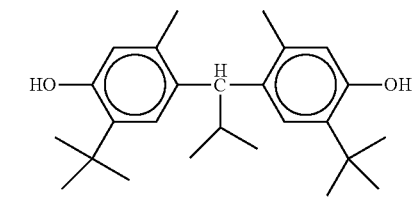

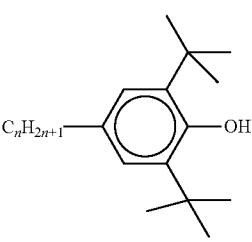

TABLE E-continued
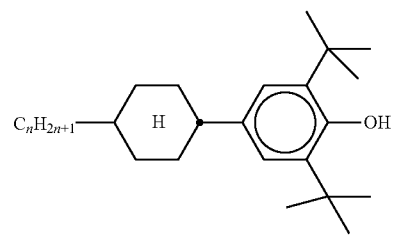
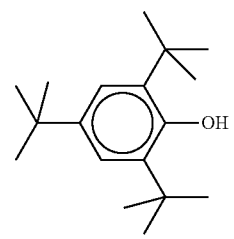
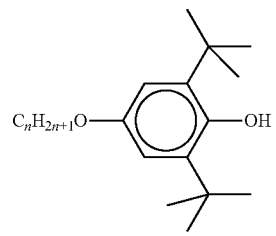
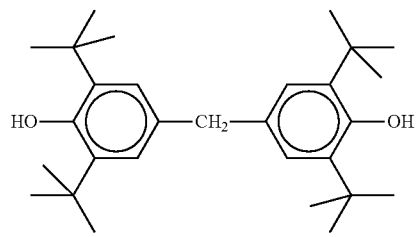
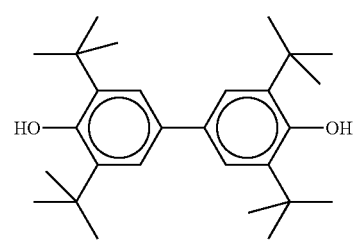
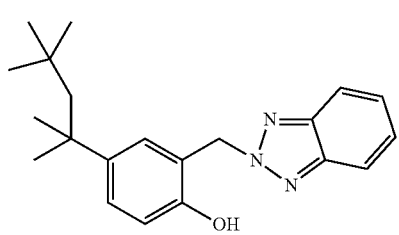 [SMILES: CC(C)(C)CC(C)(C)c1ccc(O)c(Cn2nc3ccccc3n2)c1]
TABLE E-continued
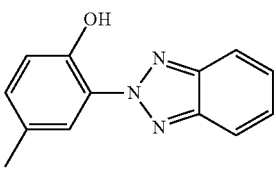 [SMILES: Cc1ccc(O)c(-n2nc3ccccc3n2)c1]
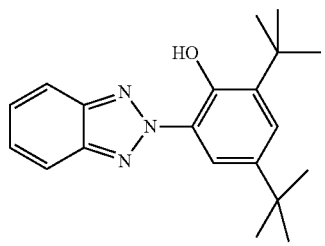 [SMILES: CC(C)(C)c1cc(-n2nc3ccccc3n2)c(O)c(C(C)(C)C)c1]
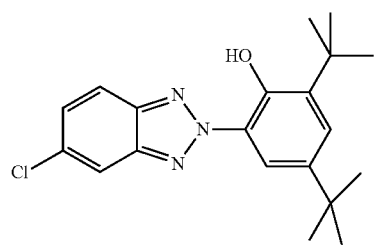 [SMILES: CC(C)(C)c1cc(-n2nc3ccc(Cl)cc3n2)c(O)c(C(C)(C)C)c1]
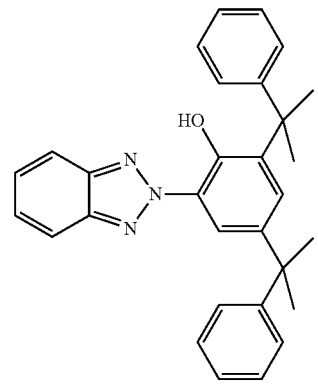 [SMILES: CC(C)(c1ccccc1)c1cc(-n2nc3ccccc3n2)c(O)c(C(C)(C)c2ccccc2)c1]
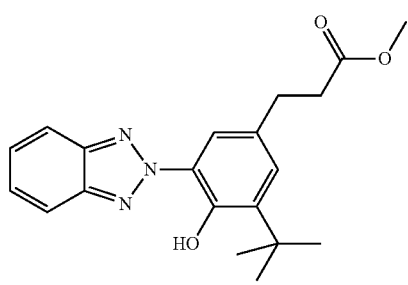 [SMILES: COC(=O)CCc1cc(-n2nc3ccccc3n2)c(O)c(C(C)(C)C)c1]

TABLE E-continued
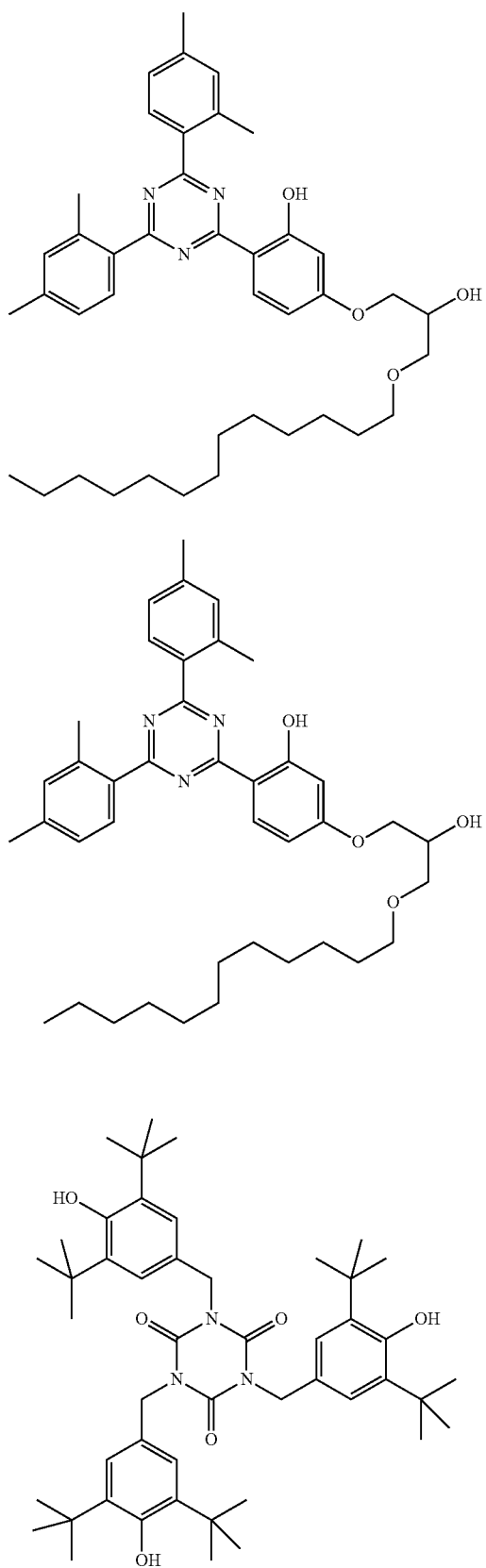
TABLE E-continued
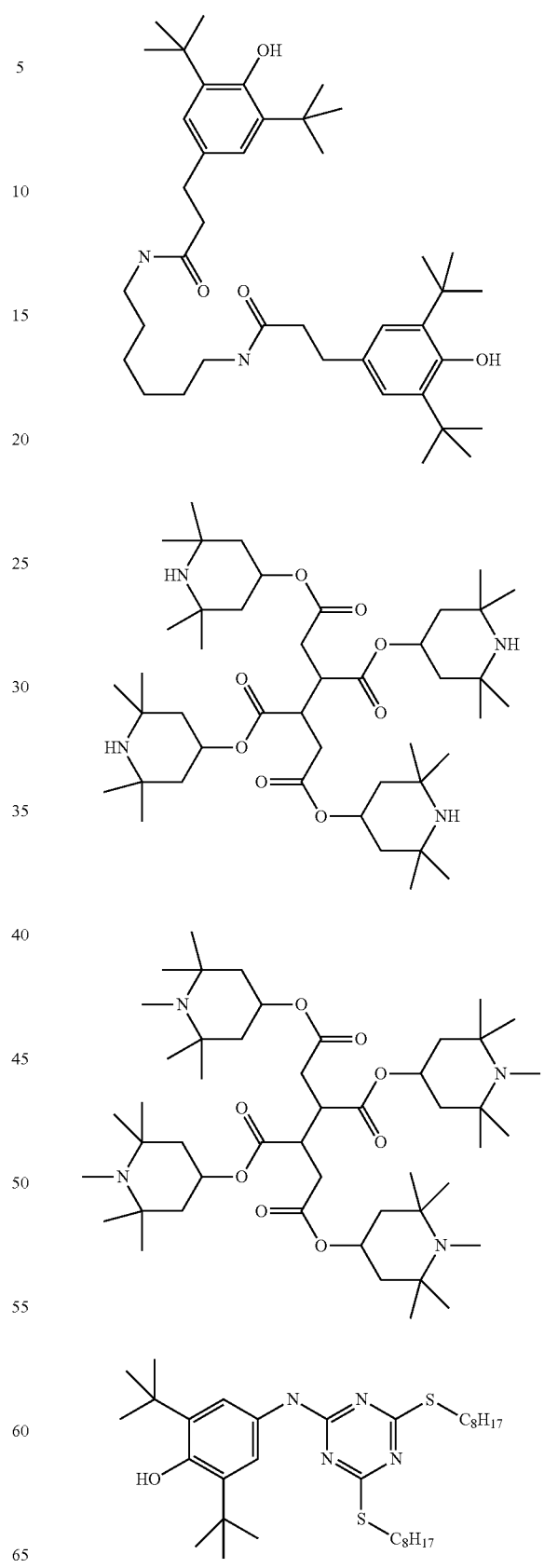

TABLE E-continued
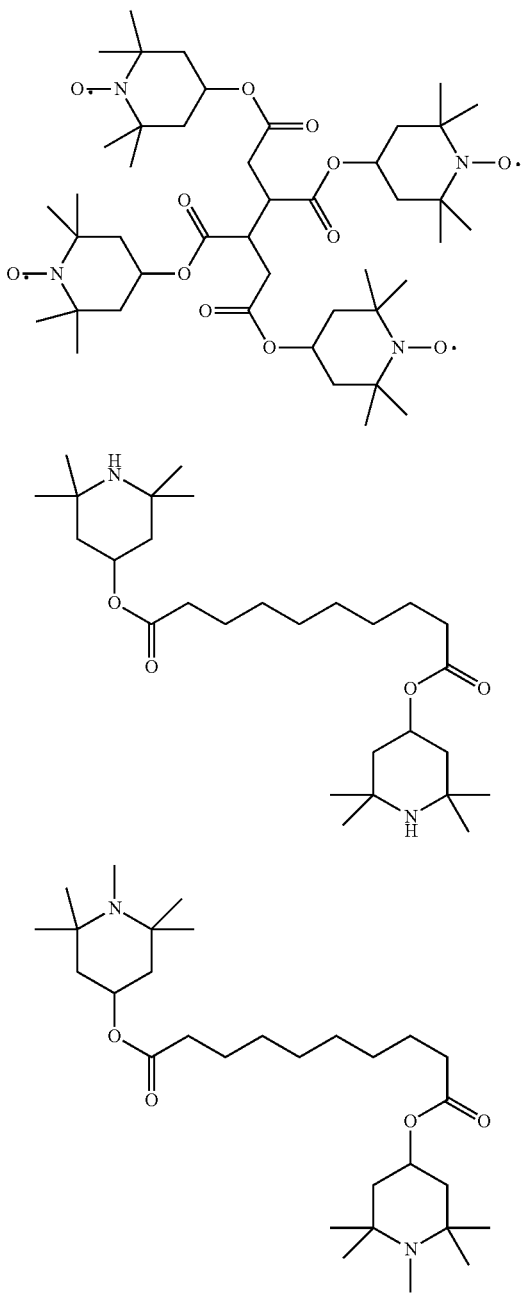
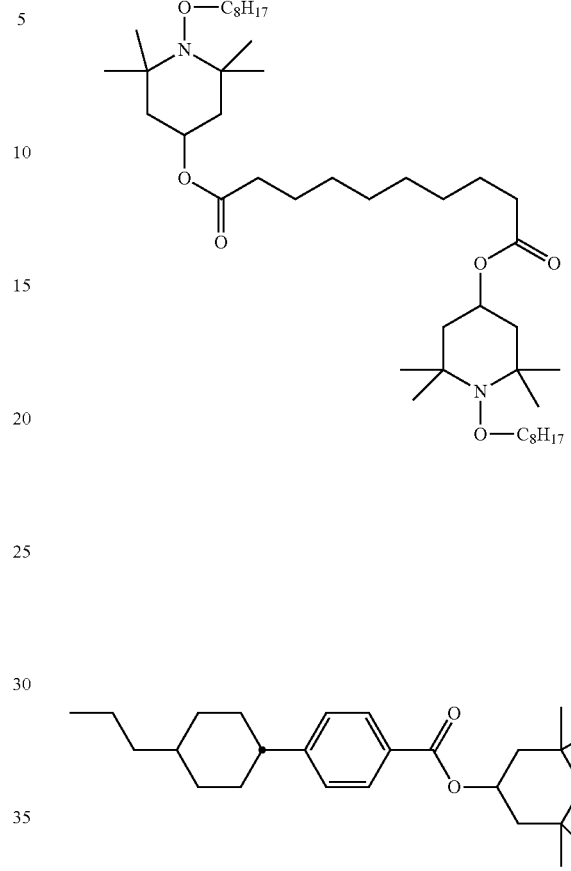
In a preferred embodiment of the present invention, the mesogenic media comprise one or more compounds selected from the group of the compounds from Table E.
The following table, Table F, shows illustrative compounds which can preferably be used as chiral dopants in the mesogenic media in accordance with the present invention.
TABLE F
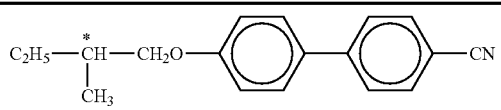
C 15
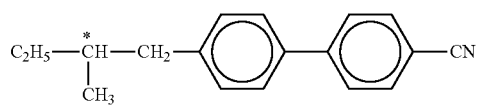
CB 15

TABLE F-continued
| Structure | Name |
|---|---|
| 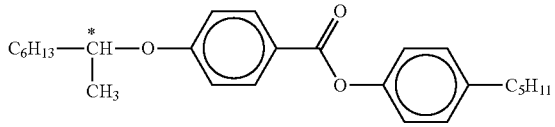 | CM 21 |
| 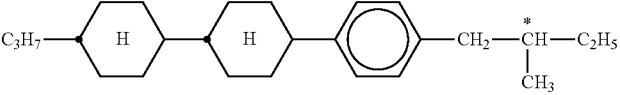 | CM 44 |
| 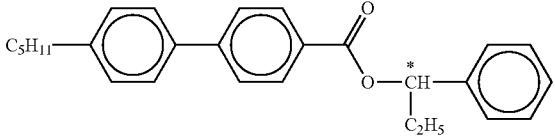 | CM 45 |
| 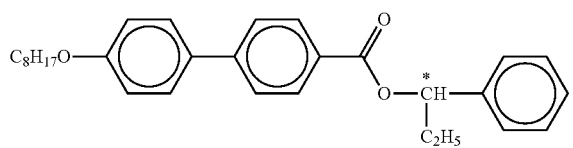 | CM 47 |
| 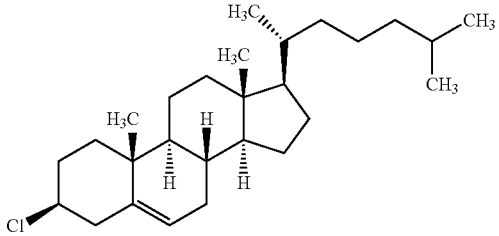 | CC |
| 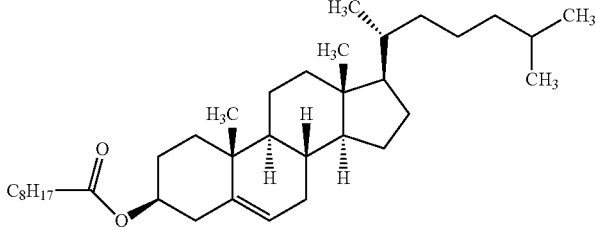 | CN |
| 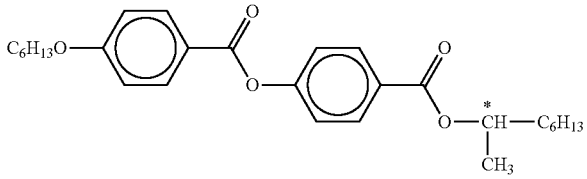 | R/S-811 |
| 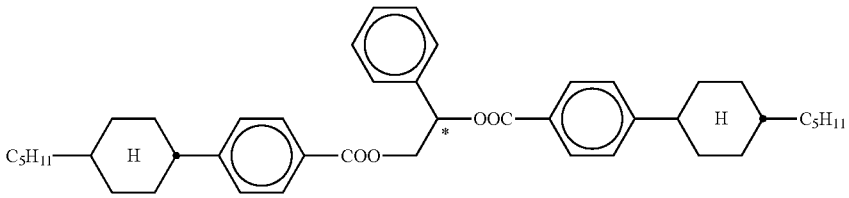 | R/S-1011 |
| 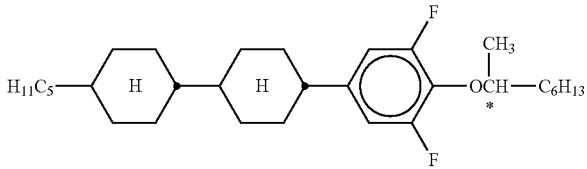 | R/S-2011 |

TABLE F-continued

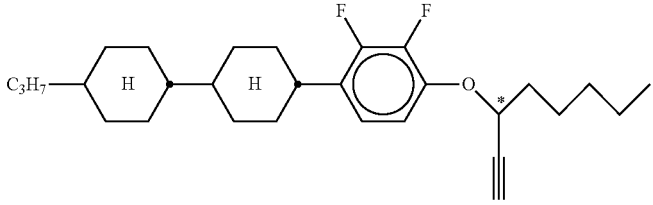

R/S-3011

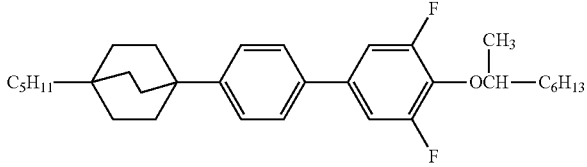

R/S-4011

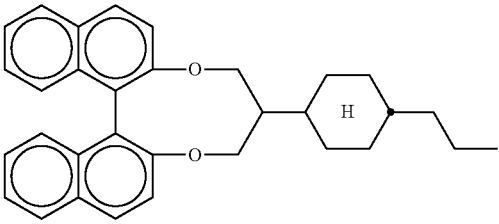

R/S-5011

In a preferred embodiment of the present invention, the mesogenic media comprise one or more compounds selected from the group of the compounds from Table F.

The mesogenic media in accordance with the present application preferably comprise two or more, preferably four or more, compounds selected from the group consisting of the compounds from the above tables.

The liquid-crystal media in accordance with the present invention preferably comprise
seven or more, preferably eight or more, compounds, preferably compounds having three or more, preferably four or more, different formulae, selected from the group of the compounds from Table D.

Unless indicated otherwise, all saturated carbocycles preferably have trans-configuration where it is possible.

The compounds from table D are known to the expert and can be synthesised according to procedures described elsewhere.

All percentages given above and below are percent by mass based on the total mixture.

The following examples illustrate the present invention without limiting it in any way.

However, it becomes clear to the person skilled in the art from the physical properties what properties can be achieved and in what ranges they can be modified. In particular, the combination of the various properties which can preferably be achieved is thus well defined for the person skilled in the art.

In the present application, unless expressly indicated otherwise, the plural form of a term denotes both the singular form and the plural form, and vice versa. Further combinations of the embodiments and variants of the invention in accordance with the description also arise from the attached claims.

EXAMPLES

Comparative Example C-1

A liquid crystal mixture C-1 having the composition and properties as indicated in the following table is prepared.

| Composition Compound | | |
|---|---|---|
| No. | Abbreviation | |
| 1 | PPTUI-3-4 | 25.1 |
| 2 | PPTUI-4-4 | 48.5 |
| 3 | PPTUI-3-2 | 26.4 |
| Σ | | 100.0 |
| Physical properties | | |
| T(N, I) = | | 163.5° C. |
| $n_o$ (20° C., 589.3 nm) = | | 1.47 |
| Δn (20° C., 589.3 nm) = | | 0.40 |
| $\varepsilon_{\|}$ (20° C., 1 kHz) = | | 3.8 |
| Δε (20° C., 1 kHz) = | | 1.0 |
| $\gamma_1$ (20° C.) = | | 310 mPa·s |
| $\varepsilon_{r, \|}$ (20° C., 19 GHz) = | | 2.48 |
| $\Delta\varepsilon_r$ (20° C., 19 GHz) = | | 0.87 |
| tan $\delta_{\varepsilon r, \perp}$ (20° C., 19 GHz) = | | 0.0123 |
| tan $\delta_{\varepsilon r, \|}$ (20° C., 19 GHz) = | | 0.0034 |
| τ (20° C., 19 GHz) | | 0.26 |
| η (20° C., 19 GHz) | | 21.1 |

This mixture is suitable for applications in the microwave range, in particular for phase shifters.

EXAMPLES

The liquid-crystal media M-1 to M-41 having the composition and properties as indicated in the following tables are prepared.

Mixture Example M-1

| Composition Compound | | |
|---|---|---|
| No. | Abbreviation | |
| 1 | PTiNpTP-4-4 | 21.0% |
| 2 | PTP(c3)TP-4-4 | 20.0% |
| 3 | PTiNpTP-4-6 | 22.0% |
| 4 | PTP(1)I-4-A1 | 30.0% |
| 5 | PTiNpTP-6-6 | 7.0% |
| Σ | | 100.0% |

| Physical properties | |
|---|---|
| T(N, I) = | 98.5° C. |
| Δε (20° C., 1 kHz) = | 0.9 |
| $\varepsilon_\parallel$ = | 3.5 |
| $\gamma_1$ (20° C.) = | 2136 mPa · s |
| $K_1$ = | 9.7 |
| $K_3$ = | 38.6 |
| $V_0$ = | 3.51 V |

Mixture Example M-2

| Composition Compound | | |
|---|---|---|
| No. | Abbreviation | |
| 1 | PTP(1)I-4-A1 | 30.0% |
| 2 | PTiNpTP-4-4 | 7.0% |
| 3 | PTiNpTP-3-6 | 14.0% |
| 4 | PTiNpTP-6-6 | 10.50% |
| 5 | PTiNpTP-3-5 | 14.0% |
| 6 | PTiNpTP-2-6 | 3.50% |
| 7 | PTiNpTP-5-6 | 7.0% |
| 8 | PTiNpTP-4-6 | 14.0% |
| Σ | | 100.0% |

| Physical properties | |
|---|---|
| T(N, I) = | 118° C. |
| Δε (20° C., 1 kHz) = | 0.9 |
| $\varepsilon_\parallel$ = | 3.5 |
| $\gamma_1$ (20° C.) = | 2331 mPa · s |
| $K_1$ = | 12.5 |
| $K_3$ = | 39.6 |
| $V_0$ = | 3.91 V |

Mixture Example M-3

| Composition Compound | | |
|---|---|---|
| No. | Abbreviation | |
| 1 | PTiNpTP-4-4 | 7.0% |
| 2 | PTiNpTP-3-6 | 14.0% |
| 3 | PTiNpTP-6-6 | 10.5% |
| 4 | PTiNpTP-3-5 | 14.0% |
| 5 | PTiNpTP-2-6 | 3.5% |
| 6 | PTiNpTP-5-6 | 7.0% |
| 7 | PTiNpTP-4-6 | 14.0% |
| 8 | PTP(1)IA-4-1 | 30.0% |
| Σ | | 100.0% |

| Physical properties | |
|---|---|
| T(N, I) = | 118° C. |
| Δε (20° C., 1 kHz) = | 0.9 |
| $\varepsilon_\parallel$ = | 3.6 |
| $\gamma_1$ (20° C.) = | 2358 mPa · s |
| $K_1$ = | 13.0 |
| $K_3$ = | 40.9 |
| $V_0$ = | 3.94 V |

Mixture Example M-4

| Composition Compound | | |
|---|---|---|
| No. | Abbreviation | |
| 1 | PTiNpTP-4-4 | 6.0% |
| 2 | PTiNpTP-3-6 | 12.0% |
| 3 | PTiNpTP-6-6 | 9.0% |
| 4 | PTiNpTP-3-5 | 12.0% |
| 5 | PTiNpTP-2-6 | 3.0% |
| 6 | PTiNpTP-5-6 | 6.0% |
| 7 | PTiNpTP-4-6 | 12.0% |
| 8 | PTP(1)IA-4-1 | 40.0% |
| Σ | | 100.0% |

| Physical properties | |
|---|---|
| T(N, I) = | 104.5° C. |
| Δε (20° C., 1 kHz) = | 0.9 |
| $\varepsilon_\parallel$ = | 3.5 |
| $\gamma_1$ (20° C.) = | 1711 mPa · s |
| $K_1$ = | 11.3 |
| $K_3$ = | 34.0 |
| $V_0$ = | 3.71 V |

Mixture Example M-5

| Composition Compound | | |
|---|---|---|
| No. | Abbreviation | |
| 1 | CC-3-V | 8.0% |
| 2 | CCP-V-1 | 8.0% |
| 3 | PPTUI-3-2 | 8.0% |
| 4 | PPTUI-3-4 | 15.0% |
| 5 | PPTUI-4-4 | 30.0% |
| 6 | CPGP-5-2 | 3.0% |
| 7 | CPGP-5-3 | 3.0% |
| 8 | PTP(1)I-4-A1 | 21.0% |
| 9 | UMU-6-N | 4.0% |
| Σ | | 100.0% |

| Physical properties | |
|---|---|
| T(N, I) = | 123° C. |
| Δn (20° C., 589.3 nm) = | 0.2949 |

-continued

| | |
|---|---|
| $n_o$ (20° C., 589.3 nm) = | 1.5145 |
| $\Delta\varepsilon$ (20° C., 1 kHz) = | 3.7 |
| $\varepsilon_\parallel$ = | 6.5 |
| $\gamma_1$ (20° C.) = | 399 mPa·s |
| $K_1$ = | 14.9 |
| $K_3$ = | 22.5 |
| $V_0$ = | 2.13 V |

Mixture Example M-6

| Composition Compound | | |
|---|---|---|
| No. | Abbreviation | |
| 1 | PTP(1)I-4-A1 | 8.0% |
| 2 | CCP-V-1 | 8.0% |
| 3 | PPTUI-3-2 | 8.0% |
| 4 | PPTUI-3-4 | 15.0% |
| 5 | PPTUI-4-4 | 30.0% |
| 6 | GGP-3-CL | 5.0% |
| 7 | GGP-5-CL | 20.0% |
| 8 | CPGP-5-2 | 3.0% |
| 9 | CPGP-5-3 | 3.0% |
| Σ | | 100.0% |

| Physical properties | |
|---|---|
| T(N, I) = | 145.5° C. |
| $\Delta n$ (20° C., 589.3 nm) = | 0.3110 |
| $n_o$ (20° C., 589.3 nm) = | 1.5196 |
| $\Delta\varepsilon$ (20° C., 1 kHz) = | 3.5 |
| $\varepsilon_\parallel$ = | 6.7 |
| $\gamma_1$ (20° C.) = | 554 mPa·s |
| $K_1$ = | 18.6 |
| $K_3$ = | 27.0 |
| $V_0$ = | 2.45 V |

Mixture Example M-7

| Composition Compound | | |
|---|---|---|
| No. | Abbreviation | |
| 1 | CCP-V-1 | 8.0% |
| 2 | PPTUI-3-2 | 8.0% |
| 3 | PPTUI-3-4 | 15.0% |
| 4 | PPTUI-4-4 | 30.0% |
| 5 | CPGP-5-2 | 3.0% |
| 6 | CPGP-5-3 | 3.0% |
| 7 | PTP(1)I-4-A1 | 29.0% |
| 8 | UMU-6-N | 4.0% |
| Σ | | 100.0% |

| Physical properties | |
|---|---|
| T(N, I) = | 122° C. |
| $n_e$ (20° C., 589.3 nm) > | 1.860 |
| $n_o$ (20° C., 589.3 nm) = | 1.5219 |
| $\Delta\varepsilon$ (20° C., 1 kHz) = | 3.8 |
| $\varepsilon_\parallel$ = | 6.7 |
| $\gamma_1$ (20° C.) = | 582 mPa·s |
| $K_1$ = | 13.8 |
| $K_3$ = | 24.2 |
| $V_0$ = | 2.00 V |

Mixture Example M-8

| Composition Compound | | |
|---|---|---|
| No. | Abbreviation | |
| 1 | CCP-V-1 | 8.0% |
| 2 | PPTUI-3-2 | 8.0% |
| 3 | PPTUI-3-4 | 15.0% |
| 4 | PPTUI-4-4 | 30.0% |
| 5 | CPGP-5-2 | 3.0% |
| 6 | CPGP-5-3 | 3.0% |
| 7 | PTP(1)I-4-A1 | 24.0% |
| 8 | PGUQU-3-F | 3.0% |
| 9 | PGUQU-4-F | 3.0% |
| 10 | PGUQU-5-F | 3.0% |
| Σ | | 100.0% |

| Physical properties | |
|---|---|
| T(N, I) = | 131° C. |
| $n_e$ (20° C., 589.3 nm) > | 1.860 |
| $n_o$ (20° C., 589.3 nm) = | 1.5189 |
| $\Delta\varepsilon$ (20° C., 1 kHz) = | 3.4 |
| $\varepsilon_\parallel$ = | 6.3 |
| $\gamma_1$ (20° C.) = | 563 mPa·s |
| $K_1$ = | 15.2 |
| $K_3$ = | 24.8 |
| $V_0$ = | 2.22 V |

Mixture Example M-9

| Composition Compound | | |
|---|---|---|
| No. | Abbreviation | |
| 1 | CC-3-V | 8.0% |
| 2 | CCP-V-1 | 8.0% |
| 3 | PPTUI-3-2 | 8.0% |
| 4 | PPTUI-3-4 | 15.0% |
| 5 | PPTUI-4-4 | 30.0% |
| 6 | CPGP-5-2 | 3.0% |
| 7 | CPGP-5-3 | 3.0% |
| 8 | PTP(1)I-4-A1 | 16.0% |
| 9 | PGUQU-3-F | 3.0% |
| 10 | PGUQU-4-F | 3.0% |
| 11 | PGUQU-5-F | 3.0% |
| Σ | | 100.0% |

| Physical properties | |
|---|---|
| T(N, I) = | 131.5° C. |
| $\Delta n$ (20° C., 589.3 nm) = | 0.2910 |
| $n_o$ (20° C., 589.3 nm) = | 1.5124 |
| $\Delta\varepsilon$ (20° C., 1 kHz) = | 3.4 |
| $\varepsilon_\parallel$ = | 6.2 |
| $\gamma_1$ (20° C.) = | 395 mPa·s |
| $K_1$ = | 16.3 |
| $K_3$ = | 23.1 |
| $V_0$ = | 2.32 V |

Mixture Example M-10

Composition

| No. | Compound Abbreviation | |
|---|---|---|
| 1 | PPTUI-3-2 | 8.0% |
| 2 | PPTUI-3-4 | 15.0% |
| 3 | PPTUI-4-4 | 30.0% |
| 4 | CPGP-5-2 | 3.0% |
| 5 | CPGP-5-3 | 3.0% |
| 6 | PTP(1)I-4-A1 | 37.0% |
| 7 | UMU-6-N | 4.0% |
| Σ | | 100.0% |

Physical properties

T(N, I) = 111° C.
$n_e$ (20° C., 589.3 nm) > 1.860
$n_o$ (20° C., 589.3 nm) = 1.5258
$\Delta\varepsilon$ (20° C., 1 kHz) = 3.8
$\varepsilon_\parallel$ = 6.7
$\gamma_1$ (20° C.) = 646 mPa·s
$K_1$ = 12.3
$K_3$ = 23.0
$V_0$ = 1.91 V

Mixture Example M-11

Composition

| No. | Compound Abbreviation | |
|---|---|---|
| 1 | PPTUI-3-2 | 8.0% |
| 2 | PPTUI-3-4 | 15.0% |
| 3 | PPTUI-4-4 | 30.0% |
| 4 | PTP(1)I-4-A1 | 43.0% |
| 5 | UMU-6-N | 4.0% |
| Σ | | 100.0% |

Physical properties

T(N, I) = 93.5° C.
$n_e$ (20° C., 589.3 nm) > 1.860
$n_o$ (20° C., 589.3 nm) = 1.5290
$\Delta\varepsilon$ (20° C., 1 kHz) = 3.7
$\varepsilon_\parallel$ = 6.7
$\gamma_1$ (20° C.) = 584 mPa·s
$K_1$ = 10.2
$K_3$ = 22.1
$V_0$ = 1.75 V

Mixture Example M-12

Composition

| No. | Compound Abbreviation | |
|---|---|---|
| 1 | PPTUI-3-4 | 15.0% |
| 2 | PPTUI-4-4 | 30.0% |
| 3 | PTP(1)I-4-A1 | 50.0% |
| 4 | UMU-6-N | 5.0% |
| Σ | | 100.0% |

Physical properties

T (N, I) = 81° C.
$n_e$ (20° C., 589.3 nm) > 1.860
$n_o$ (20° C., 589.3 nm) = 1.5304
$\Delta\varepsilon$ (20° C., 1 kHz) = 4.2
$\varepsilon_\parallel$ = 7.2
$\gamma_1$ (20° C.) = 555 mPa·s
$K_1$ = 9.1
$K_3$ = 18.6
$V_0$ = 1.56 V

Mixture Example M-13

Composition MDA-12-2970

| No. | Compound Abbreviation | |
|---|---|---|
| 1 | PPTUI-3-2 | 10.0% |
| 2 | PPTUI-3-4 | 10.0% |
| 3 | PPTUI-4-4 | 25.0% |
| 4 | CPTP-4-1 | 3.0% |
| 5 | CPTP-3-2 | 3.0% |
| 6 | CPGP-5-2 | 4.0% |
| 7 | CPGP-5-3 | 4.0% |
| 8 | UMU-6-N | 5.0% |
| 9 | CC-4-V | 10.0% |
| 10 | PTP(1)I-4-A1 | 26.0% |
| Σ | | 100.0% |

Physical properties

T (N, I) = 117.5° C.
$\Delta n$ (20° C., 589.3 nm) = 0.2963
$n_o$ = 1.5170
$\Delta\varepsilon$ (20° C., 1 kHz) = 4.3
$\varepsilon_\parallel$ = 7.3
$\gamma_1$ (20° C.) = 418 mPa·s
$K_1$ = 14.0
$K_3$ = 21.6
$V_0$ = 1.90 V

Mixture Example M-14

Composition MDA-12-2981

| No. | Compound Abbreviation | |
|---|---|---|
| 1 | PPTUI-3-2 | 20.0% |
| 2 | PPTUI-3-4 | 20.0% |
| 3 | PPTUI-4-4 | 31.0% |
| 4 | CPTP-4-1 | 3.0% |
| 5 | CPTP-3-2 | 3.0% |
| 6 | CPGP-5-2 | 4.0% |
| 7 | CPGP-5-3 | 4.0% |
| 8 | UMU-6-N | 5.0% |
| 9 | PTP(1)I-4-A1 | 10.0% |
| Σ | | 100.0% |

Physical properties

T (N, I) = 158° C.
$n_e$ (20° C., 589.3 nm) > 1.860
$n_o$ (20° C., 589.3 nm) = 1.5184
$\Delta\varepsilon$ (20° C., 1 kHz) = 5.0
$\varepsilon_\parallel$ = 7.9

$\gamma_1$ (20° C.) = 694 mPa · s
$K_1$ = 17.1
$K_3$ = 29.0
$V_0$ = 1.96 V

Mixture Example M-15

Composition MDA-12-3009
Compound

| No. | Abbreviation | |
|---|---|---|
| 1 | PZG-4-N | 6.0% |
| 2 | PPTUI-3-2 | 10.0% |
| 3 | PPTUI-3-4 | 16.0% |
| 4 | PPTUI-4-4 | 30.0% |
| 5 | CC-3-V | 8.0% |
| 6 | PTP(1)I-4-A1 | 30.0% |
| Σ | | 100.0% |

Physical properties

T (N, I) = 95.5° C.
$n_e$ (20° C., 589.3 nm) > 1.860
$n_o$ (20° C., 589.3 nm) = 1.5212
$\Delta\varepsilon$ (20° C., 1 kHz) = 3.6
$\varepsilon_{\parallel}$ = 6.7
$\gamma_1$ (20° C.) = 364 mPa · s
$K_1$ = 11.4
$K_3$ = 20.8
$V_0$ = 1.87 V

Mixture Example M-16

Composition MDA-12-3028
Compound

| No. | Abbreviation | |
|---|---|---|
| 1 | PZG-4-N | 6.0% |
| 2 | PPTUI-3-2 | 10.0% |
| 3 | PPTUI-3-4 | 16.0% |
| 4 | PPTUI-4-4 | 30.0% |
| 5 | CC-3-V | 18.0% |
| 6 | PTP(1)I-4-A1 | 20.0% |
| Σ | | 100.0% |

Physical properties

T (N, I) = 97° C.
$\Delta n$ (20° C., 589.3 nm) = 0.2737
$n_o$ = 1.5137
$\Delta\varepsilon$ (20° C., 1 kHz) = 3.5
$\varepsilon_{\parallel}$ = 6.5
$\gamma_1$ (20° C.) = 244 mPa · s
$K_1$ = 12.3
$K_3$ = 19.1
$V_0$ = 1.98 V

Mixture Example M-17

Composition MDA-12-3029
Compound

| No. | Abbreviation | |
|---|---|---|
| 1 | PPTUI-3-2 | 10.0% |
| 2 | PPTUI-3-4 | 16.0% |
| 3 | PPTUI-4-4 | 30.0% |
| 4 | CC-3-V | 10.0% |
| 5 | PTP(1)I-4-A1 | 30.0% |
| 6 | UMU-6-N | 4.0% |
| Σ | | 100.0% |

Physical properties

T (N, I) = 99° C.
$n_e$ (20° C., 589.3 nm) > 1.860
$n_o$ (20° C., 589.3 nm) = 1.5198
$\Delta\varepsilon$ (20° C., 1 kHz) = 3.7
$\varepsilon_{\parallel}$ = 6.5
$\gamma_1$ (20° C.) = 371 mPa · s
$K_1$ = 11.8
$K_3$ = 21.2
$V_0$ = 1.90 V

Mixture Example M-18

Composition
Compound

| No. | Abbreviation | |
|---|---|---|
| 1 | PPTUI-3-2 | 15.0% |
| 2 | PPTUI-3-4 | 15.0% |
| 3 | PPTUI-4-4 | 22.0% |
| 4 | CPTP-4-1 | 3.0% |
| 5 | CPTP-3-2 | 3.0% |
| 6 | CPTP-5-2 | 4.0% |
| 7 | CPGP-5-3 | 4.0% |
| 8 | UMU-6-N | 5.0% |
| 9 | PTP(1)I-4-A1 | 29.0% |
| Σ | | 100.0% |

Physical properties

T (N, I) = 129.5° C.
$n_e$ (20° C., 589.3 nm) > 1.860
$n_o$ (20° C., 589.3 nm) = 1.5232
$\Delta\varepsilon$ (20° C., 1 kHz) = 4.6
$\varepsilon_{\parallel}$ = 7.6
$\gamma_1$ (20° C.) = 662 mPa · s
$K_1$ = 13.9
$K_3$ = 25.8
$V_0$ = 1.84 V

Mixture Example M-19

Composition
Compound

| No. | Abbreviation | |
|---|---|---|
| 1 | PTG(c3)TP-4-4 | 30.0% |
| 2 | PTP(1)I-4-A1 | 30.0% |

-continued

| No. | Abbreviation | |
|---|---|---|
| 3 | PTiNpTP-4-6 | 14.0% |
| 4 | PTiNpTP-3-6 | 13.0% |
| 5 | PTiNpTP-3-5 | 13.0% |
| Σ | | 100.0% |

Physical properties

T (N, I) = 112.5° C.
$n_e$ (20° C., 589.3 nm) > 1.860
$n_o$ (20° C., 589.3 nm) = 1.5490
$\Delta\varepsilon$ (20° C., 1 kHz) = 1.0
$\varepsilon_{\parallel}$ = 3.7
$\gamma_1$ (20° C.) = 1260 mPa·s
$K_1$ = 9.5
$K_3$ = 63.9
$V_0$ = 3.27 V

Mixture Example M-20

| No. | Abbreviation | |
|---|---|---|
| | Composition Compound | |
| 1 | PTP(c3; 1)TP-4-4 | 30.0% |
| 2 | PTP(1)I-4-A1 | 30.0% |
| 3 | PTiNpTP-4-6 | 14.0% |
| 4 | PTiNpTP-3-6 | 13.0% |
| 5 | PTiNpTP-3-5 | 13.0% |
| Σ | | 100.0% |

Physical properties

T (N, I) = 127° C.
$\Delta\varepsilon$ (20° C., 1 kHz) = 0.9
$\varepsilon_{\parallel}$ = 3.5
$\gamma_1$ (20° C.) = 2142 mPa·s
$K_1$ = 10.4
$K_3$ = 42.4
$V_0$ = 3.68 V

Mixture Example M-21

| No. | Abbreviation | |
|---|---|---|
| | Composition Compound | |
| 1 | PTG(c3)TP-4-4 | 30.0% |
| 2 | PTP(1)I-4-A1 | 30.0% |
| 3 | PTiNpTP-4-6 | 10.0% |
| 4 | PTiNpTP-3-6 | 10.0% |
| 5 | PTiNpTP-3-5 | 10.0% |
| 6 | PPTUI-3-4 | 10.0% |
| Σ | | 100.0% |

Physical properties

T (N, I) = 111.5° C.
$n_e$ (20° C., 589.3 nm) > 1.860
$n_o$ (20° C., 589.3 nm) = 1.5420
$\Delta\varepsilon$ (20° C., 1 kHz) = 1.0
$\varepsilon_{\parallel}$ = 3.7
$\gamma_1$ (20° C.) = 979 mPa·s
$K_1$ = 11.0
$K_3$ = 34.9
$V_0$ = 3.43 V

Mixture Example M-22

| No. | Abbreviation | |
|---|---|---|
| | Composition Compound | |
| 1 | PTG(c3)TP-4-4 | 30.0% |
| 2 | PTP(1)I-4-A1 | 40.0% |
| 3 | PTiNpTP-4-6 | 10.0% |
| 4 | PTiNpTP-3-6 | 10.0% |
| 5 | PTiNpTP-3-5 | 10.0% |
| Σ | | 100.0% |

Physical properties

T (N, I) = 96.5° C.
$n_e$ (20° C., 589.3 nm) > 1.860
$n_o$ (20° C., 589.3 nm) = 1.5488
$\Delta\varepsilon$ (20° C., 1 kHz) = 1.0
$\varepsilon_{\parallel}$ = 3.7
$\gamma_1$ (20° C.) = 927 mPa·s
$K_1$ = 9.5
$K_3$ = 25.8
$V_0$ = 3.26 V

Mixture Example M-23

| No. | Abbreviation | |
|---|---|---|
| | Composition Compound | |
| 1 | PPTUI-3-2 | 36.0% |
| 2 | PPTUI-3-4 | 58.0% |
| 3 | PTP(1)I-4-A1 | 6.0% |
| Σ | | 100.0% |

Physical properties

T (N, I) = 167.5° C.
$\Delta\varepsilon$ (20° C., 1 kHz) = 1.2
$\varepsilon_{\parallel}$ = 3.9
$\gamma_1$ (20° C.) = 762 mPa·s
$K_1$ = 16.6
$K_3$ = 45.4
$V_0$ = 3.86 V

Mixture Example M-24

| No. | Abbreviation | |
|---|---|---|
| | Composition Compound | |
| 1 | PPTUI-3-2 | 11.0% |
| 2 | PPTUI-3-4 | 17.0% |
| 3 | PPTUI-4-4 | 30.0% |

-continued

| No. | Abbreviation | |
|---|---|---|
| 4 | PTP(1)I-4-A1 | 40.0% |
| 5 | PPGU-3-F | 2.0% |
| Σ | | 100.0% |

Physical properties $T(N, I) = 104°$ C.
$\Delta\varepsilon$ (20° C., 1 kHz) = 1.3
$\varepsilon_{\parallel} = 4.0$
$\gamma_1$ (20° C.) = 611 mPa·s
$K_1 = 11.7$
$K_3 = 27.6$
$V_0 = 3.13$ V

Mixture Example M-25

Composition Compound

| No. | Abbreviation | |
|---|---|---|
| 1 | PPTUI-3-2 | 10.0% |
| 2 | PPTUI-3-4 | 10.0% |
| 3 | PPTUI-4-4 | 30.0% |
| 4 | PTP(1)I-4-A1 | 40.0% |
| 5 | PVG-3-S | 10.0% |
| Σ | | 100.0% |

Physical properties $T(N, I) = $ ° C.
$\Delta\varepsilon$ (20° C., 1 kHz) = 2.9
$\varepsilon_{\parallel} = 5.8$
$\gamma_1$ (20° C.) = 528 mPa·s
$K_1 = 11.0$
$K_3 = 18.8$
$V_0 = 2.05$ V

Mixture Example M-26

Composition Compound

| No. | Abbreviation | |
|---|---|---|
| 1 | PPTUI-3-4 | 15.00% |
| 2 | PGUQU-3-F | 4.00% |
| 3 | PGUQU-5-F | 4.00% |
| 4 | PTiNpTP-3-6 | 15.00% |
| 5 | PTiNpTP-3-5 | 15.00% |
| 6 | PTiNpTP-4-6 | 15.00% |
| 7 | PTP(1)I-4-A1 | 32.00% |
| Σ | | 100.0% |

Physical properties $T(N, I) = 115°$ C.
$\Delta\varepsilon$ (20° C., 1 kHz) = 2.9
$\varepsilon_{\parallel} = 5.7$
$\gamma_1$ (20° C.) = 1471 mPa·s
$K_1 = 12.7$
$K_3 = 29.6$
$V_0 = 2.23$ V

Mixture Example M-27

Composition Compound

| No. | Abbreviation | |
|---|---|---|
| 1 | PPTUI-3-2 | 11.00% |
| 2 | PPTUI-3-4 | 16.00% |
| 3 | PPTUI-4-4 | 30.00% |
| 4 | PTP(1)I-4-A1 | 40.00% |
| 5 | PPGU-3-F | 3.00% |
| Σ | | 100.0% |

Physical properties $T(N, I) = 105°$ C.
$\Delta\varepsilon$ (20° C., 1 kHz) = 1.5
$\varepsilon_{\parallel} = 4.2$
$\gamma_1$ (20° C.) = 614 mPa·s
$K_1 = 12.3$
$K_3 = 25.5$
$V_0 = 3.05$ V

Mixture Example M-28

Composition Compound

| No. | Abbreviation | |
|---|---|---|
| 1 | PPTUI-3-2 | 11.00% |
| 2 | PPTUI-3-4 | 18.00% |
| 3 | PPTUI-4-4 | 20.00% |
| 4 | PTP(1)I-4-A1 | 30.00% |
| 5 | PPGU-3-F | 1.00% |
| 6 | PTiNpTP-3-6 | 20.00% |
| Σ | | 100.0% |

Physical properties $T(N, I) = 119°$ C.
$\Delta\varepsilon$ (20° C., 1 kHz) = 1.2
$\varepsilon_{\parallel} = 3.8$
$\gamma_1$ (20° C.) = 916 mPa·s
$K_1 = 12.6$
$K_3 = 30.0$
$V_0 = 3.48$ V

Mixture Example M-29

Composition Compound

| No. | Abbreviation | |
|---|---|---|
| 1 | PPTUI-3-2 | 20.00% |
| 2 | PPTUI-3-4 | 29.00% |
| 3 | PTP(1)I-4-A1 | 30.00% |
| 4 | PPGU-3-F | 1.00% |
| 5 | PTiNpTP-3-6 | 10.00% |
| 6 | PTiNpTP-3-5 | 10.00% |
| Σ | | 100.0% |

-continued

| Physical properties |
| --- |
| $T(N, I) = 124°$ C. <br> $\Delta\varepsilon$ (20° C., 1 kHz) = 2.0 <br> $\varepsilon_{\parallel} = 4.8$ <br> $\gamma_1$ (20° C.) = 1515 mPa·s <br> $K_1 = 11.0$ <br> $K_3 = 30.3$ <br> $V_0 = 2.45$ V |

Mixture Example M-30

| Composition Compound | | |
| --- | --- | --- |
| No. | Abbreviation | |
| 1 | PTG(c3)TP-4-4 | 30.00% |
| 2 | PTP(1)I-4-A1 | 30.00% |
| 3 | PTiNpTP-4-6 | 10.00% |
| 4 | PTiNpTP-3-6 | 10.00% |
| 5 | PTiNpTP-3-5 | 10.00% |
| 6 | PPTUI-3-4 | 5.00% |
| 7 | PPGU-3-F | 1.00% |
| 8 | PGUQU-3-F | 2.00% |
| 9 | PGUQU-5-F | 2.00% |
| Σ | | 100.0% |

| Physical properties |
| --- |
| $T(N, I) = 110.5°$ C. <br> $\Delta\varepsilon$ (20° C., 1 kHz) = 1.2 <br> $\varepsilon_{\parallel} = 3.9$ <br> $\gamma_1$ (20° C.) = 922 mPa·s <br> $K_1 = 13.6$ <br> $K_3 = 32.4$ <br> $V_0 = 3.6$ V |

Mixture Example M-31

| Composition Compound | | |
| --- | --- | --- |
| No. | Abbreviation | |
| 1 | PTG(c3)TP-4-4 | 30.00% |
| 2 | PTP(1)I-4-A1 | 33.00% |
| 3 | PTiNpTP-4-6 | 10.00% |
| 4 | PTiNpTP-3-6 | 10.00% |
| 5 | PTiNpTP-3-5 | 10.00% |
| 6 | PZG-5-N | 6.00% |
| 7 | PPGU-3-F | 1.00% |
| Σ | | 100.0% |

| Physical properties |
| --- |
| $T(N, I) = 98.5°$ C. <br> $\Delta\varepsilon$ (20° C., 1 kHz) = 3.5 <br> $\varepsilon_{\parallel} = 6.6$ <br> $\gamma_1$ (20° C.) = 1443 mPa·s <br> $K_1 = 10.2$ <br> $K_3 = 23.6$ <br> $V_0 = 1.8$ V |

Mixture Example M-32

| Composition Compound | | |
| --- | --- | --- |
| No. | Abbreviation | |
| 1 | PPTUI-3-2 | 36.00% |
| 2 | PPTUI-3-4 | 54.00% |
| 3 | PTP(1)I-4-A1 | 10.00% |
| Σ | | 100.0% |

| Physical properties |
| --- |
| $T(N, I) = 157°$ C. <br> $\Delta\varepsilon$ (20° C., 1 kHz) = 1.2 <br> $\varepsilon_{\parallel} = 4.0$ <br> $\gamma_1$ (20° C.) = 710 mPa·s <br> $K_1 = 17.3$ <br> $K_3 = 43.5$ <br> $V_0 = 3.99$ V |

Mixture Example M-33

| Composition Compound | | |
| --- | --- | --- |
| No. | Abbreviation | |
| 1 | PPTUI-3-2 | 35.00% |
| 2 | PPTUI-3-4 | 50.00% |
| 3 | PTP(1)I-4-A1 | 15.00% |
| Σ | | 100.0% |

| Physical properties |
| --- |
| $T(N, I) = 148°$ C. <br> $\Delta\varepsilon$ (20° C., 1 kHz) = 1.2 <br> $\varepsilon_{\parallel} = 3.9$ <br> $\gamma_1$ (20° C.) = 713 mPa·s <br> $K_1 = 16.4$ <br> $K_3 = 40.2$ <br> $V_0 = 3.92$ V |

Mixture Example M-34

| Composition Compound | | |
| --- | --- | --- |
| No. | Abbreviation | |
| 1 | PPTUI-3-2 | 35.00% |
| 2 | PPTUI-3-4 | 45.00% |
| 3 | PTP(1)I-4-A1 | 20.00% |
| Σ | | 100.0% |

| Physical properties |
| --- |
| $T(N, I) = 140°$ C. <br> $\Delta\varepsilon$ (20° C., 1 kHz) = 1.2 <br> $\varepsilon_{\parallel} = 3.9$ <br> $\gamma_1$ (20° C.) = 695 mPa·s <br> $K_1 = 14.9$ <br> $K_3 = 39.9$ <br> $V_0 = 3.77$ V |

Mixture Example M-35

Composition

| No. | Compound Abbreviation | |
|---|---|---|
| 1 | PPTUI-3-2 | 35.00% |
| 2 | PPTUI-3-4 | 40.00% |
| 3 | PTP(1)I-4-A1 | 25.00% |
| Σ | | 100.0% |

Physical properties $T(N, I) = 132°$ C.
$\Delta\varepsilon$ (20° C., 1 kHz) = 1.2
$\varepsilon_{||} = 3.8$
$\gamma_1$ (20° C.) = 676 mPa · s
$K_1 = 13.9$
$K_3 = 36.2$
$V_0 = 3.66$ V

Mixture Example M-36

Composition

| No. | Compound Abbreviation | |
|---|---|---|
| 1 | PPTUI-3-2 | 35.00% |
| 2 | PPTUI-3-4 | 35.00% |
| 3 | PTP(1)I-4-A1 | 30.00% |
| Σ | | 100.0% |

Physical properties $T(N, I) = 124°$ C.
$\Delta\varepsilon$ (20° C., 1 kHz) = 1.1
$\varepsilon_{||} = 3.8$
$\gamma_1$ (20° C.) = 665 mPa · s
$K_1 = 13.1$
$K_3 = 33.2$
$V_0 = 3.58$ V

Mixture Example M-37

Composition

| No. | Compound Abbreviation | |
|---|---|---|
| 1 | PTP(1)I-4-A1 | 16.00% |
| 2 | PP-1-2V1 | 6.00% |
| 3 | PPTUI-3-2 | 20.00% |
| 4 | PPTUI-3-4 | 38.00% |
| 5 | GGP-5-CL | 18.00% |
| 6 | PGUQU-5-F | 2.00% |
| Σ | | 100.0% |

Physical properties $T(N, I) = 123°$ C.
$n_e$ (20° C., 589.3 nm) > 1.860
$n_o$ (20° C., 589.3 nm) = 1.5520
$\Delta\varepsilon$ (20° C., 1 kHz) = 3.4
$\varepsilon_{||} = 6.4$
$\gamma_1$ (20° C.) = 498 mPa · s
$K_1 = 15.5$
$K_3 = 30.2$
$V_0 = 2.27$ V

Mixture Example M-38

Composition

| No. | Compound Abbreviation | |
|---|---|---|
| 1 | PPTUI-3-2 | 20.00% |
| 2 | PPTUI-3-4 | 32.00% |
| 3 | GGP-5-CL | 18.00% |
| 4 | PTP(1)I-4-A1 | 30.00% |
| Σ | | 100.0% |

Physical properties $T(N, I) = 112.5°$ C.
$n_e$ (20° C., 589.3 nm) > 1.860
$n_o$ (20° C., 589.3 nm) = 1.5250
$\Delta\varepsilon$ (20° C., 1 kHz) = 2.7
$\varepsilon_{||} = 5.8$
$\gamma_1$ (20° C.) = 573 mPa · s
$K_1 = 12.9$
$K_3 = 31.0$
$V_0 = 2.30$ V

Mixture Example M-39

Composition

| No. | Compound Abbreviation | |
|---|---|---|
| 1 | PPTUI-3-2 | 13.00% |
| 2 | PPTUI-3-4 | 20.00% |
| 3 | PPTUI-4-4 | 33.00% |
| 4 | PTP(1)I-4-A1 | 33.00% |
| 5 | PPGU-3-F | 1.00% |
| Σ | | 100.0% |

Physical properties $T(N, I) = 113.5°$ C.
$n_e$ (20° C., 589.3 nm) > 1.860
$n_o$ (20° C., 589.3 nm) = 1.5279
$\Delta\varepsilon$ (20° C., 1 kHz) = 1.2
$\varepsilon_{||} = 3.9$
$\gamma_1$ (20° C.) = 615 mPa · s
$K_1 = 11.8$
$K_3 = 37.4$
$V_0 = 3.29$ V

Mixture Example M-40

| No. | Composition Compound Abbreviation | |
|---|---|---|
| 1 | PPTUI-3-2 | 11.00% |
| 2 | PPTUI-3-4 | 18.00% |
| 3 | PPTUI-4-4 | 30.00% |
| 4 | PTP(1)I-4-A1 | 40.00% |
| 5 | PPGU-3-F | 1.00% |
| Σ | | 100.0% |

Physical properties

T(N, I) = 103° C.
$n_e$ (20° C., 589.3 nm) > 1.860
$n_o$ (20° C., 589.3 nm) = 1.5269
Δε (20° C., 1 kHz) = 1.2
$\varepsilon_{||}$ = 3.9
$\gamma_1$ (20° C.) = 604 mPa · s
$K_1$ = 11.6
$K_3$ = 28.4
$V_0$ = 3.29 V

Mixture Example M-41

| No. | Composition Compound Abbreviation | |
|---|---|---|
| 1 | PPTUI-3-2 | 11.00% |
| 2 | PPTUI-3-4 | 18.00% |
| 3 | PPTUI-4-4 | 30.00% |
| 4 | PTP(1)I-4-A1 | 30.00% |
| 5 | PPGU-3-F | 1.00% |
| 6 | PTiNpTP-3-6 | 10.00% |
| Σ | | 100.0% |

Physical properties

T(N, I) = 117.5° C.
$n_e$ (20° C., 589.3 nm) > 1.860
$n_o$ (20° C., 589.3 nm) = 1.5289
Δε (20° C., 1 kHz) = 1.2
$\varepsilon_{||}$ = 3.9
$\gamma_1$ (20° C.) = 753 mPa · s
$K_1$ = 12.8
$K_3$ = 32.6
$V_0$ = 3.47 V The mixture examples have been characterised by measurement of application relevant data. The results are summarised in table 1

TABLE 1

| Example | $\varepsilon_{r,||}$ | tan $\delta_{\varepsilon r,||}$ | $\varepsilon_{r,\perp}$ | tan $\delta_{\varepsilon r,\perp}$ | τ | η |
|---|---|---|---|---|---|---|
| M-1 | 3.30 | 0.0021 | 2.44 | 0.0053 | 0.258 | 49.1 |
| M-2 | 3.30 | 0.0013 | 2.40 | 0.0048 | 0.273 | 57.4 |
| M-3 | 3.43 | 0.0020 | 2.48 | 0.0051 | 0.278 | 54.9 |
| M-4 | 3.42 | 0.0022 | 2.49 | 0.0053 | 0.271 | 50.8 |
| M-5 | 3.02 | 0.0029 | 2.36 | 0.0097 | 0.218 | 22.4 |
| M-6 | 3.09 | 0.0031 | 2.38 | 0.0124 | 0.231 | 18.6 |
| M-7 | 3.12 | 0.0028 | 2.39 | 0.0098 | 0.234 | 24.0 |
| M-8 | 3.10 | 0.0028 | 2.37 | 0.0099 | 0.234 | 23.7 |
| M-9 | 3.02 | 0.0028 | 2.36 | 0.0099 | 0.220 | 22.1 |
| M-10 | 3.19 | 0.0033 | 2.42 | 0.0098 | 0.241 | 24.6 |
| M-11 | 3.18 | 0.0034 | 2.41 | 0.0097 | 0.240 | 24.7 |
| M-12 | 3.14 | 0.0036 | 2.40 | 0.0094 | 0.236 | 25.1 |
| M-13 | 3.06 | 0.0030 | 2.39 | 0.0096 | 0.219 | 22.8 |
| M-14 | 3.18 | 0.0029 | 2.42 | 0.0111 | 0.241 | 21.7 |
| M-15 | 3.09 | 0.0041 | 2.40 | 0.0125 | 0.221 | 17.7 |
| M-16 | 2.99 | 0.0040 | 2.38 | 0.0127 | 0.202 | 16.0 |
| M-17 | 3.07 | 0.0032 | 2.39 | 0.0103 | 0.222 | 21.6 |
| M-18 | 3.17 | 0.0030 | 2.41 | 0.0099 | 0.239 | 24.1 |
| M-19 | 3.29 | 0.0022 | 2.42 | 0.0059 | 0.264 | 44.3 |
| M-20 | 3.30 | 0.0021 | 2.42 | 0.0050 | 0.268 | 53.4 |
| M-21 | 3.27 | 0.0024 | 2.41 | 0.0067 | 0.264 | 39.6 |
| M-22 | 3.27 | 0.0024 | 2.42 | 0.0063 | 0.260 | 41.6 |
| M-23 | 3.29 | 0.0029 | 2.45 | 0.0116 | 0.258 | 22.1 |
| M-24 | 3.19 | 0.0031 | 2.41 | 0.0089 | 0.245 | 27.5 |
| M-25 | 3.25 | 0.0041 | 2.44 | 0.0100 | 0.251 | 25.1 |
| M-26 | t.b.d. | t.b.d. | t.b.d. | t.b.d. | t.b.d. | t.b.d. |
| M-27 | 3.19 | 0.0031 | 2.40 | 0.0095 | 0.247 | 26.1 |
| M-28 | 3.26 | 0.0027 | 2.42 | 0.0086 | 0.257 | 30.0 |
| M-29 | 3.28 | 0.0026 | 2.42 | 0.0085 | 0.263 | 31.0 |
| M-30 | 3.28 | 0.0025 | 2.42 | 0.0069 | 0.260 | 37.7 |
| M-31 | 3.25 | 0.0031 | 2.44 | 0.0085 | 0.251 | 29.3 |
| M-32 | 3.28 | 0.0029 | 2.43 | 0.0111 | 0.260 | 23.4 |
| M-33 | t.b.d. | t.b.d. | t.b.d. | t.b.d. | t.b.d. | t.b.d. |
| M-34 | 3.26 | 0.0032 | 2.41 | 0.0108 | 0.259 | 24.0 |
| M-35 | t.b.d. | t.b.d. | t.b.d. | t.b.d. | t.b.d. | t.b.d. |
| M-36 | 3.25 | 0.0025 | 2.42 | 0.0094 | 0.255 | 27.1 |
| M-37 | t.b.d. | t.b.d. | t.b.d. | t.b.d. | t.b.d. | t.b.d. |
| M-38 | t.b.d. | t.b.d. | t.b.d. | t.b.d. | t.b.d. | t.b.d. |
| M-39 | 3.21 | 0.0031 | 2.42 | 0.0100 | 0.245 | 24.6 |
| M-40 | 3.22 | 0.0032 | 2.43 | 0.0097 | 0.246 | 25.3 |
| M-41 | 3.26 | 0.0028 | 2.43 | 0.0090 | 0.253 | 28.0 |

* tbd = to be determined.

The mixtures M1 to M-41 show excellent tunability and material quality and have excellent overall properties especially for the application in phased array antennae.

The following table 2 shows the influence of an increasing proportion of compound PTP(1)I-4-A1, an example of compounds of formula A, added to the a liquid crystal host mixture C-1 from the state of the art.

TABLE 2

| Mixture | $\varepsilon_{r,||}$ | tan $\delta_{\varepsilon r,||}$ | $\varepsilon_{r,\perp}$ | tan $\delta_{\varepsilon r,\perp}$ | Δ$\varepsilon_r$ | τ | η |
|---|---|---|---|---|---|---|---|
| C-1 | 2.48 | 0.0034 | 1.61 | 0.0123 | 0.87 | 0.260 | 21.1 |
| M-32 | 3.28 | 0.0029 | 2.43 | 0.0111 | 0.85 | 0.260 | 23.4 |
| M-34 | 3.26 | 0.0032 | 2.41 | 0.0108 | 0.85 | 0.259 | 24.0 |
| M-36 | 3.25 | 0.0025 | 2.42 | 0.0094 | 0.83 | 0.255 | 27.1 |

As can be seen from table 2, the addition of compound PTP(1)I-4-A1 leads to an increase in the material quality (η) due to the same or only slightly lower values for the tunability (τ), concurrently with significantly decreased values for the dielectric loss (tan δ).

The beneficial effect increases with increasing proportions of the component of formula A (PTP(1)I-4-A1).

The invention claimed is:
1. Liquid-crystalline medium comprising one or more compounds of formula A

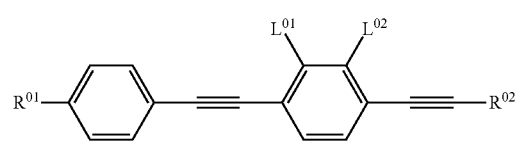

A and, in addition
one or more compounds selected from the group of compounds of formulae I and II

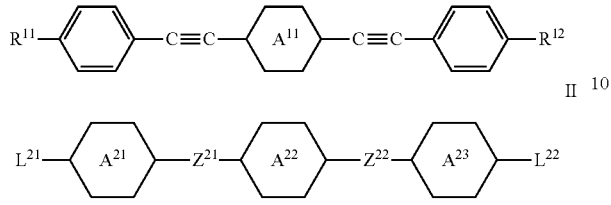

wherein $R^{01}$ and $R^{02}$ each, independently of one another, denote a halogenated or unsubstituted alkyl radical having 1 to 15 C atoms, wherein one or more $CH_2$ groups in these radicals may be replaced, independently of one another, by —C≡C—, —CH=CH—, —CF=CF—, —CF=CH—, —CH=CF—, —(CO)O—, —O(CO)—, —(CO)—, —O— or —S— in such a way that O or S atoms are not linked directly to one another, $L^{01}$ and $L^{02}$ denote H or $CH_3$ with the proviso that one of $L^{01}$ and $L^{02}$ denotes H and the other of $L^{01}$ and $L^{02}$ denotes $CH_3$,

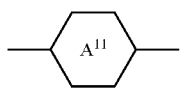

denotes

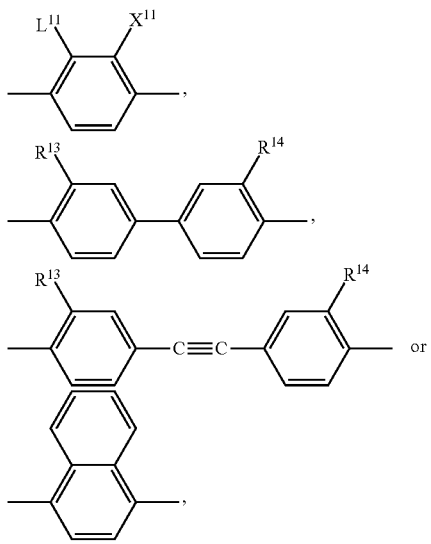

$L^{11}$ denotes alkyl having 1 to 6 C atoms, cycloalkyl having 3 to 6 C atoms or cycloalkenyl having 4 to 6 C atoms,
$X^{11}$ denotes H, alkyl having 1 to 3 C atoms or halogen,
$R^{11}$ to $R^{14}$ independently of one another, denote unfluorinated alkyl or unfluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcyclo-alkylalkyl or alkylcycloalkenylalkyl, each having up to 15 C atoms, and alternatively one of $R^{13}$ and $R^{14}$ or both also denote H;
$L^{21}$ denotes $R^{21}$ and, in the case where $Z^{21}$ and/or $Z^{22}$ denote trans-CH=CH— or trans-CF=CF—, alternatively also denotes $X^{21}$,
$L^{22}$ denotes $R^{22}$ and, in the case where $Z^{21}$ and/or $Z^{22}$ denote trans-CH=CH— or trans-CF=CF—, alternatively also denotes $X^{22}$,
$R^{21}$ and $R^{22}$ independently of one another, denote H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms,
$X^{21}$ and $X^{22}$ independently of one another, denote F or Cl, —CN, —NCS, —$SF_5$, fluorinated alkyl or alkoxy having 1 to 7 C atoms or fluorinated alkenyl, alkenyloxy or alkoxyalkyl having 2 to 7 C atoms,
one of
$Z^{21}$ and $Z^{22}$ denotes trans-CH=CH—, trans-CF=CF— or —C≡C— and the other, independently thereof, denotes trans-CH=CH—, trans-CF=CF— or a single bond, and

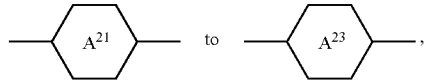

independently of one another, denote

2. Liquid-crystalline medium according to claim 1, characterised in that it comprises one or more compounds of formula A and one or more compounds of formula I.

3. Liquid-crystalline medium according to claim 1, characterised in that it comprises one or more compounds of formula A and one or more compounds of formula II.

4. Liquid-crystalline medium according to claim 1, characterised in that it comprises one or more compounds of formula A and one or more compounds of formula I and one or more compounds of formula II.

5. Liquid-crystalline medium according to claim 2, characterised in that one or more compounds of formula I are selected from the group of compounds of formulae I-1 to I-4

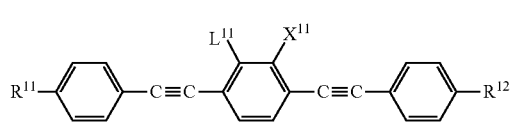

I-1

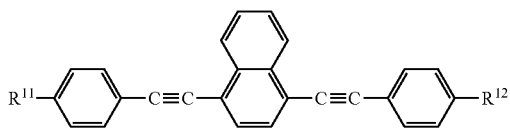

I-2

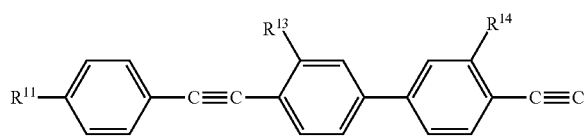

I-3

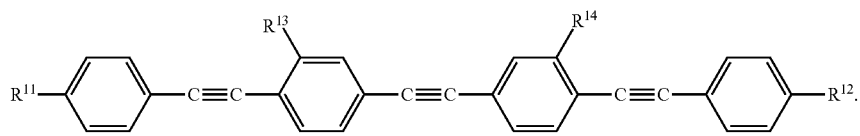

I-4

6. Liquid-crystalline medium according to claim 3, characterised in that one or more compounds of formula II are selected from compounds of the formula II-1a

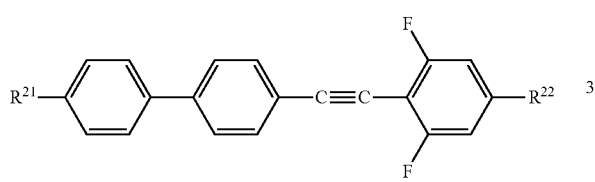

II-1a

7. Liquid-crystalline medium according to claim 1, characterised in that one or more compounds of formula A are selected from the group of compounds of formulae A-1 and A-2

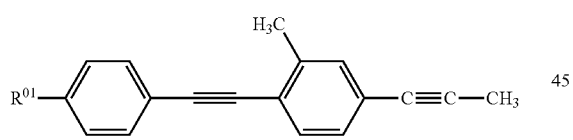

A-1

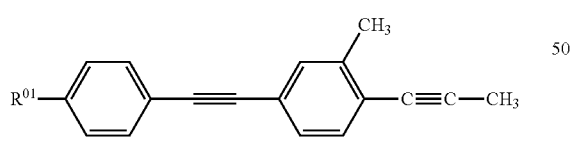

A-2 wherein $R^{01}$ denotes alkyl having 1 to 7 C atoms.

8. Liquid-crystalline medium according to claim 1, characterised in that it comprises one or more compounds of formula A'

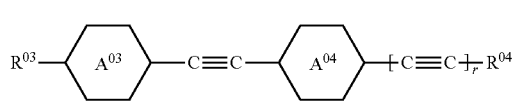

A' wherein

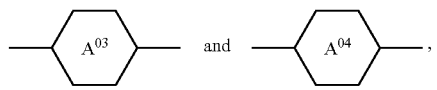

independently of one another, denote

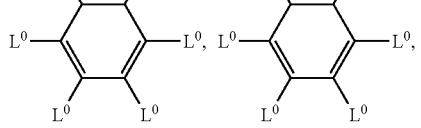

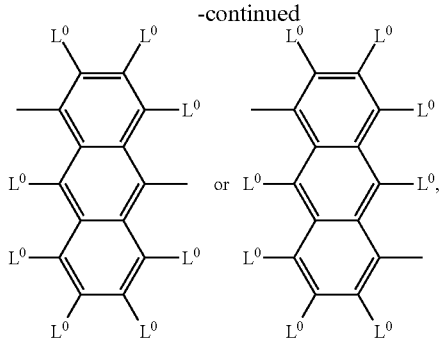

Y denotes —S— or —O—,

L⁰ on each occurrence, independently of one another, denotes H, Br, Cl, F, —CN, —NCS, —SCN, SF₅, alkyl having 1 to 10 C atoms, alkoxy having 1 to 10 C atoms, cycloalkyl having 3 to 6 C atoms or a mono- or polyfluorinated alkyl or alkoxy group each having 1 to 10 C atoms, R⁰³, R⁰⁴ each, independently of one another, denote a halogenated or unsubstituted alkyl radical having 1 to 15 C atoms, where, in addition, one or more CH₂ groups in these radicals may each be replaced, independently of one another, by —C≡C—, —CH═CH—, —CF═CF—, —CF═CH—, —CH═CF—, —(CO)O—, —O(CO)—, —(CO)—, —O— or —S— in such a way that O or S atoms are not linked directly to one another and, optionally, independently of one another, R⁰³ may also denote ethynyl (i.e. —C≡CH) and R⁰⁴ may also denote H, R⁰⁵, R⁰⁶ each, independently of one another, denote a halogenated or unsubstituted alkyl radical having 1 to 6 C atoms, where, in addition, one or more CH₂ groups in these radicals may each be replaced, independently of one another, by —C≡C—, —CH═CH—, —CF═CF—, —CF═CH—, —CH═CF—, —(CO)O—, —O(CO)—, —(CO)—, —O— or —S— in such a way that O or S atoms are not linked directly to one another, and r denotes 0 or 1, with the condition that compounds of formula A are excluded.

9. Liquid-crystalline medium according to claim 8, characterised in that the compounds of formula A' are selected from the sub-formulae A'-1 to A'-4

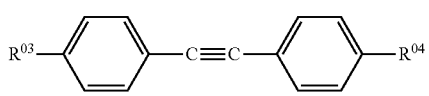
A'-1

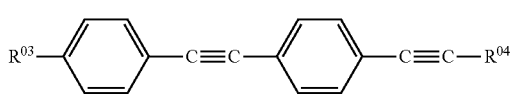
A'-2

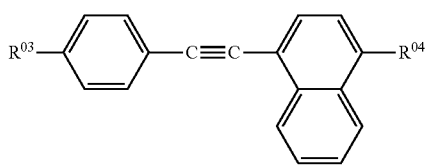
A'-3

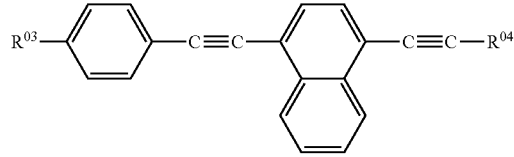
A'-4 wherein R⁰³ and R⁰⁴ independently of each other denote alkyl having 1 to 7 C atoms.

10. Liquid-crystalline medium according to claim 1, characterised in that it comprises one or more compounds of selected from the group of compounds of the formulae IX-1 and IX-2

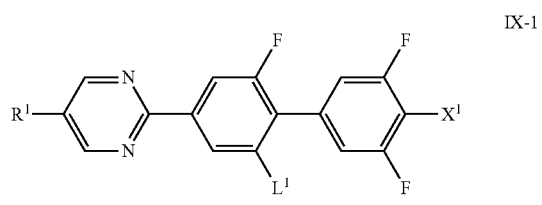
IX-1

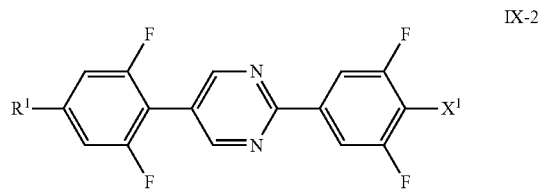
IX-2 wherein

R¹ denotes straight chain or branched alkyl having 1 to 20 C-atoms which is unsubstituted, mono- or poly-substituted by F, Cl or CN, and in which one or more CH₂ groups are optionally replaced independently from one another, by —O—, —S—, —NR⁰—, —SiR⁰R⁰⁰—, —CO—, —COO—, —OCO—, —OCO—O—, —S—CO—, —CO—S—, —CY⁰¹═CY⁰²— or —C≡C— in such a way that O and/or S atoms are not linked directly to one another, L¹ denotes H or F, X¹ denotes F, CN or CF₃, Y⁰¹ and Y⁰² denote, independently of each other, F, Cl or CN, and alternatively one of them may be H, and R⁰ and R⁰⁰ denote, independently of each other, H or alkyl having 1 to 12 C-atoms.

11. Liquid-crystalline medium according to claim 1, characterised in that the total concentration of the compounds of the formula A in the medium is in the range from 5% to 80%.

12. Liquid-crystalline medium according to claim 1, characterised in that the total concentration of compounds selected from the group of compounds of formulae A and I and II is in the range from 40% to 100%.

13. Process for the preparation of a liquid-crystal medium according to claim 1, characterised in that one or more compounds of the formula A are mixed with one or more further compounds and optionally with one or more additives.

14. Component for high-frequency technology, characterised in that it comprises a liquid-crystal medium according to claim 1.

15. 'Phased-array' antenna, characterised in that it comprises a component according to claim 14.

* * * * *